United States Patent
Nitta et al.

(10) Patent No.: US 7,800,526 B2
(45) Date of Patent: *Sep. 21, 2010

(54) DATA PROCESSING METHOD, SEMICONDUCTOR DEVICE FOR DETECTING PHYSICAL QUANTITY DISTRIBUTION, AND ELECTRONIC APPARATUS

(75) Inventors: Yoshikazu Nitta, Tokyo (JP); Noriyuki Fukushima, Kanagawa (JP); Yoshinori Muramatsu, Kanagawa (JP); Yukihiro Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 796 days.

This patent is subject to a terminal disclaimer.

(21) Appl. No.: 11/179,888

(22) Filed: Jul. 12, 2005

(65) Prior Publication Data
US 2006/0012698 A1 Jan. 19, 2006

(30) Foreign Application Priority Data
Jul. 16, 2004 (JP) ............................ P2004-209887

(51) Int. Cl.
*H03M 1/34* (2006.01)
(52) U.S. Cl. ..................................... 341/164; 341/155
(58) Field of Classification Search ......... 341/155–165, 341/172, 157, 110, 118–125; 382/305, 293; 348/297, 294, 307
See application file for complete search history.

(56) References Cited

U.S. PATENT DOCUMENTS 4,453,177 A * 6/1984 Berger et al. ................. 348/282
5,877,715 A * 3/1999 Gowda et al. ................ 341/122
6,204,795 B1 * 3/2001 Afghahi ...................... 341/166

FOREIGN PATENT DOCUMENTS

| JP | 11-8805 A | 1/1999 |
| JP | 11-331883 A | 11/1999 |
| JP | 2001-268451 A | 9/2001 |

OTHER PUBLICATIONS

Yang, Woodward et al., "An Integrated 800×600 CMOS Imaging System", ISSCC99 Digest of Technical Papers, Session 17, paper No. WA.3, pp. 304-305, Feb. 1999.

(Continued)

*Primary Examiner*—David L Ometz
*Assistant Examiner*—Antoinette T Spinks
(74) *Attorney, Agent, or Firm*—Sonnenschein Nath & Rosenthal LLP

(57) ABSTRACT

A data processing apparatus and method is disclosed for obtaining digital data for a plurality of signals to be processed, comprising. The disclosed process includes comparing, by using digital data for a first signal of the plurality of signals, an electric signal corresponding to a second signal of the plurality of signals with a reference signal; obtaining digital data for the second signal based on the comparing step; performing a counting operation in one of a down-counting mode and an up-counting mode while the comparing step is being performed; storing a first count value; outputting the first count value as computed data at a predetermined time; generating normal data based on one of the plurality of signals to be processed; and outputting the normal data.

40 Claims, 19 Drawing Sheets

OTHER PUBLICATIONS

AW, Chye Huat & Wooley, Bruce A., "A 128×128-Pixel Standard-CMOS Image Sensor with Electronic Shutter", ISSCC96, Session 11, paper No. FA 11.2, (3 pages), 1996.

Muramatsu, Yoshinori et al., "A Signal-Processing CMOS Image Sensor Using a Simple Analog Operation", IEEE J. Solid State Circuits, 28(1):101-106, Jan. 2003.

Yonemoto, Kazuya, "Characterisitic and Technology of CMOS image censor—6-2, Resolution of Fixed Pattern Noise", Basic and Applied CCD/CMOS Sensor, 1st Ed., CQ Publishing Co., Ltd., pp. 200-203, Aug. 10, 2003.

Imamura, Toshifumi et al., "3. Research of High-Speed and High-Functioning CMOS Image Censor", Kosoku/Kino CMOS Image Censor no Kenkyu, Mar. 15, 2004.

Kwon, Oh-Bong, et al., "A Novel Double Slope Analog-to-Digital Converter for a High-Quality 640×480 CMOS Imaging System", VL3-03 IEEE, pp. 335-3338, 1999.

\* cited by examiner

FIG. 11

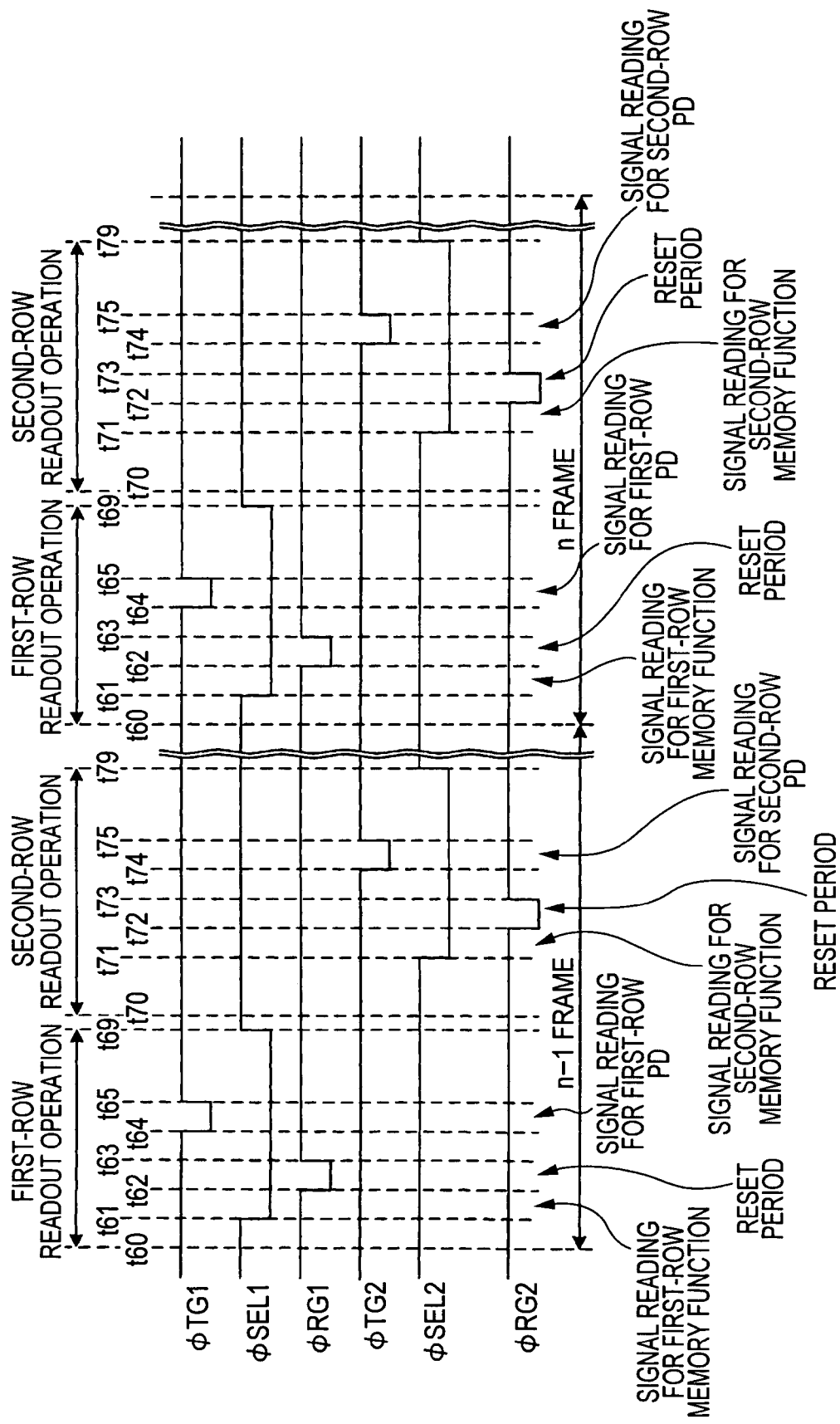

DATA PROCESSING METHOD, SEMICONDUCTOR DEVICE FOR DETECTING PHYSICAL QUANTITY DISTRIBUTION, AND ELECTRONIC APPARATUS

CROSS PREFERENCE TO RELATED APPLICATIONS

The present invention claims the benefit of Japanese Patent Application JP 2004-209887 filed in the Japanese Patent Office on Jul. 16, 2004, the entire contents of which are incorporated herein by reference.

FIELD OF THE INVENTION

The present invention relates to a data processing method, a data processing apparatus, a semiconductor device for detecting the physical quantity distribution in which a plurality of unit elements are disposed, and an electronic apparatus. More particularly, the invention relates to a digital signal processing technology suitably used for semiconductor devices for detecting the physical quantity distribution, for example, solid state imaging devices, and other electronic apparatuses, in which a plurality of unit elements responsive to electromagnetic waves, such as light or radiation, input from an external source, are disposed, and the physical quantity distribution obtained by converting electromagnetic waves into an electric signal by the unit elements can be selectively read by address control as the electric signal.

BACKGROUND OF THE INVENTION

Semiconductor devices for detecting the physical quantity distribution in which a plurality of unit elements (for example, pixels) responsive to electromagnetic waves, such as light or radiation, input from an external source, are disposed in a line or a matrix are used in various fields.

In the video equipment field, CCD (Charge Coupled Device), MOS (Metal Oxide Semiconductor), or CMOS (Complementary Metal-oxide Semiconductor) solid state imaging devices for detecting light (an example of electromagnetic waves) as the physical quantity are used. Such imaging apparatuses read the physical quantity distribution obtained by converting light into an electric signal by using the unit elements (pixels in the solid state imaging devices) as the electric signal.

Solid state imaging devices include amplifying solid state imaging devices. Amplifying solid state imaging devices have pixels formed of amplifying solid-state imaging devices (APS; Active Pixel Sensors/also referred to as "gain cells") having amplifying driving transistors in pixel signal generators for generating pixel signals according to signal charge generated in charge generators. For example, many CMOS solid state imaging devices have such a configuration.

In this type of amplifying solid state imaging device, to read out pixel signals to an external source, address control is performed on a pixel portion in which a plurality of unit pixels are disposed so that the signals are selectively read from the individual unit pixels. That is, the amplifying solid state imaging device is an example of an address-control solid state imaging device.

For example, in an amplifying solid-state imaging device, which is one type of X-Y address solid-state imaging device having unit pixels disposed in a matrix, MOS-structured active devices (MOS transistors) are used for forming the pixels so that the pixels themselves have an amplifying function. That is, signal charge (photoelectrons) stored in photodiodes, which are photoelectric conversion devices, is amplified by the active devices and the amplified signal charge is read as image information.

In this type of X-Y address solid-state imaging device, for example, many pixel transistors are disposed in a two-dimensional matrix to form a pixel portion, the accumulation of signal charge in accordance with incident light in each line (row) or each pixel is started, and current or voltage signals based on the accumulated signal charge are sequentially read from the individual pixels by addressing. In MOS (including CMOS) solid-state imaging devices, an address control method for accessing the pixels in one row at one time and reading the pixel signals from the pixel portion in units of rows is mostly used.

The analog pixel signal read from the pixel portion is converted into digital data in an analog-to-digital converter (AD converter) if necessary. Accordingly, various AD conversion mechanisms have been proposed (for example, see References 1 to 6, below). In some of the known publications, in accordance with the method for accessing the pixels in one row at one time and reading the pixel signals from the pixel portion, a so-called column parallel system in which an AD converter and a signal processor for performing signal processing other than AD conversion are disposed for each vertical column is employed.

REFERENCE 1—W. Yang et al., "An Integrated 800×600 CMOS Image System", ISSCC Digest of Technical Papers, pp. 304-305, February, 1999

REFERENCE 2—Kazuya Yonemoto, "CCD/CMOS Sensor no Kiso to Ohyo" ("Basic and Applied CCD/CMOS Sensor", CQ Publishing Co., Ltd., Aug. 10, 2003, the first edition p 201-203

REFERENCE 3—Toshifumi Imamura, Yoshiko Yamamoto, "3. Kosoku/Kino CMOS Image Sensor no Kenkyu" ("Research on Fast/Functional CMOS Image Sensor", [online], [searched on Mar. 15, 2004], the Internet <URL:http://www.sankaken.gr.jp/project/iwataPJ/report/h12/h12index.html>

REFERENCE 4—Toshifumi Imamura, Yoshiko Yamamoto, Naoya Hasegawa, "3. Kosoku/Kino CMOS Image Sensor no Kenkyu" ("Research on Fast/Functional CMOS Image Sensor", [online], [searched on Mar. 15, 2004], the Internet <URL:http://www.sankaken.gr.jp/project/iwataPJ/report/h14/h14index.html>

REFERENCE 5—Oh-Bong Kwon et al., "A Novel Double Slope Analog-to-Digital Converter for a High-Quality 640×480 CMOS Imaging System", VL3-03 1999 IEEE p 335-338

REFERENCE 6—Japanese Unexamined Patent Application Publication No. 11-331883

REFERENCE 7—Japanese Unexamined Patent Application Publication No. 2001-268451

Various types of processing are executed on pixel signals output from the pixels to generate high-quality images or to use the pixel signals for special applications. For example, References 4 and 5 referred to above disclose the following mechanism for detecting edges. Currents from a plurality of pixels for detecting light are simultaneously output to an output bus and are added or subtracted on the output bus. Then, the resulting currents are converted into pulse width signals having a magnitude in the time axis, and the pulse width signals are AD-converted by counting the numbers of clocks of the pulse widths of the pulse width signals in counter circuits disposed vertically in parallel with each other, thereby converting the addition/subtraction result into digital data.

Reference 7 referred to above discloses a mechanism for detecting a moving part by generating the difference between pixel signals obtained at different time points in an analog area and by converting the difference into digital data (for example, binary values).

Reference 8 below discloses the following mechanism. By using the capacity within a pixel as an inter-pixel memory, signal charge detected by a photodiode is temporarily stored in the inter-pixel memory and is then read, thereby implementing an electronic shutter. Reference 9 below discloses the following mechanism. By using the capacity within a pixel as the inter-pixel memory, the previous frame signal is stored and is added to the current frame signal in the pixel, thereby increasing the dynamic range, performing edge processing, or detecting a moving part.

REFERENCE 8—Chye Huat Aw, Bruce A. Wooley, "FA11, 2: A 128×128 Pixel Standard-CMOS Image Sensor with Electronic Shutter", ISSCC96/SESSION11/ELECTRONIC IMAGING CIRCUITS/PAPER FA11.2, 1996 ISSCC Digest of Technical Papers, pp 180-182

REFERENCE 9—Yoshinori Muramatsu et al., "A signal-Processing CMOS Image Sensor Using a Simple Analog Operation", IEEE JOURNAL OF SOLID-STATE CIRCUITS, VOL. 38, NO. 1, JANUARY 2003

As disclosed in References 4-5 and 7-9 above, in the arrangement of circuits for performing the above-described types of processing, a processing function for performing various types of processing, such as an addition/subtraction function, is disposed on the image sensor (such a technique is referred to as the "on-chip method"). In particular, it is considered that a so-called "column parallel system" structure in which a signal processor is disposed in each vertical column for reading pixel signals from the pixel portion is suitable for the on-chip method.

In the known mechanisms for performing the above-described processing, only the computed signals are output from the solid state imaging device, and thus, video signals that should be output from the solid state imaging device cannot be obtained together with the computed signals.

As a mechanism for solving this problem, for example, Reference 10 below discloses a motion detecting solid state imaging device in which a structure for detecting only a moving part of a subject is disposed in the solid state imaging device and a signal representing the moving part and the corresponding video signal can be simultaneously output.

REFERENCE 10—Japanese Unexamined Patent Application Publication No. 11-8805

However, in the mechanism disclosed in Reference 3 identified above, when outputting the signal representing the moving part to the outside the solid state imaging device, it is necessary that the signal be subjected to time difference processing before being converted into digital data, and thus, both the time difference processing function in the analog area and the AD conversion function of converting the analog-processed signal into digital data are required.

Additionally, in the mechanism disclosed in Reference 10 identified above, when converting the time-difference-processed signal is converted into digital data, it is converted into binary data. Thus, when conducting adaptive processing outside the solid state imaging device, the flexibility to handle the data is lower than that to handle data in multi levels.

SUMMARY OF THE INVENTION

In view of the above-described circumstances, it is an object of the present invention to provide a simpler mechanism that allows computed data to be output, together with video signals, as multi-level digital data.

According to one embodiment of the present invention, a data processing method according to the present invention is a method for obtaining digital data representing a product-sum operation result for a plurality of signals is disclosed. In this method, by using digital data for one of the plurality of signals as the initial value for a counting operation, an electric signal corresponding to the other signal of the plurality of signals is compared with a reference signal for obtaining digital data for the other signal.

Then, simultaneously with the comparison processing, the counting operation is performed in one of the down-counting mode and the up-counting mode, and the count value when the comparison processing is finished is stored. Then, the stored count value is output at a predetermined timing as computed data.

Additionally, simultaneously with the generation and output of the computed data, normal data is generated and output based on one of the plurality of signals.

According to an another embodiment of the present invention, there is provided the semiconductor device or the electronic apparatus includes a computed data processor having a comparator for comparing a plurality of analog signals to be processed with a reference signal for converting the analog signals into digital data, a counter for performing a counting operation in one of a down-counting mode and an up-counting mode by using digital data for one of the plurality of analog signals as an initial value for the counting operation while the comparison processing by the comparator is being performed, and for storing a count value when the comparison processing performed by the comparator is finished, and a readout controller for reading out the count value stored in the counter at a predetermined timing as computed data. The semiconductor device or the electronic apparatus also includes a normal data processor for generating and outputting normal data based on one of the plurality of signals to be processed.

Preferably, the semiconductor device or the electronic apparatus may include a reference signal generator for generating a reference signal for converting analog signals into digital data and supplying the digital data to the comparator, and a controller for controlling the mode of the counting operation in the counter.

The counter may be formed of a common counter circuit that can switch the up-counting mode and the down-counting mode. Alternatively, the counter may be formed of a down counter circuit for performing the counting operation in the down-counting mode and an up counter circuit for performing the counting operation in the up-counting mode. The second type of counter may include an addition circuit for computing the sum of the count value stored in the down counter circuit and the count value stored in the up counter circuit.

The semiconductor device of the present invention may include a plurality of signal processors, each having an AD conversion function formed of a comparator and a counter, in the column direction of the unit elements.

The comparators may read analog unit signals generated by the unit signal generators and output in the column direction for each row, and the comparators and the counters may perform the corresponding operations assigned to the comparators and the counters for each unit element for each row. The unit signal generator may have an amplifying semiconductor device.

If the charge generator has a photoelectric conversion device for receiving light as electromagnetic waves and for generating charge corresponding to the received light, the semiconductor device may be formed as a solid state imaging device for capturing optical images.

If the semiconductor device is provided with a color separation filter for performing color imaging, the positions of the individual unit elements may be specified based on the arrangement of the color filters forming the color separation filter so that the plurality of signals to be subjected to the product-sum operation have the same color filter.

BRIEF DESCRIPTION OF THE DRAWINGS

FIG. 11 is a schematic diagram illustrating a CMOS solid state imaging device according to a third embodiment of the present invention.

FIG. 13 is a timing chart illustrating the operation for driving the unit pixels in the third embodiment shown in FIG. 11.

DESCRIPTION OF THE PREFERRED EMBODIMENTS

Embodiments of the present invention are described in detail below with reference to the drawings. In the following description, CMOS imaging devices, which are one type of X-Y address solid-state imaging devices, are used. It should be assumed that all the CMOS imaging devices are NMOS or PMOS.

However, the use of CMOS imaging devices is an example only, and devices used in the present invention are not restricted to MOS imaging devices. The following embodiments can be similarly applied to all semiconductor devices for detecting the physical quantity distribution, in which a plurality of unit elements responsive to electromagnetic waves, such as light or radiation, input from an externally source, are disposed in a line or matrix.

First Embodiment

Configuration of Solid State Imaging Device

Figure 1:
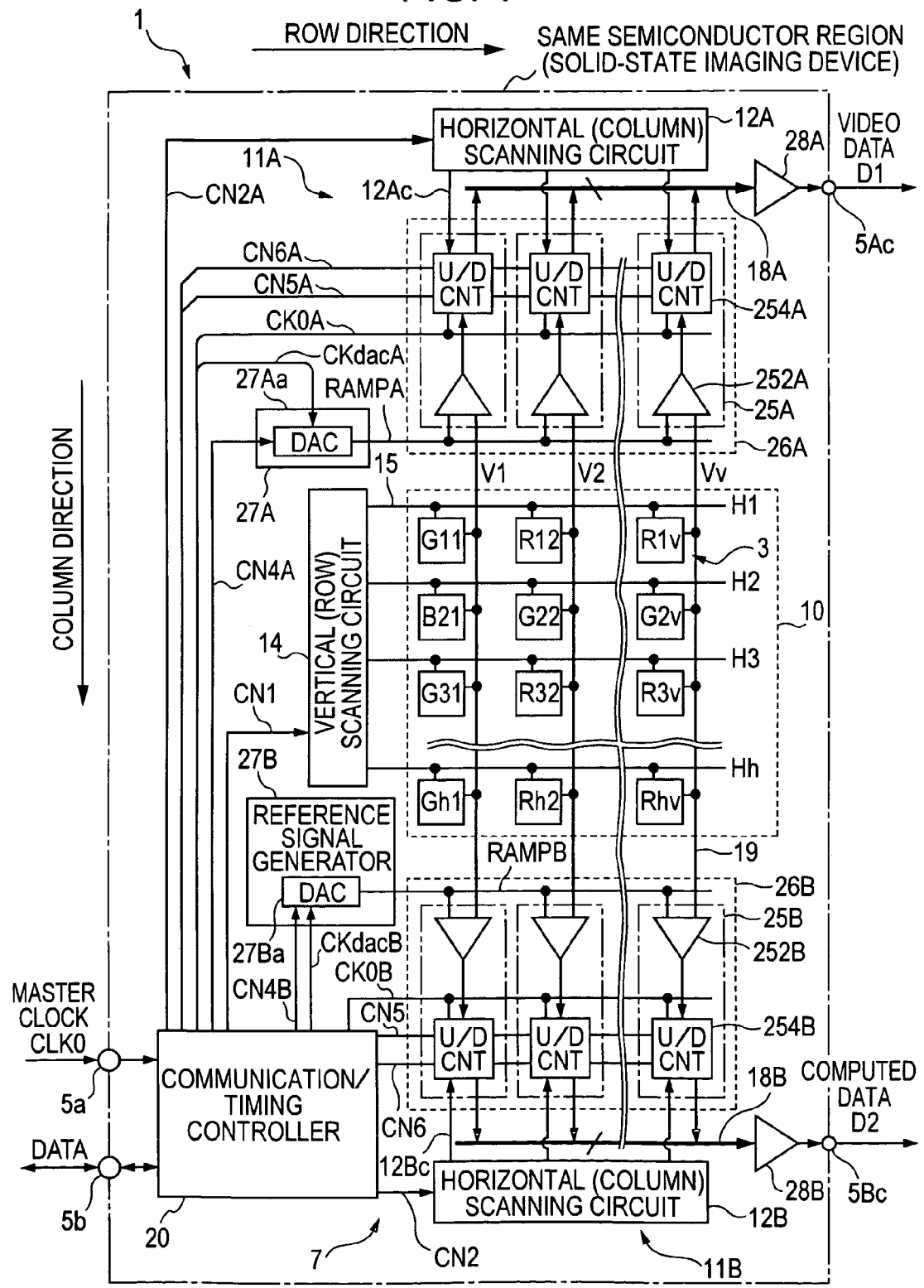
FIG. 1 is a schematic diagram illustrating a CMOS solid state imaging device, in accordance with a first embodiment of the present invention.

FIG. 1 is a schematic diagram illustrating a CMOS solid state imaging device (CMOS image sensor), in accordance with a first embodiment of the present invention. The CMOS solid state imaging device is also one aspect of an electronic apparatus according to the present invention.

A solid state imaging device 1 includes a pixel portion in which a plurality of pixels including photoelectric conversion devices (one example of a charge generator), such as photodiodes, for outputting an electric signal in accordance with the quantity of incident light are disposed in rows and columns (i.e., in a two-dimensional matrix), a signal output from each pixel being a voltage signal. Data processors, such as CDS (Correlated Double Sampling) processing functions and digital converters (ADC; Analog Digital Converters), are disposed in the individual columns in parallel with each other.

This means that a plurality of CDS processing functions and digital converters are provided for vertical signal lines 19 in vertical columns substantially in parallel with each other. A typical example in which CDS processing functions and digital converters are provided vertically in parallel with each other is a column-type imaging sensor. In this type of imaging sensor, CDS processing functions and digital converters are disposed vertically in parallel with each other in a column area disposed at the output side of the imaging portion, and signals are sequentially read out to the output side. Alternatively, the imaging portion having another form may be used. For example, one CDS processing function and one digital converter may be assigned to a plurality of (for example, two) adjacent vertical signal lines 19, or one CDS processing function and one digital converter may be assigned to N vertical signal lines 19 (vertical columns) in N other lines (N is a positive integer).

In any of the forms other than the column type, since one CDS processing function and one digital converter are used for a plurality of vertical signal lines 19 (vertical columns), a switch circuit (switch) is provided for supplying pixel signals for a plurality of columns of signal lines 19 from a pixel portion 10 to one CDS processing function or one digital converter. A memory for storing output signals may be required depending on the processing of the subsequent stage.

By assigning one CDS processing function and one digital converter to a plurality of vertical signal lines 19 (vertical columns), signal processing can be performed on pixel signals after being read from the pixel columns. Accordingly, compared to when similar image processing is performed on a pixel signal in each unit pixel, the configuration of each unit pixel can be simplified, and a multi-pixel, smaller, and less expensive image sensor can be implemented.

Additionally, a plurality of signal processors disposed vertically in parallel with each other can simultaneously process one row of pixel signals. Accordingly, compared to when processing is performed by one CDS processing function and one digital converter in an output circuit or outside the device, the signal processors can be operated at a lower speed, which is more advantageous in terms of the power consumption, the band performance, and noise. In other words, when the power consumption and the band performance are the same, a higher operation in the overall sensor can be implemented.

The column-type imaging sensor, which can operate at a lower speed, is advantageous in terms of the power consumption, the band performance, or noise, and is also advantageous in that a switch circuit (switch) is not required. In the following embodiments, it should be assumed that the column-type imaging sensor is used unless otherwise stated.

The solid state imaging device 1 of the first embodiment includes, as shown in FIG. 1, the pixel portion (imaging portion) 10 in which a plurality of generally square unit pixels 3 are disposed in rows and columns (i.e., in a square lattice), a driving controller 7, a column processor 26, a reference signal generator 27 for supplying an AD-conversion reference signal to the column processor 26, and an output circuit 28 which are disposed outside the pixel portion 10.

On the light-receiving surface for receiving electromagnetic waves (in this embodiment, light) of each charge generator (such as a photodiode) of the pixel portion 10, one of a plurality of color filters forming a color separation filter for performing color imaging is disposed. In the example shown in FIG. 1, basic color filters having a so-called Bayer arrangement are used, and the unit pixels 3 disposed in a square lattice are disposed in association with three red (R), green (G), and blue (B) color filters (primary color filters) to form the pixel portion 10. If monochromatic imaging is performed, a color separation filter is not provided.

If necessary, before or after the column processor 26, an AGC (Auto Gain Control) circuit having a signal amplifying function may be disposed in the same semiconductor region in which the column processor 26 is disposed. If AGC is performed before the column processor 26, analog amplification is conducted, and if AGC is performed after the column processor 26, digital amplification is conducted. If n-bit digital data is directly amplified, the grayscale may be impaired. It is thus preferable that analog amplification is conducted on a signal before performing digital conversion.

In the configuration unique to this embodiment, horizontal scanning circuits 12, the column processors 26, and the reference signal generators 27 are disposed in two blocks. When the device is viewed from the top, those functional components are disposed at one edge (the output side at the bottom in FIG. 1) and the other edge (at the top in FIG. 1) across the pixel portion 10.

A normal data processor 11A disposed on the top side in FIG. 1 is a block for generating and outputting normal video data based on one of a plurality of signals used in the product-sum operation. A computed data processor 11B disposed on the bottom side in FIG. 1 is a block for generating and outputting digital data, which serves as a product-sum operation result, based on a plurality of pixel signals to be processed. The functional components belonging to each of the data processors 11A and 11B can be operated independently of each other.

If a description is given for each of the individual blocks (data processors), sub-reference signs A and B are added to the horizontal scanning circuit 12, the column processor 26, and the reference signal generator 27. If the same description is given for the two blocks, the sub-reference signs A and B are not added.

The driving controller 7 is provided with control circuit functions of sequentially reading signals from the pixel portion 10. For example, the driving controller 7 includes the horizontal scanning circuit (column scanning circuit) 12 for controlling column addressing or column scanning, a vertical scanning circuit 14 (row scanning circuit) for controlling row addressing and row scanning, and a communication/timing controller 20 having a function of, for example, generating an internal clock.

Although it is not shown, as an example of a high-speed clock generator, a clock converter for generating pulses having a clock frequency higher than an input clock frequency may be disposed. The communication/timing controller 20 generates the internal clock based on an input clock (master clock) CLK0 input via a terminal 5a and a high-speed clock generated in the clock converter.

By using a signal based on the high-speed clock generated in the clock converter, AD conversion processing can be operated at a high speed. By using the high-speed clock, motion extraction or compression processing requiring fast calculations can be performed. Additionally, parallel data output from the column processor 26 can be converted into serial data so that video data D1 is output to the outside the apparatus 1. With this configuration, the fast operation can be implemented with the number of terminals smaller than the number of bits of AD-converted digital data.

The clock converter (not shown) has a built-in multiplier circuit for generating pulses having a clock frequency higher than the input clock frequency. This clock converter receives a low-speed clock CLK2 from the communication/timing controller 20, and generates a clock having a frequency at least twice as high as the low-speed clock CLK2 based on the low-speed clock CLK2. As the multiplier circuit of the clock converter, a k1 multiplier circuit can be provided when k1 is the factor of the frequency of the low-speed clock CLK2, and various known circuits can be used.

Although some of the rows and columns are not shown in FIG. 1 for simple representation, in actuality, several tens of to several thousands pixel units 3 are disposed in each row or each column in the pixel portion 10. Typically, the pixel unit 3 is formed of a photodiode as a light-receiving device (charge generator) and an inter-pixel amplifier having an amplifying semiconductor device (for example, a transistor).

As the inter-pixel amplifier, for example, a floating diffusion amplifier can be used. For example, for the charge generator having a photoelectric conversion device, such as a photodiode, an inter-pixel amplifier having four transistors, which are generally used in a CMOS sensor, such as a readout selection transistor, which is an example of a charge reader (transfer gate/readout gate), a reset transistor, which is an example of a reset gate, a vertical selecting transistor, and a source-follower amplifying transistor, which is an example of a detector device for detecting a change in the potential of the floating diffusion, can be used.

Alternatively, as disclosed in U.S. Pat. No. 2,708,455, an inter-pixel amplifier having three transistors, such as an amplifying transistor connected to a drain line (DRN) so as to amplify a signal voltage in accordance with signal charge generated by the charge generator, a reset transistor for resetting the charge generator, and a readout selection transistor (transfer gate) which is scanned by a vertical shift register via a transfer line (TRF), may be used.

As the other elements forming the driving controller 7, the horizontal scanning circuit 12, the vertical scanning circuit 14, and the communication/timing controller 20 are disposed. The horizontal scanning circuit 12 has a readout scanning function of reading count values from the column processor 26. Those elements forming the driving controller 7 are integrally formed, with the pixel portion 10, on a semiconductor region, such as a monocrystal silicon, by using a technique similar to a semiconductor integrated circuit manufacturing technique, thereby forming a solid-state imaging device (imaging apparatus), which is an example of a semiconductor system.

The pixel units 3 are connected to the vertical scanning circuit 14 via row control lines 15 for selecting rows and are also connected via the vertical signal lines 19 to the column processor 26 in which a column AD circuit 25 is provided for each vertical column. The row control lines 15 represent the overall wiring from the vertical scanning circuit 14 to the pixels.

In this embodiment, the column AD circuit 25B disposed in the computed data processor 11B has a data processing function of obtaining digital data by itself, which is a product-sum operation result of a plurality of signals.

Each of the horizontal scanning circuit 12 and the vertical scanning circuit 14 has a decoder, which is described below, and starts reading pixel signals to be processed in response to control signals CN1 and CN2 supplied from the communication/timing controller 20. Accordingly, various pulse signals (for example, a reset pulse RST, a transfer pulse TRF, and a DRN control pulse DRN) for driving the unit pixels 3 are contained in the row control lines 15.

In this embodiment, the communication/timing controller 20 and the vertical scanning circuit 14 form a unit-signal selecting controller that specifies the positions of a plurality of unit pixels 3 subjected to product-sum operation processing and that inputs a plurality of pixel signals into the column processor 26B from the specified unit pixels 3.

Although it is not shown, the communication/timing controller 20 has a functional block of a timing generator TG (an example of a readout address control device) for supplying clocks required for the operations of the individual elements and predetermined-timing pulse signals and a functional block of a communication interface for receiving the master clock CKL0 via the terminal 5a and receiving data DATA indicating the operation mode via a terminal 5b and also for outputting data containing information concerning the solid state imaging device 1. For example, the communication/timing controller 20 outputs a horizontal address signal to a horizontal decoder and a vertical address signal to a vertical decoder, and each decoder receives the corresponding address signal to select the corresponding column or row.

In this case, since the pixel units 3 are disposed in a two-dimensional matrix, fast reading of the pixel signals and pixel data is preferably performed in the following manner. Vertical scanning is performed such that analog pixel signals generated by pixel signal generators 5 and output in the column direction via the vertical signal lines 19 are accessed and read in units of rows, and then, horizontal scanning is performed such that pixel signals (in this embodiment, digital pixel data) are accessed in the row direction and are read out to the output side. The reading of the pixel signals and pixel data is not restricted to scanning, and random access may be performed by directly addressing the unit pixels 3 to be read out and by reading information only concerning the required unit pixels 3.

The communication/timing controller 20 in the first embodiment supplies a clock CLK1 having the same frequency as the master clock CLK0 input via the terminal 5a and a low-speed clock which is scaled down to a half of the clock CLK1 or lower to the elements, such as the horizontal scanning circuit 12, the vertical scanning circuit 14, and the column processor 26. The clocks scaled down to a half of the master clock or lower are hereinafter referred to as the "low-speed clock CLK2".

The vertical scanning circuit 14 selects rows of the pixel portion 10 and supplies required pulses to the selected rows. For example, although it is not shown, the vertical scanning circuit 14 includes a vertical decoder for defining rows of the pixel portion 10 to be read and a vertical driving circuit for driving the read rows by supplying pulses to the row control lines 15 corresponding to the unit pixels 3 at the readout addresses (rows) defined by the vertical decoder. The vertical decoder selects, not only rows from which signals are read out, but also a row used for an electronic shutter.

The horizontal scanning circuit 12 sequentially selects the column AD circuits 25 of the column processor 26 in synchronization with the low-speed clock CLK2, and outputs the corresponding signals to a horizontal signal line (horizontal output line) 18. Although it is now shown, the horizontal scanning circuit 12 includes a horizontal decoder for defining columns to be read (column AD circuits 25 within the column processor 26) and a horizontal driving circuit for outputting the signals of the column processor 26 to the horizontal signal line 18 according to the readout addresses defined by the horizontal decoder. If the number of bits handled by the column AD circuits 25 is n (n is a positive integer), for example, 10 (=n) bits, the horizontal signal line 18 includes 10 lines.

In the solid state imaging device 1 configured as described above, the pixel signals output from the unit pixels 3 of each vertical column are supplied via the vertical signal line 19 to the corresponding column AD circuits 25 of the column processor 26 in the normal data processor 11A and the computed data processor 11B.

On the signal path between the column processor 26 and the horizontal scanning circuit 12, a load transistor portion containing load MOS transistors (not shown) whose drain terminals are connected to the corresponding vertical signal lines 19 is disposed, and a load controller (load MOS controller) for controlling the driving of the load MOS transistors is provided.

The amplifying transistor forming the pixel unit 3 is connected to the corresponding vertical signal line 19, and the vertical signal line 19 is connected to the drain of the load MOS transistor in each vertical column, and a load control signal CTld from the load controller is input into the gate terminals of all the load MOS transistors. When the signals are read out, a predetermined constant current continues to flow by the load MOS transistors connected to the corresponding amplifying transistors.

Each column AD circuit 25A of the column processor 26A in the normal data processor 11A sequentially receives the pixel signals for one column and processes the signals. Each column AD circuit 25A has, for example, an ADC (Analog Digital Converter) circuit for converting an analog signal into, for example, 10-bit digital data, by using the low-speed clock CLK2.

Each column AD circuit 25B of the column processor 26B in the computed data processor 11B sequentially receives a plurality of pixel signals to be subjected to a product-sum operation (which are not necessarily in the same vertical column) at the pixel positions designated by the unit-signal selecting controller, which functions by the operations of the communication/timing generator 20 and the vertical scanning circuit 14, and performs a product-sum operation based on the plurality of pixel signals. The column AD circuit 25B also converts the resulting value into digital data. Each column AD circuit 25B has, for example, an ADC (Analog Digital Converter) circuit having an operation function for performing a product-sum operation and for converting an analog signal into, for example, 10-bit digital data, based on the low-speed clock CLK2.

Details of the configuration of the ADC circuit are given below. AD conversion is performed as follows. A ramp reference signal (reference voltage) RAMP is supplied to a comparator (voltage comparator), and at the same time, counting with a clock signal is started. Counting is continued until a pulse signal is obtained by comparing an analog pixel signal input via the vertical signal line 19 with the reference signal RAMP.

In this case, by modifying the circuit configuration, in addition to AD conversion, for a voltage-mode pixel signal input via the vertical signal line 19, the difference between the signal level (noise level) immediately after resetting the pixels and the true signal level Vsig based on the quantity of the received light can be taken. With this arrangement, noise signal components, such as fixed pattern noise (FPN) or reset noise, can be eliminated.

The pixel data digitized in the column AD circuit 25 is transferred to the horizontal signal line 18 via a horizontal select switch (not shown) driven by a horizontal selection signal supplied from the horizontal scanning circuit 12, and is output to the output circuit 28. The 10-bit digital data is an example only, and the number of bits may be smaller than 10 (for example, 8 bits) or larger than 10 (for example, 14 bits).

With the above-described configuration, from the pixel portion 10 in which light-receiving devices (photoelectric conversion devices, such as photodiodes) as the charge generators are disposed in rows and columns, pixel signals are sequentially output from the individual columns. Then, one image corresponding to the pixel portion 10 in which light-receiving devices are disposed in rows and columns, i.e., a frame image, is represented by a set of pixel signals of the overall pixel portion 10.

Details of Column AD Circuit and Reference Signal Generator

The reference signal generator 27 includes a DA conversion circuit (DAC; Digital Analog Converter) 27a. The DA conversion circuit 27a generates a stepped-ramp saw tooth wave (ramp waveform) from the initial value represented by control data CN4 supplied from the communication/timing controller 20 in synchronization with a count clock CKdac from the communication/timing controller 20, and supplies the generated saw tooth wave to the individual column AD circuits 25 of the column processor 26 as the AD conversion reference signal (ADC reference signal) RAMP. A noise-suppressing filter may be disposed, though it is not shown in FIG. 1.

A stepped-ramp saw tooth wave generated based on a high-speed clock supplied from a clock converter 23, for example, a multiplied clock generated in a multiplier circuit, can be changed at a higher speed than when the saw tooth wave is generated based on the master clock CLK0 input via the terminal 5a.

The control data CN4 supplied from the communication/timing controller 20 to the DA conversion circuit 27a of the reference signal generator 27 contains information indicating the gradient (the degree by which the voltage is changed; the amount by which the voltage is changed with respect to the time) of the ramp voltage for each comparison processing. More specifically, the amount by which the voltage is changed for each counting operation is set, and the count value is changed per unit time (count clock CKdac).

For example, the DA conversion circuit 27a reduces the voltage (for example, 3.0 V) indicating the initial value contained in the control data CN4 by $\Delta$RAMP for each count clock CKdac. By adjusting the cycle of the count clock CKdac, the gradient of the voltage can be changed. For example, if a clock scaled down to 1/m with respect to the reference clock is used, the gradient becomes 1/m. If the count clock CK0 used in counters 254 is the same, the count value becomes as large as m times for the same pixel voltage. That is, m can be set as the coefficient. By changing the gradient of the reference signal RAMP, the coefficient of the product-sum operation, which is described below, can be adjusted.

Alternatively, another type of circuit may be used. For example, when the output value of the counter 254 is x and when the gradient (rate of change) of the ramp voltage contained in the control data CN4 is $\beta$ while the cycle of the count clock CKdac supplied to the reference signal generator 27 is fixed, the potential calculated by $y=\alpha$ (initial value)$-\beta^*x$ is output. In this manner, according to the information indicating the gradient (rate of change) of the ramp voltage contained in the control data CN4, a change in the voltage $\Delta$RAMP ($=\beta$) for each count clock CKdac can be adjusted.

For the signal difference processing to determine the difference between the reference signal level and the true signal component level of the same pixel signal to be processed, it is preferable that the levels of the absolute values of the gradients (rate of change) of the ramp voltages used for comparison processing be set to be the same.

If the spatial difference processing or the temporal difference processing for the signal difference processing is performed on a plurality of signals (in this embodiment, pixel signals) to be processed, the levels of the absolute values of the gradients (rates of change) of the ramp voltages for the processing subject signals may be set to be the same or may be set to be different.

By setting the levels of the absolute values of the gradient (rate of change) to be different, the function of finding the sum (with a sign) of the pixel signals (more specifically, true signal components) supplied from the unit pixels 3 after being multiplied with the coefficient, i.e., the product-sum operation, can be implemented. In this case, if the spatial difference processing or the temporal difference processing is performed on three or more pixel signals, the number of pixels to be compared with the ramp voltage having the same absolute value of the gradient (rate of change) and the number of pixels to be compared with the ramp voltage having different absolute values of the gradients may be selected in a desired manner.

As the configuration (not shown) to differentiate the levels of the absolute values of the gradients (rates of change), the following types of desired circuits may be used. The count clock for generating the reference signal RAMP (ADC reference signal) is supplied from the communication/timing controller 20 to the reference signal generator 27 as the DAC count clock CKdac, independently of the count clock CK0 used in the counters 254, and the cycle (frequency) of the count clock CKdac is adjusted for each row, thereby supplying reference signals RAMP, which are different for the individual rows, to voltage comparators 252. Alternatively, according to the information indicating the gradient (rate of change) of the ramp voltage contained in the control data CN4, a change in the voltage ΔRAMP for each count clock CKdac is adjusted while fixing the cycle of the count clock CKdac supplied to the reference signal generator 27.

The column AD circuit 25 includes the voltage comparator 252 for comparing the reference signal RAMP generated in the DA conversion circuit 27a of the reference signal generator 27 with an analog pixel signal supplied from the unit pixels 3 of the row control lines 15 (H0, H1, ... ) via the vertical signal line 19 (V0, V1, ... ). The column AD circuit 25 also includes the counter 254 for counting the time until the voltage comparator 252 finishes the comparison processing and for storing the counting result. That is, the column AD circuit 25 has an n-bit AD conversion function.

The communication/timing controller 20 has a function of controlling the count mode to be used in the counter 254 according to whether the reset component ΔV or the signal component Vsig of the pixel signal is used for comparison processing in the voltage comparator 252. A mode control signal CN5 for designating whether the counter 254 is operated in a down-counting mode or an up-counting mode and a reset control signal CN6 for resetting the count value stored in the counter 254 to the initial value are input from the communication/timing generator 20 into the counter 254 of each column AD circuit 25.

The stepped-ramp reference signal RAMP generated in the reference signal generator 27 is input into one input terminal RAMP of each of the voltage comparators 252, and the other input terminals of the voltage comparators 252 are connected to the corresponding vertical signal lines 19 and receive the pixel signal voltages from the pixel portion 10. The output signals from the voltage comparators 252 are supplied to the corresponding counters 254.

The count clock CK0 is input from the communication/timing controller 20 to the clock terminals CK of the counters 254.

Although the configuration of the counter 254 is not shown, the counter 254 can be implemented by changing the wiring arrangement of a data storage unit 255 formed of latches into a synchronous counter, and the internal counting is performed by receiving one count clock CK0. As in the stepped voltage waveform, the count clock CK0 can also be generated based on a high-speed clock (for example, a multiplied clock) from the clock converter 23 so that it is operated faster than the master clock CLK0 input via the terminal 5a.

The n-bit counter 254 can be implemented by a combination of n latches, and the circuit scale can be reduced to one half of the circuit scale of the data storage unit 255 formed of two blocks, each having n latches, as that disclosed in Reference 1 identified above. Additionally, the provision of a counter 24 is not necessary, and the overall configuration becomes much smaller than that disclosed in Reference 1 above.

Although details of the configuration of the counters 254 of the first embodiment are given below, the main feature of the counters 254 is as follows. By the use of the common up/down counter (U/D CNT) regardless of the count mode, counting can be performed on the same pixel signal or a plurality of pixel signals having the same physical properties by switching between the down-counting operation and the up-counting operation.

The counters 254 are configured so that they can detect the overflow of counting or process the positive and negative signs (±). For example, by using known art, for example, by adding an overflow surplus bit or using a carry bit or a borrow bit, the overflow or sign processing can be easily handled.

A pixel signal output from the unit pixel 3 contains, not only true, effective signal components, but also reset components. Time-sequentially, the reset components (reference components) first appear, followed by the true, effective signal components superposed on the reset components. The difference between the reset components and the true, effective signal components superposed on the reset components is the true, effective signal components.

Accordingly, to obtain digital data of the true, effective signal components Vsig for a pixel signal, when conducting AD conversion on the same pixel signal Vx by performing counting on the reference components (reset components ΔV) and the true signal components, digital data obtained for one of the reference components and the true signal components (generally, the reset components) is used as the initial value for the counting operation on the other components (generally, the signal components). With this arrangement, after conducting AD conversion by the counting operation on the other components, digital data, which is the difference between the two components, can be automatically obtained. That is, the difference between the reference components and the signal components of an analog signal can be converted into digital data. The switching of the operation processing modes can be implemented by adjusting the scanning patterns of the horizontal scanning circuit 12 and the vertical scanning circuit 14 under the control of the communication/timing controller 20.

In the column AD circuit 25B of the computed data processor 113, the counting operation is repeatedly performed on a plurality of different pixel signals (for example, pixel signals having different pixel positions or pixel signals which are the same in the pixel position and are different in the imaging time) having the same physical properties by the same combination of the count modes, thereby implementing the addition operation for a plurality of pixel signals. Also in the column AD circuit 25B, the counting operation is repeatedly performed on the plurality of different pixel signals by changing the combination of the count modes (more specifically, by reversing the combination), thereby implementing the difference (subtraction) operation for a plurality of pixel signals. The switching of the operation processing modes can be implemented by adjusting the scanning patterns of the horizontal scanning circuit 12B and the vertical scanning circuit 14 under the control of the communication/timing controller 20.

For example, in the counter 254B, when conducting AD conversion by performing the counting operation for each of the pixel signals of the plurality of unit pixels 3, digital data obtained for one of the pixel signals is used as the initial value for the counting operation for the other pixel signal (the signal to be subjected to the second counting operation). As a result, after conducting AD conversion by performing the counting operation for the other pixel signal, digital data as a result of performing the product-sum operation for the two pixel signals can be automatically obtained.

In this case, by the use of the same count modes, the resulting count value obtained by the second counting operation is digital data as a result of adding the pixel signals (more specifically, the true signal components) of the plurality of unit pixels 3. In contrast, by the use of different count modes (opposite modes), the count value obtained by the second counting operation is digital data as a result of performing subtraction on the pixel signals of the plurality of pixel signals 3. If three or more pixels are processed, the above-described operations may be combined, in which case, the function of finding the sum with a sign for the pixel signals (more specifically, the true signal components) from the unit pixels 3, i.e., the product-sum operation, can be implemented.

As the counter 254 of the first embodiment, a synchronous counter for outputting count output values in synchronization with the count clock CK0 is used. In the case of the synchronous counter, the operations of all the flip-flops (counter basic elements) are restricted by the count clock CK0. Thus, if a higher frequency operation is required, the use of an asynchronous counter suitable for the fast operation is preferable since the operation limit frequency is determined only by the limit frequency of the first flip-flop (counter basic element).

A control pulse is input from the horizontal scanning circuit 12 into the counter 254 via a control signal 12c. The counter 254 has a latch function of latching a counting result, and latches the count output value until the control pulse is received via the control line 12c.

The column AD circuit 25 configured as described above is disposed for each vertical signal line 19 (V0, V1, . . . ) to form the column processor 26, which is a column-parallel structured ADC block.

The output sides of the column AD circuits 25 are connected to the horizontal signal line 18. As described above, the horizontal signal line 18 includes the same n number of signal lines as the n-bit column AD circuit 25, and the signal lines are connected to the output circuit 28 via n sensing circuits (not shown) corresponding to output lines.

With this configuration, during the pixel signal readout period, the column AD circuit 25 performs a counting operation and outputs the counting result at a predetermined timing. More specifically, the voltage comparator 252 first compares the ramp waveform voltage from the reference signal generator 27 with the pixel signal voltage input via the vertical signal line 19, and when the two voltages become equal to each other, the comparator output of the voltage comparator 252 is inverted (in this embodiment, from the H level to the L level).

The counter 254 has already started the counting operation in the down-counting mode or the up-counting mode in synchronization with the ramp waveform voltage input from the reference signal generator 27, and when receiving information indicating that the comparator output is inverted, the counter 254 stops the counting operation and latches (stores) the count value as pixel data, thereby completing AD conversion.

Thereafter, the counter 254 sequentially outputs the stored pixel data to the outside the column processor 26 or the outside the chip having the pixel portion 10 via an output terminal 5c based on the shift operation of horizontal selecting signals CH(i) input from the horizontal scanning circuit 12 via the control line 12c at a predetermined timing. That is, the communication/timing controller 20 and the horizontal scanning circuit 12 form a readout controller for reading out the count value stored in the counter 254 of the column AD circuit 25 as computed data at a predetermined timing.

Other various signal processing circuits may be contained in the elements forming the solid state imaging device 1, though they are not shown since they are not directly related to this embodiment.

First Embodiment

Signal Difference Processing Operation

Figure 2:
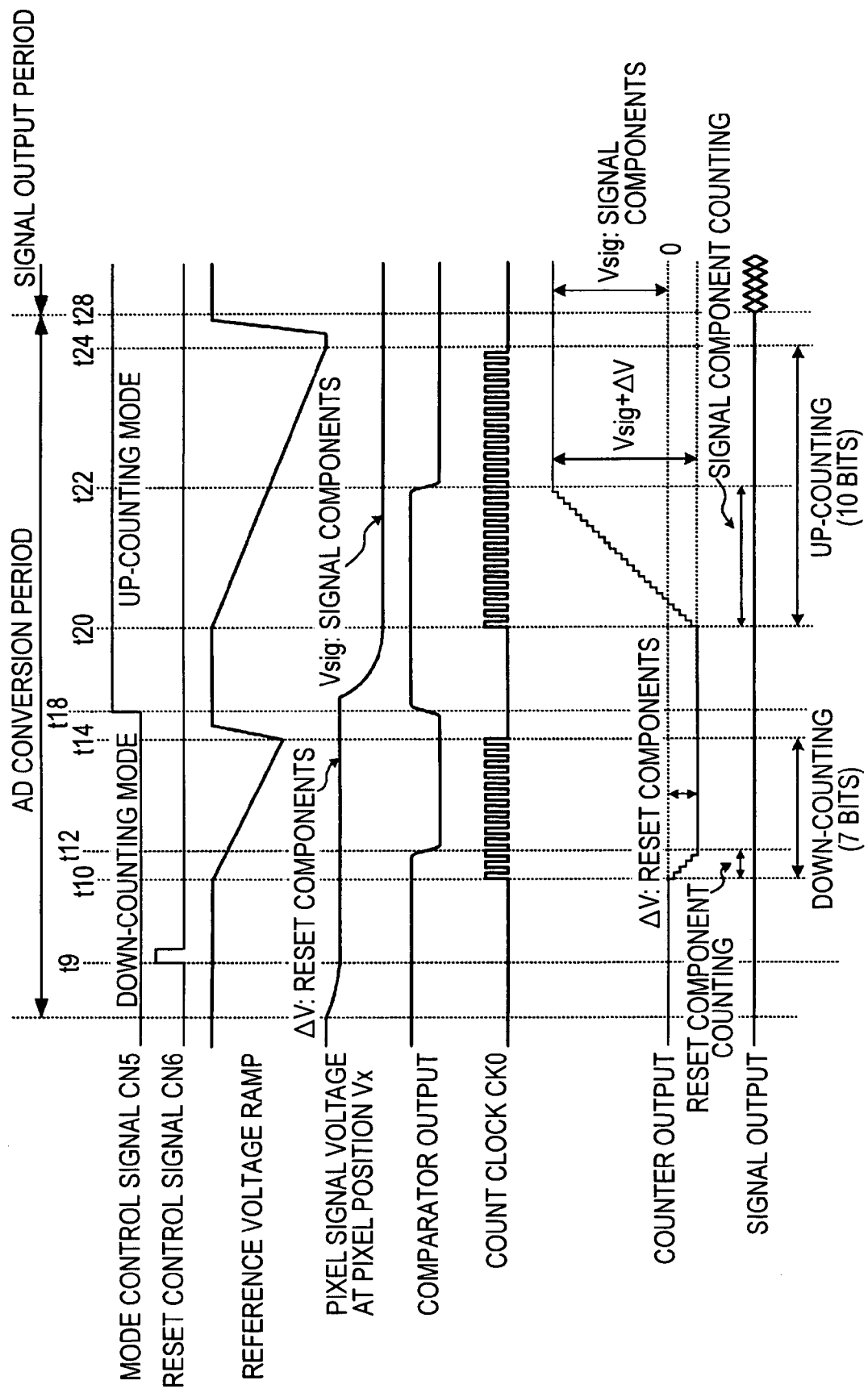
FIG. 2 is a timing chart illustrating the basic operation in column AD circuits of the solid state imaging device of the first embodiment shown in FIG. 1.

FIG. 2 is a timing chart illustrating the signal difference processing, which is the basic operation, in the column AD circuit 25 of the solid state imaging device 1 of the first embodiment shown in FIG. 1.

The mechanism for converting an analog pixel signal sensed in each pixel unit 3 of the pixel portion 10 into a digital signal is, for example, as follows. The time when the ramp waveform reference signal RAMP which is progressively reduced with a predetermined gradient becomes equal to the voltage of the reference components or the signal components of the pixel signal of the unit pixel 3 is searched, and the time from when the reference signal RAMP used for comparison processing is generated until when the electric signal corresponding to the reference components or the signal components of the pixel signal coincides with the reference signal is counted by the count clock, thereby obtaining the count value associated with the level of the reference components or the signal components.

For the pixel signal output from the vertical signal line 19, time-sequentially, the signal components Vsig appear after the reset components $\Delta V$, i.e., the reference components, containing noise of the pixel signal. If the first operation is performed on the reference components (reset components $\Delta V$), the second operation is performed on the signal obtained by adding the signal components Vsig to the reference components (reset components $\Delta V$). This operation is specifically discussed below.

For the first readout operation, the communication/timing controller 20 sets the mode control signal CN5 to the low level so that the counter 254 is set to be in the down-counting mode, and also sets the reset control signal CN6 to be active (in this embodiment, the high level) for a predetermined period so that the count value of the counter 254 is reset to the initial value 0 (t9). After the first readout operation for reading the pixel signals from selected rows Hx to the vertical signal line 19 (V0, V1, . . . ) is stabilized, the communication/timing controller 20 supplies the control data CN4 for generating the reference signal RAMP to the reference signal generator 27.

Upon receiving the control data CN4, the reference signal generator 27 outputs the stepped waveform (RAMP waveform) which is changed in the shape of a saw tooth wave (RAMP) over time to one input terminal RAMP of the voltage comparator 252 as the comparison voltage. The voltage comparator 252 compares the RAMP waveform comparison voltage with the pixel signal voltage of the selected vertical signal line 19 (Vx) supplied from the pixel portion 10.

Simultaneously with the input of the reference signal RAMP into the input terminal RAMP of the voltage comparator 252, to measure the comparison time in the voltage comparator 252 by the counter 254, the count clock CK0 is input from the communication/timing controller 20 into the clock terminal of the counter 254 in synchronization with the ramp waveform voltage output from the reference signal generator 27 (t10), and down-counting is started from the initial value 0 as the first counting operation. That is, the counting operation is started in the negative direction.

The voltage comparator 252 compares the ramp reference signal RAMP supplied from the reference signal generator 27 with the pixel signal voltage Vx input via the vertical signal line 19, and when the two voltages become equal to each other, the voltage comparator 252 inverts the comparator output from the H level to the L level (t12). That is, upon comparing the voltage signal corresponding to the reset components Vrst with the reference signal RAMP, the voltage comparator 252 generates an active-low (L) pulse signal after the lapse of the time corresponding to the level of the reset components Vrst, and supplies the generated pulse signal to the counter 254.

Upon receiving this result, the counter 254 stops the counting operation almost at the same time as the inversion of the comparator output, and latches (retains/stores) the corresponding count value as the pixel data, thereby completing AD conversion (t12). That is, the counter 254 starts down-counting simultaneously with the generation of the ramp reference signal RAMP to be supplied to the voltage comparator 252, and continues counting with the clock CK0 until the active-low (L) pulse signal is received as a result of comparison processing, thereby obtaining the count value corresponding to the level of the reset components Vrst.

After the lapse of a predetermined down-counting period (t14), the communication/timing controller 20 stops supplying the control data CN4 to the voltage comparator 252 and supplying the count clock CK0 to the counter 254. Then, the voltage comparator 252 stops generating the ramp reference signal RAMP.

In this first readout operation, since the counting operation is performed by detecting the reset level Vrst of the pixel signal voltage Vx by the voltage comparator 252, the reset components ΔV of the unit pixels 3 are read.

The reset components ΔV contain offset noise which varies depending on the unit pixel 3. Generally, however, a variation in the reset components ΔV is small, and the reset level Vrst is generally common for all the pixels. Accordingly, the output value of the reset components ΔV of the pixel signal voltage Vx of the selected vertical signal line 19 is generally known.

Accordingly, in the first readout operation for the reset components ΔV, by adjusting the RAMP voltage, the down-counting period (t10 to t14; comparison period) can be reduced. In this embodiment, comparison processing is performed for the reset components ΔV by setting the maximum period for the comparison processing to be a 7-bit count period (128 clocks).

Subsequently, in the second readout operation, in addition to the reset components ΔV, the electric signal components Vsig for each unit pixel 3 in accordance with the quantity of incident light are read, and an operation similar to the first readout operation is performed. More specifically, the communication/timing controller 20 first changes the mode control signal CN5 to the high level so that the counter 254 is set to be the up-counting mode (t18). Then, after the second readout operation for reading the signal components Vsig from the unit pixels 3 of the selected rows Hx to the vertical signal line 19 (V0, V1, . . . ) is stabilized, the communication/timing controller 20 supplies the control data CN4 for generating the reference signal RAMP to the reference signal generator 27.

Upon receiving the control data CN4, the reference signal generator 27 outputs the stepped waveform (RAMP waveform) which changes in the shape of a saw tooth (RAMP shape) over time to one input terminal RAMP of the voltage comparator 252 as the comparison voltage (t20). The voltage comparator 252 compares the RAMP waveform comparison voltage with the pixel signal voltage of the selected vertical signal line 19 (Vx) supplied from the pixel portion 10.

Simultaneously with the input of the reference signal RAMP into the input terminal RAMP of the voltage comparator 252, to measure the comparison time in the voltage comparator 252 by the counter 254, the count clock CK0 is input from the communication/timing controller 20 to the clock terminal of the counter 254 in synchronization with the ramp waveform supplied from the reference signal generator 27 (t20), and, in contrast to the first counting operation, in the second counting operation, the counter 254 starts up-counting from the count value corresponding to the reset components ΔV of the unit pixels 3 obtained in the first readout operation. That is, the counting operation is started in the positive direction.

The voltage comparator 252 compares the pixel signal voltage Vx input via the vertical signal line 19 with the ramp reference signal RAMP supplied from the reference signal generator 27, and when the two voltages become equal to each other, the voltage comparator 252 inverts the comparator output from the H level to the L level (t22). That is, upon comparing the voltage signal corresponding to the signal components Vsig with the reference signal RAMP, the voltage comparator 252 generates the active-low (L) pulse signal after the lapse of the time corresponding to the level of the signal components Vsig, and supplies the generated pulse signal to the counter 254.

Upon receiving this result, the counter 254 stops the counting operation almost at the same time as the inversion of the comparator output, and latches (retains/stores) the corresponding count value as the pixel data, thereby completing AD conversion (t22). That is, simultaneously with the generation of the ramp reference signal RAMP to be supplied to the voltage comparator 252, the counter 254 starts up-counting, and continues counting with the clock CK0 until the active-low (L) pulse signal is received as a result of comparison processing, thereby obtaining the count value corresponding to the level of the signal components Vsig.

After the lapse of a predetermined up-counting period (t24), the communication/timing controller 20 stops supplying the control data CN4 to the voltage comparator 252 and supplying the count clock CK0 to the counter 254. Then, the voltage comparator 252 stops generating the ramp reference signal RAMP.

In the second readout operation, since the counting operation is performed by detecting the signal components Vsig of the pixel signal voltage Vx by the voltage comparator 252, the signal components Vsig of the unit pixels 3 are read.

In this embodiment, as the counting operation by the counter 254, down-counting is performed during the first readout operation, and then, up-counting is performed during the second readout operation. Accordingly, the subtraction expressed by Equation 1 below is executed automatically in the counter 254, and the count value as a result of the subtraction is retained in the counter 254 as the n-bit digital value.

Equation 1:

$$(\text{Count value in the second comparison period}) - (\text{count value in the first comparison period}) \quad (1)$$

In this case, Equation 1 can be modified into Equation 2, and as a result, the count value retained in the counter 254 is the n-bit digital value corresponding to the signal components Vsig.

Equation 2:

$$(\text{Count value in the second comparison period}) - (\text{count value in the first comparison period}) = (\text{signal components } V\text{sig1} + \text{reset components } \Delta V1 + \text{offset components in the column } AD \text{ circuit } 25) - (\text{reset components } \Delta V1 + \text{offset components in the column } AD \text{ circuit } 25) = (\text{signal components } V\text{sig1}) \quad (2)$$

That is, as stated above, according to the difference processing in the counter 254 by the two readout operations and two counting operations, such as down-counting during the first readout operation and up-counting during the second readout operation, the reset components ΔV containing noise which varies depending on the unit pixel 3 and the offset components depending on the column AD circuit 25 can be eliminated, and only the electric signal components Vsig in accordance with the quantity of incident light in each pixel unit 3 can be extracted with a simple configuration. In this case, reset noise can also be advantageously eliminated.

Accordingly, the column AD circuit 25 in this embodiment serves as, not only a digital converter for converting an analog pixel signal into digital pixel data, but also as a CDS (Correlated Double Sampling) processing function.

The pixel data represented by the count value obtained in Equation 2 is a positive signal voltage, thereby eliminating the need for the complementary operation. Thus, the compatibility with known systems is high.

The electric signal components Vsig are read during the second readout operation. Accordingly, since the level of the quantity of light is determined in a wide range, it is necessary that the ramp voltage to be supplied to the voltage comparator 252 be sharply changed by setting the up-counting period (t20 to t24; comparison period) to be long.

Accordingly, in this embodiment, the comparison processing is performed for the signal components Vsig by setting the maximum period for the comparison processing to be a 10-bit count period (1024 clocks). That is, the maximum period for the comparison processing for the reset components ΔV (reference components) is set to be shorter than the maximum period for the comparison processing for the signal components Vsig. Instead of setting the maximum period (i.e., the maximum value of the AD conversion period) for the comparison processing for the reset components ΔV (reference components) to be the same as that for the signal components Vsig, the maximum period for the comparison processing for the reset components ΔV (reference components) is set to be shorter than that for the signal components Vsig, thereby decreasing the total AD conversion period of the two operations.

In this case, the total processing time for the two operations is adjusted to be within one horizontal period (one horizontal processing period). This adjustment can be made by setting the number of bits assigned to the maximum range (dynamic range) of the signal and by setting the cycle of the count clock CK0 assigned to one bit. The reference signal RAMP from the reference signal generator 27 is set to cover the maximum range (dynamic range) of the signal.

If the gradient of the reference signal RAMP or the cycle of the count clock CK0 is fixed, the AD conversion period can be adjusted according to the number of bits. For example, if the number of bits is reduced by m, the AD conversion period can be set to be ½^m (^ is an exponent). If the cycle of the count clock CK0 is fixed and if the gradient of the reference signal RAMP is multiplied with 1/k, the coefficient (gain) of the signal can be increased by the factor of k.

If the AD conversion period is differentiated between the reference components and the signal components, the number of comparison bits is different for the first operation and the second operation. In this case, the control data CN4 is supplied from the communication/timing controller 20 to the reference signal generator 27, and based on this control data CN4, the ramp voltage is generated in the reference signal generator 27 so that the gradient of the ramp voltage, i.e., the rate of change, in the reference signal RAMP, becomes the same between the first operation and the second operation. It is easy to set the gradient of the ramp voltage to be the same for the first operation and the second operation since the ramp voltage is generated by digital control. Accordingly, the precision of the AD conversion for the first operation can be equal to that for the second operation, thereby making it possible to obtain a correct subtraction result expressed by Equation 1 by the up/down counter.

At a predetermined timing (t28) after the completion of the second counting operation, the communication/timing controller 20 instructs the horizontal scanning circuit 12 to read out the pixel data. In response to this instruction, the horizontal scanning circuit 12 sequentially shifts the horizontal selection signals CH(i) to be supplied to the counters 254 via the control lines 12c.

With this operation, the count values expressed by Equation 2 stored/retained in the counters 254, i.e., the pixel data represented by the n-bit digital data, are sequentially output to the outside the column processor 26 or the outside the chip having the pixel portion 10 from the output terminal 5c via the n horizontal signal lines 18. Subsequently, the operation is similarly repeated row by row, thereby obtaining the video data D1 representing a two-dimensional image.

As described above, for conducting AD conversion by performing the counting operation on the reference components (reset components) and the true signal components, the counting operation is performed on the same pixel signal by switching between the down-counting operation and the up-counting operation (and more specifically, in the opposite modes), and also, the digital data (count value) obtained for one of the reference components (reset components) and the true signal components (in the above-described example, the reference components) is used as the initial value for the counting operation for the other components (in the above-described example, the signal components). As a result, upon completing the AD conversion by the counting operation for the other components (in the above-described example, the signal components), the digital data, which is the difference between the two types of components, can be automatically obtained. That is, the difference signal components between the reference components and the signal components of the analog pixel signal can be converted into digital data.

First Embodiment

Spatial Difference Processing Operation

Figure 3:
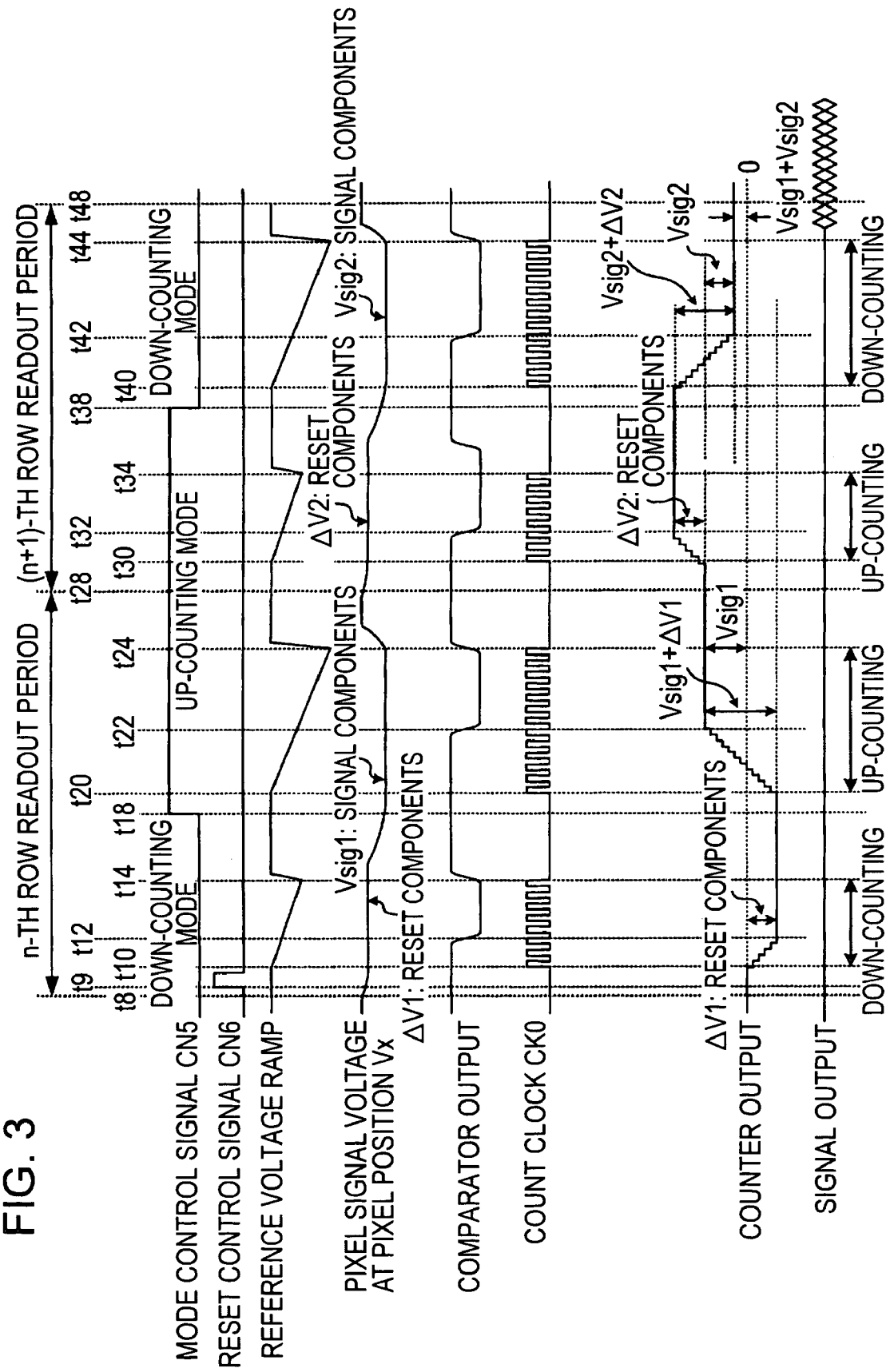
FIG. 3 is a timing chart illustrating a spatial difference processing operation (in units of two columns) in the column AD circuits of the solid state imaging device of the first embodiment shown in FIG. 1.

FIG. 3 is a timing chart illustrating the spatial difference processing operation performed by the column AD circuit 25B in the computed data processor 11B of the solid state imaging device 1 of the first embodiment shown in FIG. 1. It should be assumed that a color separation filter is not disposed in the pixel portion 10 and monochromatic imaging is performed.

The spatial difference processing is difference processing between a plurality of pixel signals located at different pixel positions in one field of an image which is captured substantially at the same time.

The reason for describing the "captured substantially at the same time" is due to the circumstance unique to the CMOS sensors where the charge accumulation period is different by horizontal lines because scanning is performed in each horizontal line (scanning line). By the use of, for example, a mechanical shutter, or by adding a global exposure function to the CMOS sensor, all the horizontal lines have the same charge accumulation period so that one field of an image can be captured exactly at the same time.

Typical examples of the spatial difference processing include the vertical-column difference processing performed on pixel signals of a plurality of adjacent rows (may be 3 or more) and horizontal-row difference processing performed on pixel signals at a plurality of adjacent pixels (may be 3 or more) in the same row. As the spatial difference processing operation of the first embodiment discussed below, the vertical-column difference processing is performed.

The "one field period" is a period in which an image is read by two-dimensionally scanning the imaging plane (more specifically, one vertical scanning period), and the "one frame period" is a period required for forming an image by all pixels on the imaging plane. When sequential scanning (progressive scanning) for scanning all rows is performed in the vertical direction, the "one field period" is equal to the "one frame period". In contrast, when interfaced scanning is performed in which some rows are sequentially scanned in the vertical direction in the first vertical scanning operation and the remaining rows are scanned in the vertical direction in the second vertical scanning operation, "k fields" are equal to "one frame". "k" indicates the number of scanning operations, and normally, k is 2. Regardless of the progressive scanning or the interlaced scanning, one vertical scanning period for reading an image by two-dimensionally scanning the imaging plane may be referred to as "one frame" in a broad sense. In this specification, the frame in the following description means the frame in a broad sense.

Even after reading out the n-bit digital value, the counter 254B can retain the digital value therein. In the spatial difference processing, digital difference processing is executed on a plurality of pixel signals by utilizing the retaining characteristic of the counter 254B, which is specifically discussed below.

As shown in FIG. 3, for the first pixel signal V1, by performing down-counting during the first readout operation and by performing up-counting during the second readout operation, only the electric signal components Vsig in accordance with the quantity of incident light on the unit pixel 3 can be extracted by the difference processing within the counter 254B (t10 to t24). The count value expressed by Equation 2 retained in the counter 254B is a digital value representing the positive signal voltage Vsig.

For the second pixel signal V2, up-counting is performed during the first readout operation, and down-counting is performed during the second readout operation. That is, AD conversion is performed by the combination of count modes opposite to the combination of the count modes for the first pixel signal V1 (t30 to t44). Accordingly, the subtraction processing expressed by Equation 1 is automatically performed in the counter 254B, and the resulting count value is retained in the counter 254B.

AD conversion for the second pixel signal V2 is performed by the combination of the count modes opposite to the combination of the count modes for the first pixel signal V1. Accordingly, the count value retained in the counter 254B becomes the n-bit digital value representing a negative signal voltage (−Vsig2), as expressed by Equation 3.

Equation 3:

(Count value in the second comparison period)−(count value in the first comparison period)=−(signal components $V$sig2+reset components $\Delta V$2+offset components in the column $AD$ circuit 25)+(reset components $\Delta V$2+offset components in the column $AD$ circuit 25)=−(signal components $V$sig2)  (3)

Upon completing the second counting operation on the first pixel signal V1, the first up-counting operation on the second pixel signal V2 is started without resetting the count value retained in the counter 254B. Then, the count value expressed by Equation 2 is added to the count value expressed by Equation 3. Accordingly, the count value retained in the counter 254B after completing the second counting operation on the second pixel signal V2 is the n-bit digital value representing the difference (subtraction) computation result (Vsig1−Vsig2) between the two pixel signals V1 and V2, as expressed by Equation 4.

Equation 4:

The count value for the first pixel signal+(second comparison period)−(first comparison period)=−(signal components $V$sig+reset components $\Delta V$+offset components in the column $AD$ circuit 25)+(reset components $\Delta V$+offset components in the column AD circuit 25)=(signal components $V$sig1)−(signal components $V$sig2)  (4)

Although it is not shown, in contrast to the example shown in FIG. 3, the following operation may be performed. For the first pixel signal V1, the up-counting operation is performed during the first readout operation and the down-counting operation is performed during the second readout operation. Then, for the second pixel signal V2, without resetting the count value retained in the counter 254B, the down-counting operation is performed during the first readout operation and the up-counting operation is performed during the second readout operation. Then, the count value retained in the counter 254B after completing the second counting operation on the pixel signal V2 is equal to the difference (subtraction) processing result (Vsig2−Vsig1) between the two pixel signals V1 and V2, which is output in the multi-level data (in this embodiment, n bits).

As discussed above, upon completing AD conversion for the Hy row, without resetting the counter 254B, AD conversion is performed for the (Hy+1) row for the reset components $\Delta V$ and the signal components Vsig by the combination of the count modes opposite to the combination of the count modes for the AD conversion for the Hy row. Accordingly, the subtraction result between the Hy row and the (Hy+1) row in the same vertical column is retained in the counter 254B of the column AD circuit 25, thereby implementing the difference processing for the two rows.

At a predetermined timing (t48) after completing the second counting operation on the second pixel signal V2, the communication/timing controller 20 instructs the horizontal scanning circuit 12B to read out the pixel data. In response to this instruction, the horizontal scanning circuit 12B sequentially shifts the horizontal selection signals CH(i) to be supplied to the counter 254B via the control line 12c.

Then, the count value expressed by Equation 4 stored/retained in the counter 254B, i.e., the n-bit digital data representing the difference (subtraction) result (Vsig2−Vsig1) between the two pixel signals V1 and V2, can be sequentially output to the outside the column processor 26B or the outside the chip having the pixel portion 10 from the output terminal 5Bc via the n horizontal signal lines 18B. Thereafter, the operation is similarly repeated in units of two rows. As a result, computed data D2 representing the two-dimensional difference image indicating the difference (subtraction) computation result between the two pixel signals in the adjacent two rows can be obtained. The image representing the difference computation result is the image with a resolution of ½ and with an amount compressed to ½ in the vertical direction (on the sensor surface).

As discussed above, according to the solid state imaging device 1 of the first embodiment, by repeatedly performing the counting operation for the reference components (reset components) and the signal components of the pixel signal of the same unit pixel 3 in the opposite count modes, the difference signal components between the reference components and the signal components of the pixel signal can be converted into digital data. Additionally, by repeatedly performing the counting operation for the pixel signals of a plurality of (in the above-described example, two) different unit pixels 3 by using different combinations of the count modes, the difference (subtraction) computation between the plurality of pixel signals can be implemented.

A difference image can be obtained by performing the product-sum operation including the subtraction operation in units of m rows by using the up/down counting function of the counter 254B. One example of the use of this up/down counting function is to perform the subtraction operation for in units of two rows, in which case, the edge extracting function can be implemented without the need to use a special circuit outside the imaging apparatus 1. Accordingly, by performing the vertical edge detection processing for a plurality of vertical columns, straight-line detection processing in the horizontal direction can be implemented.

By performing scanning with a combination of the same subtraction patterns as a pattern to be extracted, the most intensified signal can be obtained from the same patterns as the subtraction patterns, and the pattern matching function can be implemented without the need to provide a special circuit outside the imaging apparatus 1.

First Embodiment

Spatial Difference Processing Operation; 3 or More Rows

Figure 4:
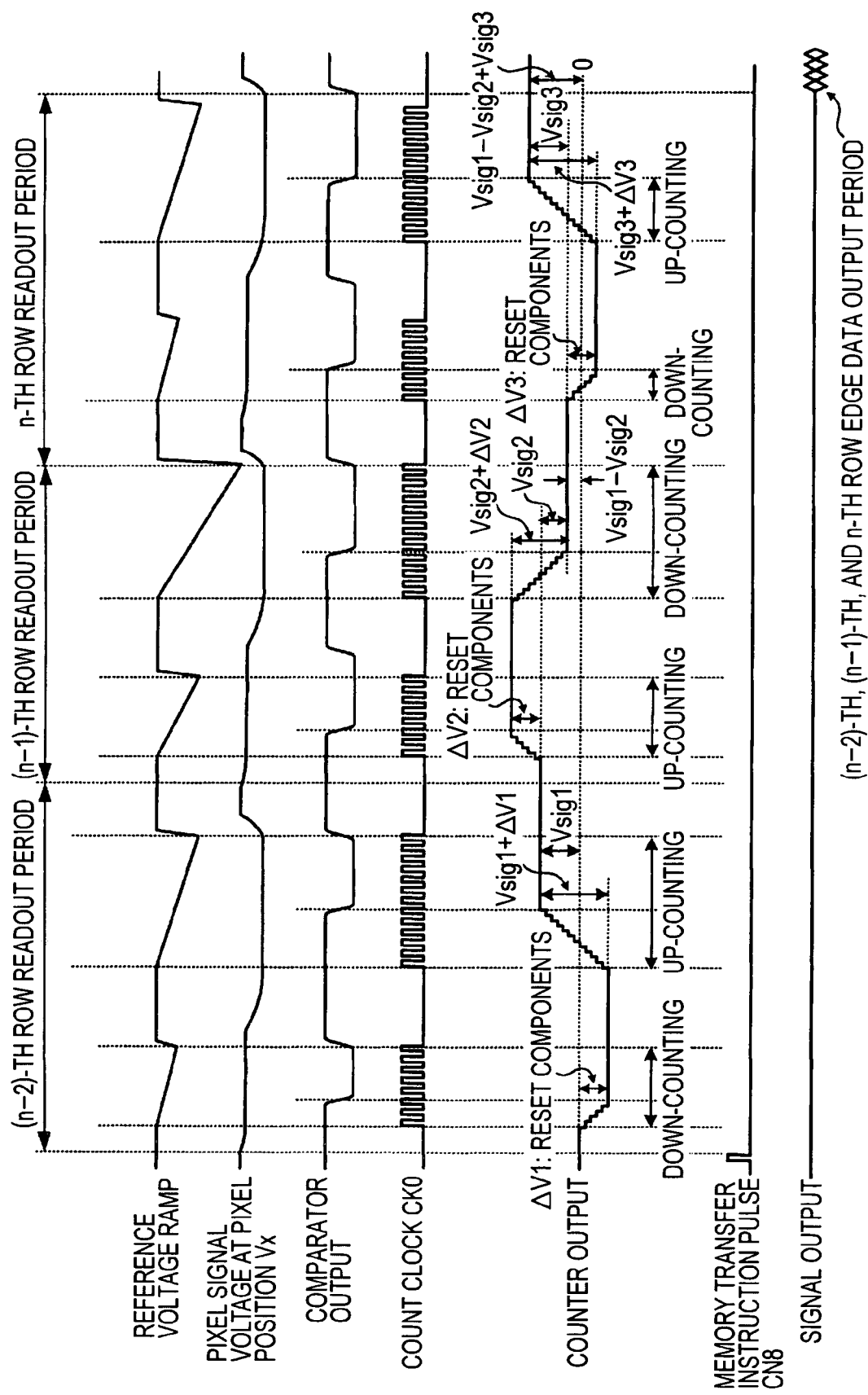
FIG. 4 is a timing chart illustrating another spatial difference processing operation in the column AD circuits of the solid state imaging device of the first embodiment shown in FIG. 1.

FIG. 4 is a timing chart illustrating the operation of another type of spatial difference processing in the column AD circuit 25 of the solid state imaging device 1 of the first embodiment shown in FIG. 1. In this example, in performing the product-sum operation including the spatial difference processing for three rows and also performing the product-sum operation on a plurality of signal components, subtraction or addition processing is performed by applying different coefficients to the signal components. It should be assumed that a color separation filter is not disposed in the pixel portion 10 and monochromatic imaging is performed.

In this example, in performing the counting operation in the counter 254 of the column AD circuit 25, the coefficient $\alpha 1$ applied to the "3j−2" lines H1, H4, . . . (j is a positive integer of one or greater) is 1, the coefficient $\alpha 2$ applied to the "3j−1" lines H2, H5, . . . is −2, and the coefficient $\alpha 3$ applied to the "3j" lines H3, H6, . . . is 1. Accordingly, for the signal components Vsig of the pixel signal, the communication/timing controller 20 controls the counter 254 to perform up-counting for the "3j−2" lines, down-counting for the "3j−1" lines, and up-counting for the "3j" lines.

Thus, the count value retained in the counter 254 after completing the second counting operation for the 3j-th pixel signal V3$j$ is n-bit digital data representing the difference processing result (addition/subtraction; product-sum operation using values with signs) between the three pixel signals V$j$3-2, V3$j$-1, and V3$j$ (Vsig1−2−Vsig2+Vsig3), as expressed by Equation 5.

Equation 5:

$$\alpha 1(\text{signal components } V\text{sig}1) - \alpha 2(\text{signal components } V\text{sig}2) + \alpha 3(\text{signal components } V\text{sig}3) = (\text{signal components } V\text{sig}1) - 2(\text{signal components } V\text{sig}2) + (\text{signal components } V\text{sig}3) \quad (5)$$

Although the product-sum operation including the difference computation in units of three rows has been discussed by way of example, it can be performed in units of four or more rows. In this case, the same gradient (rate of change) may be used for some pixels, and different gradients (rates of change) may be used for the other pixels.

Concerning the pixel signal of the last line of a plurality of lines to be processed, the count value retained in the counter 254 after completing the second counting operation is the n-bit digital value representing the product-sum operation (addition/subtraction; product-sum operation using values with signs) result between k pixel signals V1, V2, . . . , Vk, as expressed by Equation 6. It should be noted that the coefficient βk contains a sign.

Equation 6:

$$\beta 1 \cdot V\text{sig}1 + \beta 2 \cdot V\text{sig}2 + \ldots + \beta k \cdot V\text{sig}k \quad (6)$$

The difference processing for two adjacent rows is discussed with reference to FIG. 3, and, as shown in FIG. 4, the product-sum operation including the difference processing can be performed for three or more rows. In this case, when the number of pixels (in this example, the number of rows) to be processed is m, the amount of image data can be compressed to 1/m.

As discussed above, by performing the addition/subtraction (product-sum operation using values with signs) for three or more rows, a linear spatial filtering function, such as a spatial filter for enhancing the center pixel, can be implemented without the need to provide a special circuit outside the column processor 26B. Additionally, the coefficient can be set to be 0 by stopping the counting operation on a specific pixel, in which case, a differential filter can be implemented.

As is seen from the above-described advantages, discrete cosine transform, which is frequently used in image compression processing, can be implemented. In discrete cosine transform, it is necessary that, for example, 8×8 pixels be multiplied by a cosine coefficient before adding the resulting values, and also, the cosine coefficient has a sign. Thus, when computation using positive and negative signs is required, as in discrete cosine transform, the required function can be easily implemented.

First Embodiment

Spatial Addition Processing Operation

Figure 5:
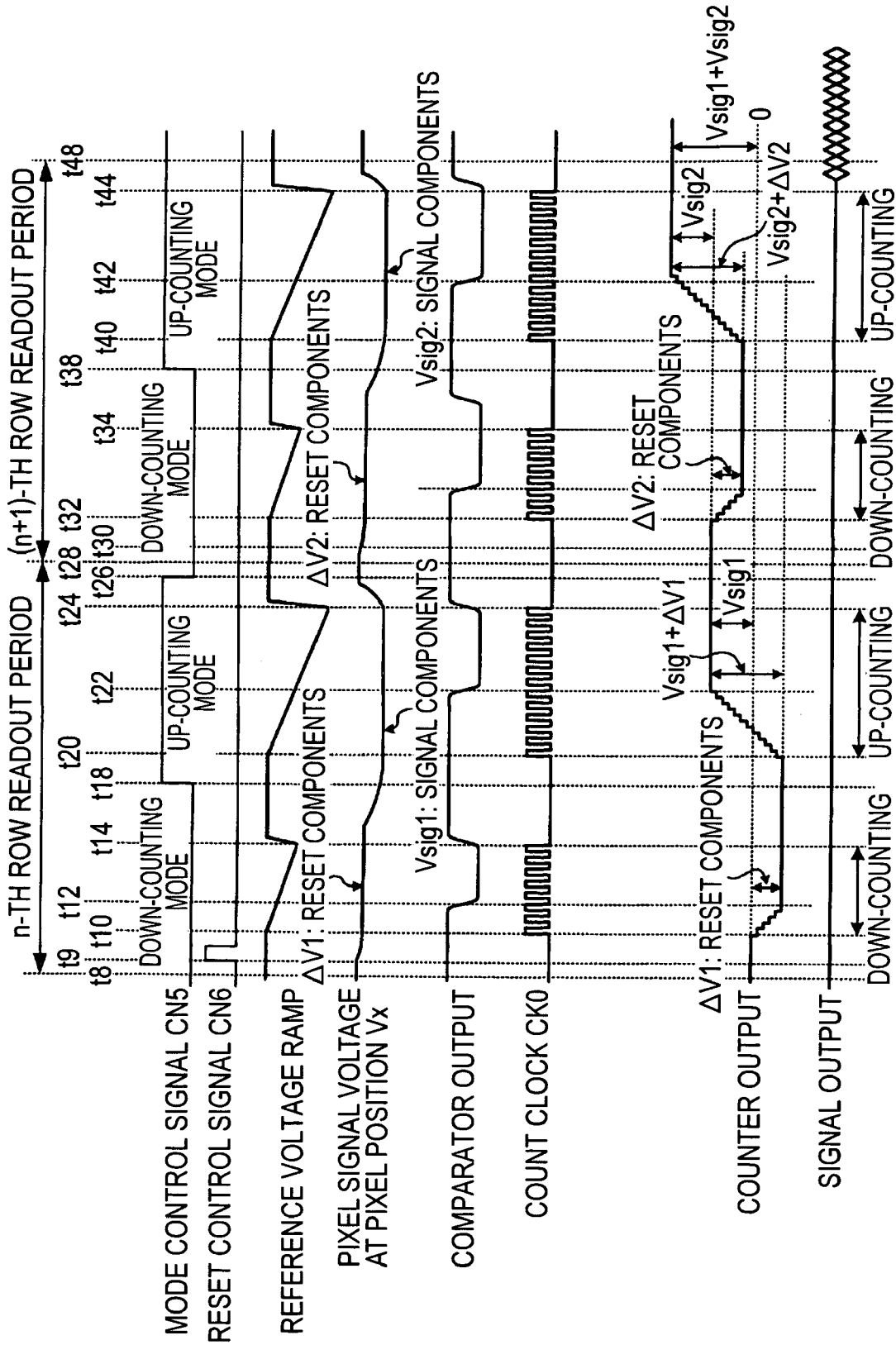
FIG. 5 is a timing chart illustrating a spatial addition processing operation (in units of three columns) in the column AD circuits of the solid state imaging device of the first embodiment shown in FIG. 1.

FIG. 5 is a timing chart illustrating the spatial addition processing operation performed by the column AD circuit 25B in the computed data processor 11B of the solid state imaging device 1 of the first embodiment shown in FIG. 1. It should be assumed that a color separation filter is not disposed in the pixel portion 10 and monochromatic imaging is performed.

The spatial addition processing is addition processing between a plurality of pixel signals located at different pixel positions in one field of an image which is captured substantially at the same time. Typical examples of the spatial addition processing include vertical-column addition processing performed on pixel signals of a plurality of (may be 3 or more) adjacent rows and horizontal-row addition processing performed on pixel signals at a plurality of (may be three or more) adjacent pixel positions in the same row. The spatial addition processing of the first embodiment described below is the vertical-column addition processing.

As is seen from a comparison of FIG. 5 with FIG. 3, in the spatial addition processing, the combination of the count modes in the AD conversion for the reset components ΔV and the signal components Vsig is set to be the same between the individual rows. That is, without resetting the counter 254B after completing the AD conversion for the Hy row, AD conversion is performed on the (Hy+1) row by the same combination of the count modes as the combination of the count modes for the AD conversion for the Hy row. Accordingly, the addition result of the Hy row and the (Hy+1) row in the same vertical column can be retained in the counter 254B of the column AD counter 25B, thereby implementing the addition processing for two rows.

The count value retained in the counter 254B after completing the second counting operation for the pixel signal of the (Hy+1) row is the n-bit digital value representing the addition result (Vsig1+Vsig2) between the two pixel signals V1 and V2. In this case, the amount of image data can be reduced to ½.

Although, in FIG. 5, the addition processing for two adjacent rows is discussed, as in the difference processing shown in FIG. 4, addition processing may be performed for 3 or more rows. If the number of pixels (in this example, the number of rows) is m, the amount of image data can be compressed to 1/m.

In this manner, by using the same combination of the count modes for the reset components ΔV and the signal components Vsig of the pixel signal to be processed, that is, by using the same count modes for all the pixel signals, the coefficients for the counting operation can be set to be all positive or negative.

This means that only the addition processing is performed. Also, in this embodiment, since the coefficients can be set by changing the gradient of the reference signal RAMP supplied from the reference signal generator 27, filter processing that cannot be implemented by the product-sum operation including the subtraction operation can be implemented. For example, if all the coefficients for the pixel signals to be processed are set to be the same, smoothing filter processing can be implemented. If the coefficient for the center pixel is set to be larger than that for the peripheral pixels, weight-addition processing for enhancing the center pixel can be implemented.

As described above, according to the configuration of the first embodiment, when the counter 254B of the computed data processor 11B conducts AD conversion by performing the counting operation for the pixel signal of each of a plurality of unit pixels 3, the digital data obtained for one of the pixel signals is used as the initial value for the counting operation for the other pixel signal (the signal subjected to the second counting operation). Then, as a result of conducting AD conversion for the other pixel signal, n-bit digital data representing the product-sum operation result for all the unit pixels can be automatically obtained and can be output as the computed data D2.

If, as shown in FIG. 3 or 4, the combination of the count modes is set to be different between a plurality of counting operations, the count value obtained after the final counting operation becomes n-bit digital data representing the subtraction result of the pixel signals of the plurality of unit pixels 3. In contrast, if, as shown in FIG. 5, the combination of the count modes is set to be the same between a plurality of counting operations, the count value obtained after the final counting operation is digital data representing the addition result for the pixel signals (more specifically, true signal components) of the plurality of unit pixels 3. If three or more pixels are processed, by using the same combination of the count modes and by using different combinations of the count modes, the function of finding the sum with a sign, i.e., the product-sum operation, can be implemented for the pixel signals (more specifically, the true signal components) of the unit pixels 3.

Additionally, in the normal data processor 11A, based on one of a plurality of processing subject signals used in the product-sum operation in the computed data processor 11B, the normal video data D1 is generated and output.

Accordingly, by the use of the single solid state imaging device 1, the video data D1 and the computed data D2 can be simultaneously generated and output to the outside the solid-state imagining apparatus 1. Thus, depending on the situation, the image can be suitably output by using one of or both the normal image based on the video data D1 and the processed image based on the computed data D2. As a result, the imaging apparatus 1 can be used for various purposes.

In the above-described embodiment, the configuration and the operation of the product-sum operation performed over m rows in the vertical column direction have been discussed. Alternatively, for example, a digital computing unit for receiving a plurality of items of digital data representing the product-sum operation results in the column AD circuits 25B in the column direction or the row direction and for performing the product-sum operation in a direction different from the column direction or the row direction based on the received digital data may be provided for the output circuit 28. With this arrangement, the spatial subtraction processing or the spatial addition processing can be implemented only in the row direction or both in the row direction and in the column direction (that is, in the two-dimensional direction).

Alternatively, the analog pixel signal supplied from the unit pixels 3 to the column processor 26B via the vertical signal line 19 is switched to one of the plurality of column AD circuits 25B disposed in the column direction by using a changeover switch, thereby implementing the product-sum operation only in the row direction or in the two-dimensional direction.

Alternatively, the counter 254B may be configured by using known art such that a desired initial value can be loaded into the counter 254B. In this case, the output data of the previous counter 254B may be input into the corresponding data setting terminal Din of the subsequent counter 254B, and the column AD circuits 25B (more specifically, the counters 254B) disposed in the column-parallel configuration are cascade-connected in the row direction. In this case, upon completing the counting operation for the previous column, before starting the counting operation after setting the count mode for the subsequent column, the count value obtained for the counting operation in the counter 254B of the previous column is set as the initial value for the counter 254B of the subsequent column, thereby implementing the product-sum operation only in the row direction or in the two-dimensional direction.

By performing the product-sum operation for, not only the column direction, but also the row direction, a high-precision graphic recognition function can be implemented. For example, first, difference processing is performed in units of two rows in the column direction to obtain a linearly projected edge profile of each column (column-direction edge detection image). Then, difference processing is performed in units of two columns in the row direction to obtain a linearly projected edge profile of each row (row-direction edge detection image). Based on the resulting two-dimensional edge profile, the shape and the number of edges are analyzed to determine the features of a graphic to be processed. The resulting graphic is compared with reference templates, and the template which is the closest to the graphic is selected.

By expanding the product-sum operation to the two-dimensional m-row x n-column (may be n=m), edge detection processing, straight-line detection processing, or pattern matching processing can be two-dimensionally performed. For example, as two-dimensional edge detection processing, vertex-coordinate extraction processing or 45-degree oblique edge detection processing can be performed, thereby implementing the oblique-direction straight-line detection processing.

Also, since the multiple-input product-sum operation on the unit pixels 3 in a matrix can be easily implemented, a spatial filter can be applied. Thus, the spatial filter can be easily implemented on the CMOS image sensor. A two-dimensional unsharp masking filter for enhancing the edges of an image can also be easily implemented. Additionally, discrete cosine transform, which is frequently used in image compression processing, can be implemented two-dimensionally.

Second Embodiment

Configuration of Solid State Imaging Device; Pipeline Processing

Figure 6:
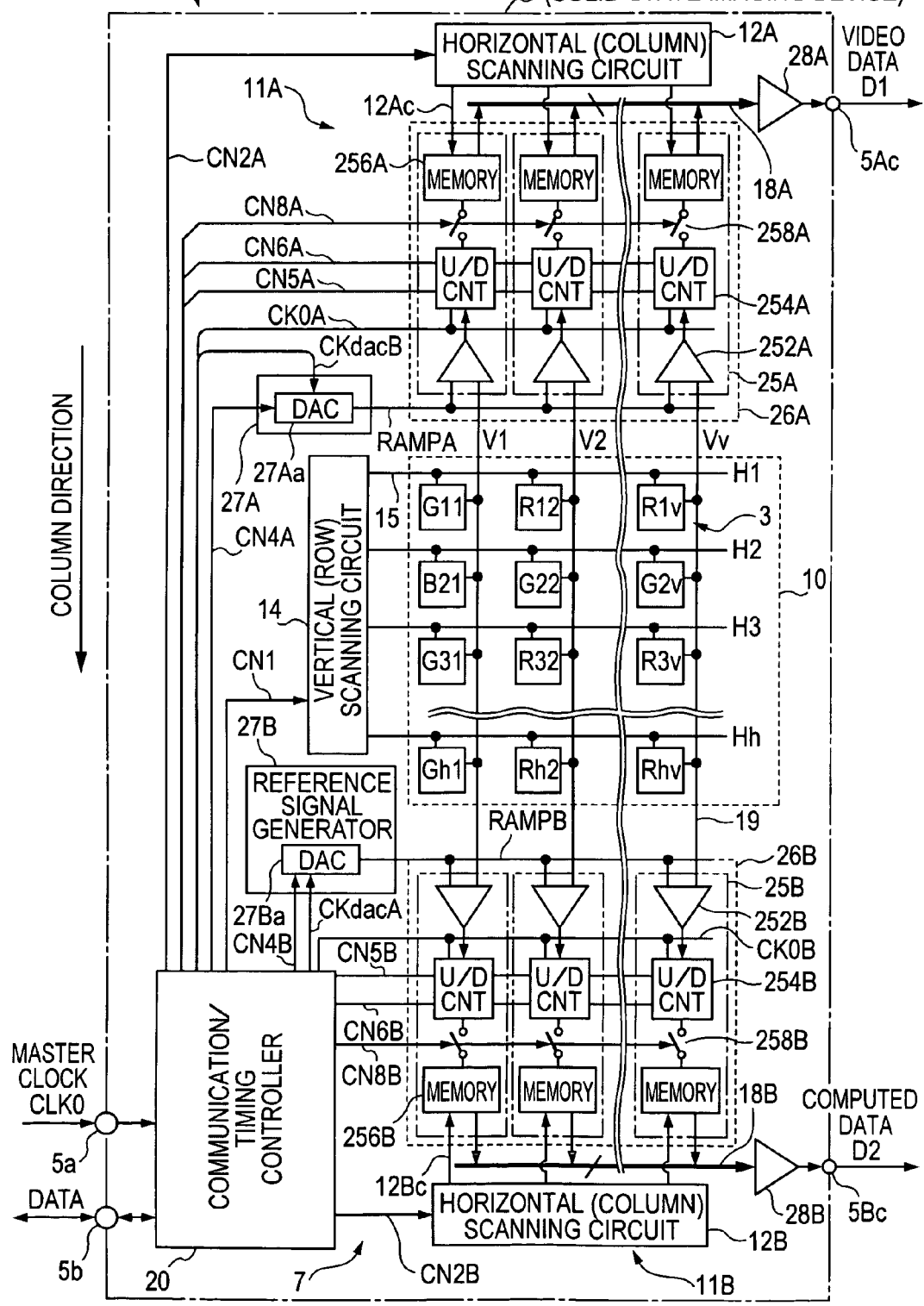
FIG. 6 is a schematic diagram illustrating a CMOS solid state imaging device according to a second embodiment of the present invention.

FIG. 6 is a schematic diagram illustrating a CMOS solid state imaging device according to a second embodiment of the present invention. In the solid state imaging device 1 of the second embodiment, the configuration of the column AD circuits 25 of the solid state imaging device 1 of the first embodiment is modified.

More specifically, in the column AD circuit 25 of the second embodiment, a data storage unit 256, which serves as an n-bit memory device for storing the counting result retained in the counter 254, and a switch 258 disposed between the counter 254 and the data storage unit 256 are provided subsequent to the counter 254.

A memory transfer instruction pulse CN8, which serves as a control pulse, is supplied from the communication/timing controller 20 to each of the switches 258 at a predetermined timing. Upon receiving the memory transfer instruction pulse CN8, the switch 258 transfers the count value retained in the corresponding counter 254 to the data storage unit 256. The data storage unit 256 retains/stores the transferred count value.

The mechanism for retaining the count value of the counter 254 in the data storage unit 256 at a predetermined timing is not restricted to the configuration in which the switch 258 is disposed between the counter 254 and the data storage unit 256. For example, the counter 254 and the data storage unit 256 may be directly connected, and the output enable of the counter 254 is controlled by the memory transfer instruction pulse CN8. Alternatively, the memory transfer instruction pulse CN8 may be used as a latch clock that determines the data reading timing of the data storage unit 256.

A control pulse may be input into the data storage unit 256 from the horizontal scanning circuit 12 via the control line 12c. The data storage unit 256 retains the count value from the counter 254 until it receives an instruction by the control pulse via the control line 12c.

While the voltage comparator 252 and the counter 254 of the column processor 26 perform the corresponding processing, the horizontal scanning circuit 12 serves as a read scanner for reading the count value retained in the data storage unit 256.

According to this configuration of the second embodiment, since the counting result retained in the counter 254 can be transferred to the data storage unit 256, AD conversion, i.e., the counting operation of the counter 254, and the reading operation for reading the counting result to the horizontal signal line 18 can be independently controlled. Thus, the pipeline operation for independently or simultaneously performing the AD conversion and the reading operation for reading out the signals to the outside the imaging apparatus 1 via the horizontal signal line 18 can be implemented.

Second Embodiment

Pipeline Operation

Figure 7:
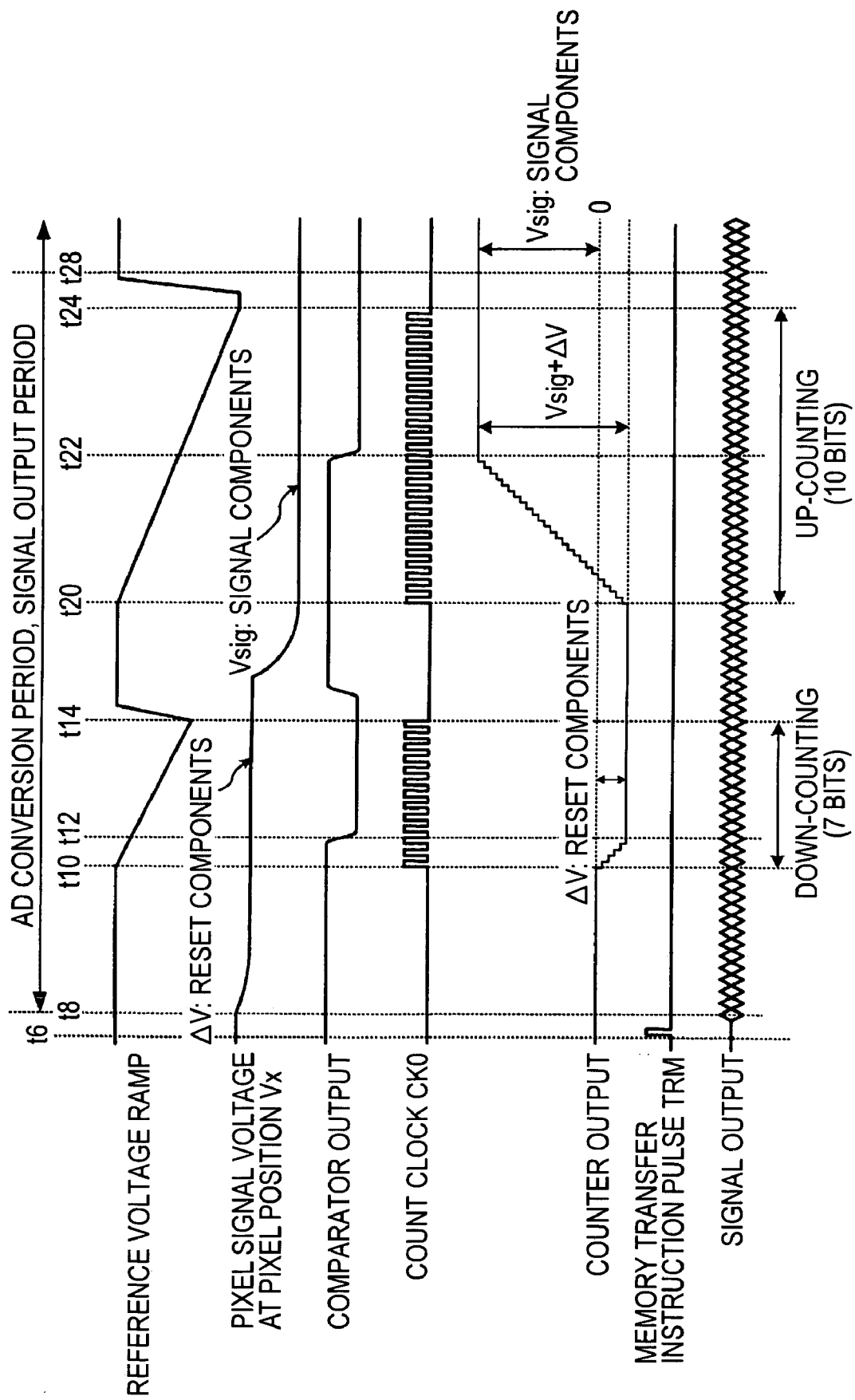
FIG. 7 is a timing chart illustrating the basic operation in the column AD circuits of the solid state imaging device of the second embodiment shown in FIG. 6.

FIG. 7 is a timing chart illustrating the basic operation in the column AD circuit 25 of the solid state imaging device 1 of the second embodiment shown in FIG. 6. The AD conversion conducted in the column AD circuit 25 is similar to that in the first embodiment, and a detailed explanation thereof is thus omitted.

In the second embodiment, the data storage unit 256 is added to the configuration of the first embodiment, and the basic operation including the AD conversion is similar to that of the first embodiment. Before the operation of the counter 254 (t6), the counting result obtained by the processing on the previous row Hx-1 is transferred to the data storage unit 256 based on the memory transfer instruction pulse CN8 from the communication/timing controller 20.

In the first embodiment, the pixel data cannot be output to the outside the column processor 26 before completing the second readout operation, i.e., AD conversion, on the pixel signal to be processed. Accordingly, the readout operation is restricted. In contrast, in the configuration of the second embodiment, before the first readout operation (AD conversion) on the pixel signal to be processed, the count value indicating the previous subtraction processing has been transferred to the data storage unit 256. Accordingly, the readout operation is not restricted.

Second Embodiment

Spatial Difference Processing Operation by Solid State Imaging Device

Figure 8:
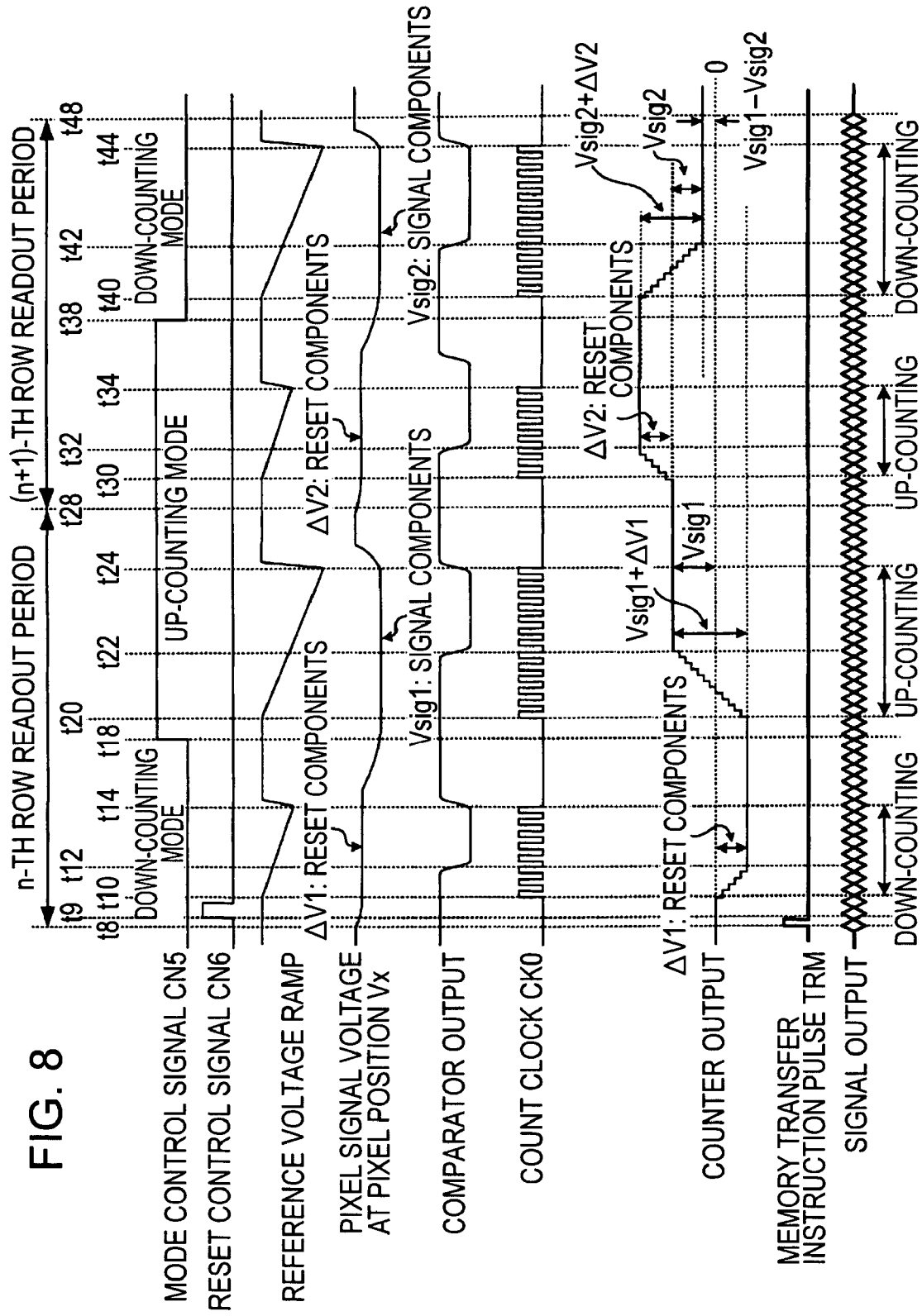
FIG. 8 is a timing chart illustrating a spatial difference processing operation in the column AD circuits of the solid state imaging device of the second embodiment shown in FIG. 6.

FIG. 8 is a timing chart illustrating the operation of the spatial difference processing operation in the column AD circuit 25 of the solid state imaging device 1 of the second embodiment shown in FIG. 6. In this case, a color separation filter is not disposed in the pixel portion 10, and monochromatic imaging is performed.

In the second embodiment, as shown in FIG. 7, since the count value indicating the previous subtraction processing result is transferred to the data storage unit 256 before the first readout operation (AD conversion) for the pixel signal to be processed, the readout operation is not restricted.

The timing chart illustrating the spatial addition processing in the solid state imaging device 1 of the second embodiment is not shown. However, as described with reference to FIG. 5, the combination of the count modes for the reset components ΔV and the signal components Vsig during the AD conversion is the same for a plurality of rows.

With this arrangement, the signal output operation for outputting the computed data D2 indicating the product-sum operation result to the outside the imaging apparatus 1 from the data storage unit 256 via the horizontal signal line 18 and the output circuit 28 can be simultaneously performed with the product-sum operation utilizing the readout operation for reading the signals in the current row Hx and the subsequent row (Hx+1) and the count operation of the counter 254, thereby achieving more efficient signal output.

Figure 9:
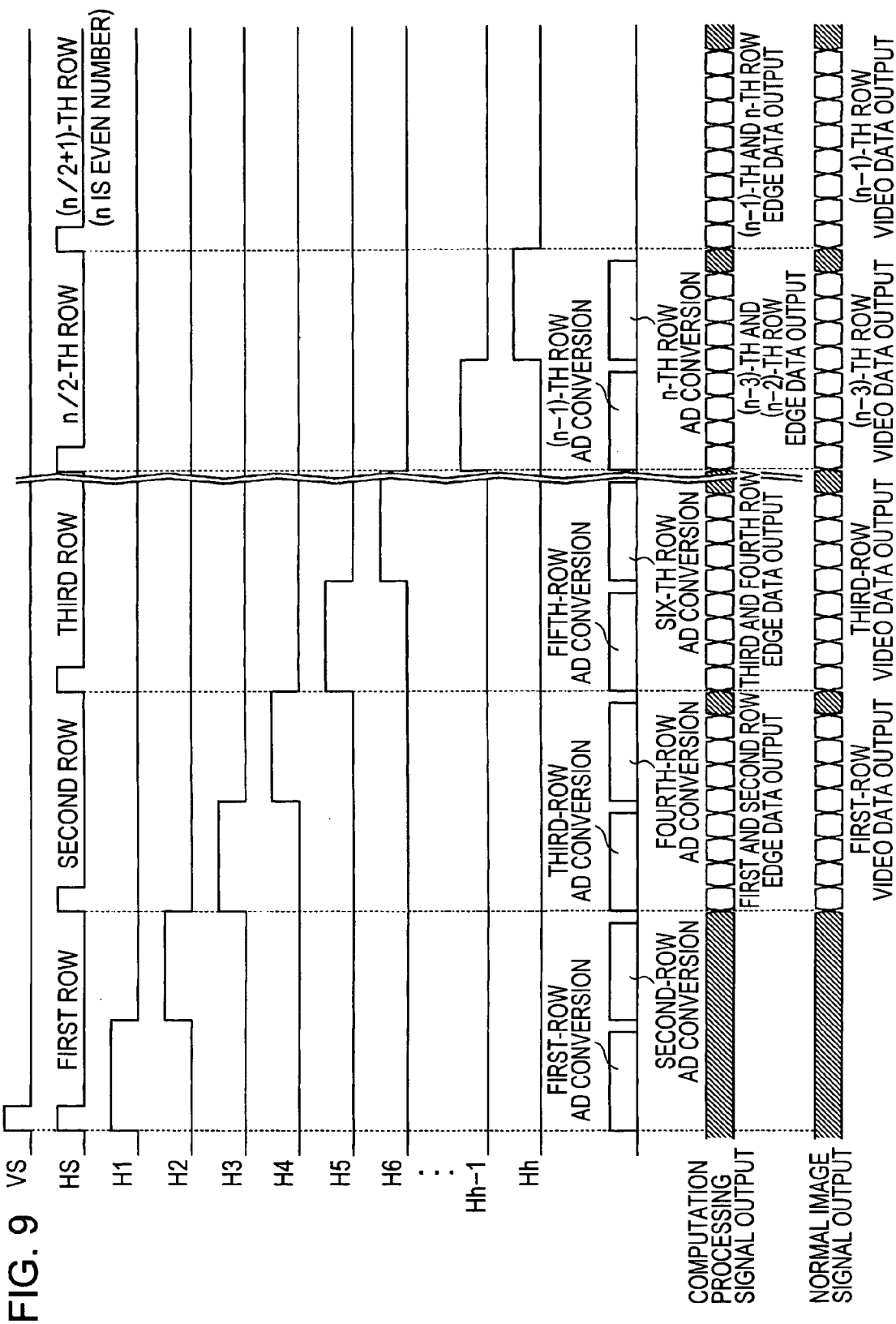
FIG. 9 is a timing chart illustrating the spatial difference processing or the spatial addition processing in relation to the frame rate.

FIG. 9 is a timing chart illustrating the spatial subtraction processing or the spatial addition processing in relation to the frame rate. In this case, a color separation filter is not provided in the pixel portion 10, and monochromatic imaging is performed.

As discussed with reference to FIGS. 3 and 5, by performing the product-sum operation in units of two rows by using the up/down counting function of the counter 254B, a subtraction image or an addition image can be obtained, and at the same time, the amount of data can be compressed. According to the configuration of the second embodiment, by the provision of the data storage unit 256, AD conversion and the data readout operation can be performed in parallel.

In the second embodiment, the total AD conversion period for all the pixels (in this embodiment, the rows) subjected to the product-sum operation is set to be within one row period. With this arrangement, the total AD conversion time can be reduced to $\frac{1}{2}^m$, and also, the frame rate can be increased by the factor of $2^m$ or more.

To reduce the total AD conversion time to $\frac{1}{2}^m$ or to increase the frame rate by the factor of $2^m$ when the number of pixels to be processed is $2^m$, the gradient of the reference signal RAMP is increased to $2^m$, and also, the count clock CK0 is increased by the factor of $2^m$. Alternatively, the number of bits may be reduced without changing the gradient of the reference signal RAMP or the count clock CK0.

In the latter method, if the maximum range (dynamic range) of the signal is realized while maintaining the normal bit resolution applied to the maximum range of the signal, the AD conversion period, i.e., the full-scale AD conversion period (for example, n bits for n-bit counting) for each unit pixel 3, cannot be applied to one row. Accordingly, it is necessary that the maximum AD conversion period for each unit pixel 3 be reduced to $\frac{1}{2}^m$. This means that, generally, the number of bits should be reduced by m if the gradient of the reference signal RAMP is not changed.

That is, in order to set the computation for a plurality of pixels to be within one row period while maintaining the bit resolution without changing the gradient of the reference signal RAMP or the count clock CK0, it is necessary that the number of bits used for the counting operation be adjusted as described above according to the number of pixels (in this example, the number of rows) to be processed.

That is, if it is not possible that the AD conversion period is decreased while maintaining the AD conversion precision, the digital counting in the second counting operation (i.e., the comparison period for the signal components Vsig) of the counter 254 in the timing chart in FIG. 9 should be reduced to n-m bits if $2^m$ pixels are to be subjected to the product-sum operation.

For example, if the counting operation is performed with 10 bits when the product-sum operation is performed in units of two rows, comparison is normally conducted during the 1024-clock period. In this case, however, the counting operation is performed with 9 bits, i.e., the comparison period is reduced to the 512 clock period. In this case, the rate of the temporal change of the reference signal RAMP generated in the DA conversion circuit 27a of the reference signal generator 27 should be constant, which means that the AD conversion period, i.e., the bit resolution, is not changed.

In this embodiment, as indicated by the timing chart shown in FIG. 9, by reducing the AD conversion period to be ½, the frame rate can be doubled without changing the count clock CK0 or the data output rate.

If the frame rate is doubled, the charge accumulation time per unit pixel becomes ½, and the signal amplitude is also reduced to be ½, thereby causing a reduction in the S/N ratio. Similarly, if subtraction is conducted in units of $2^m$ rows so that the AD conversion period can be reduced to be 1/m, the frame rate is increased by the factor of m. In this case, by reducing the n-bit AD conversion precision to n-m bits, the frame rate can be increased, though the S/N ratio may be decreased.

In contrast, if addition is performed, the digital value after adding two rows becomes Vsig1+Vsig2, and the signal amplitude becomes (Vsig1+Vsig2)/2≈Vsig1 even when the frame rate is doubled. Accordingly, a change in the signal amplitude is small and the S/N ratio is not deteriorated.

In the normal data processor 11A, since the video data D1 representing a normal image has to be generated by using the image signal of the row selected by the vertical scanning circuit 14, it is necessary to adjust the frame rate to that used in the computed data processor 11B. In this case, the AD conversion period in the column AD circuit 25A should be reduced to that in the column AD circuit 25B. The horizontal scanning circuit 12A should select only the count values in one of the odd rows or the even rows in the column AD circuits 25A (the odd rows in FIG. 9) from the data storage unit 256A, and reads out the selected count values.

Spatial Difference Processing Operation; Color Imaging

Figure 10:
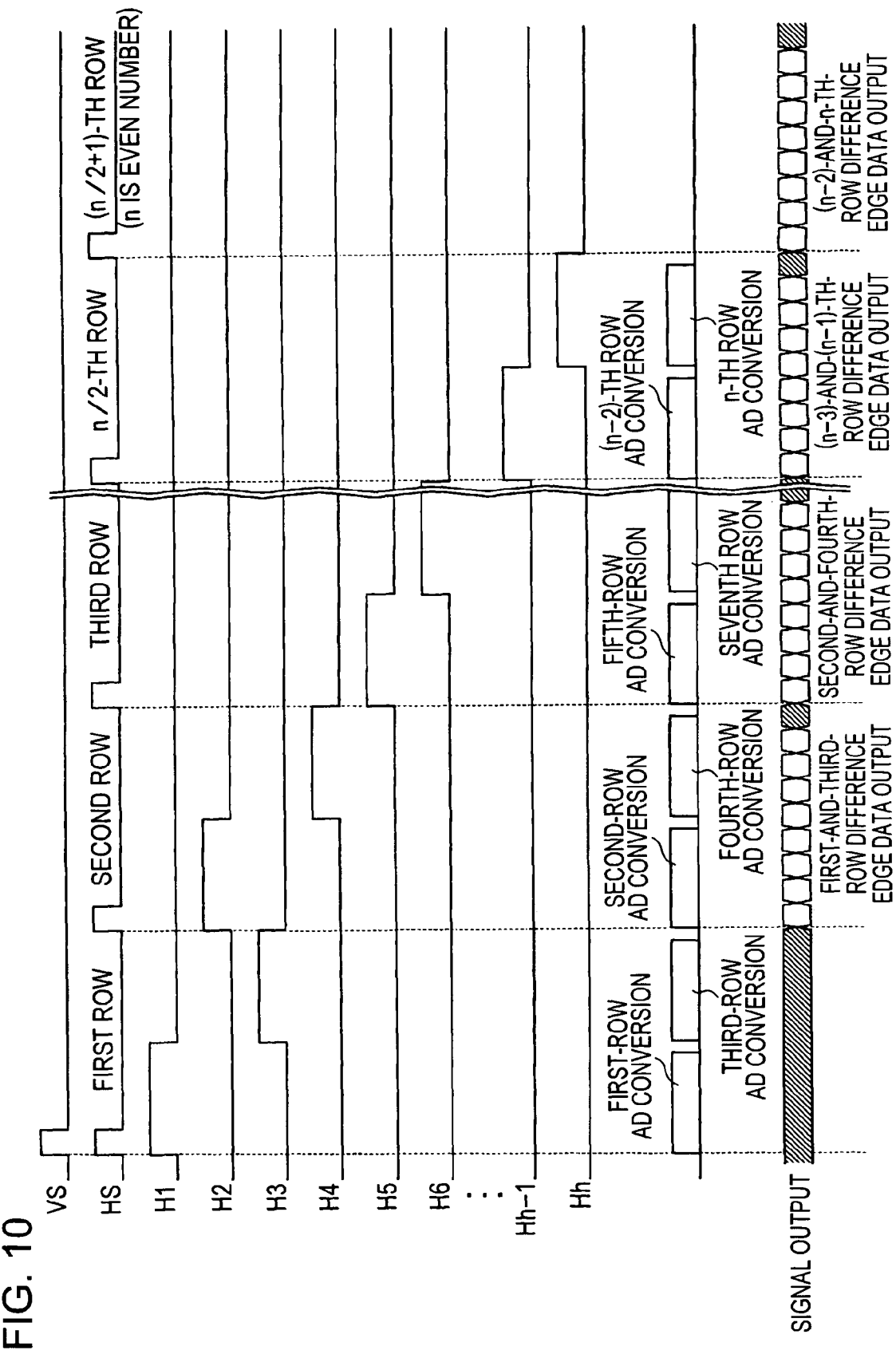
FIG. 10 is a timing chart illustrating a spatial difference processing operation in the column AD circuits of the solid state imaging device shown in FIG. 1 or 6.

FIG. 10 is a timing chart illustrating the spatial difference processing operation in the column AD circuit 25B of the solid state imaging device 1 shown in FIG. 1 or 6. In this example, the pixel portion 10 is configured to perform color imaging so that the difference computation for the same color components can be performed.

As shown in FIG. 1 or 6, on the light-receiving surface of the pixel portion 10, basic color filters having the Bayer arrangement including red (R), green (G), and blue (B) color filters for performing color imaging are disposed. For example, the first color pixels for sensing the first color (red; R) are disposed at the intersections in the odd rows and in the even columns, the second color pixels for sensing the second color (green; G) are disposed at the intersections in the odd rows and in the odd columns and in the even rows and in the even columns, and the third color pixels for sensing the third color (blue; B) are disposed at the intersections in the even rows and in the odd columns. With this arrangement, the two-color pixels having R and G and the two-color pixels having G and B are disposed in every other line according to the checkerboard pattern.

In the solid state imaging device 1, if the pixel portion 10 (device) to be used is decided, the color types and the arrangement of color filters in the color separation filter is determined, and the color type of the color filter at a desired position in the two-dimensional lattice can be uniquely specified.

Accordingly, in this example, upon receiving an instruction to read pixel signals in the pixel portion 10 from the communication/timing controller 20, instead of sequentially scanning the horizontal rows in the vertical direction, the vertical scanning circuit 14 selects rows Hy by address decoding processing based on the arrangement of the color filters of the color separation filter by using a vertical decoder 14a, thereby selecting a combination of rows having the same color arrangement in accordance with the arrangement of the color filters.

That is, the positions of the plurality of unit pixels 3 to be processed are specified so that the plurality of pixel signals to be subjected to the product-sum operation have the same color filters. With this arrangement, if the color arrangement is different between the odd rows and the even rows, the difference processing is performed on the odd rows and the even rows independently.

In the pixel portion 10 having the Bayer-arrangement color filters, G and R color filters or B and G color filters are disposed in the same row. Accordingly, if the rows Hx are sequentially selected, as shown in FIG. 3 or 5, computation is performed on the pixels having different color filter components, thereby causing the color mixture.

In contrast, in this example, the vertical scanning circuit 14 sequentially selects rows Hy having the same combination of color filter components, such as the odd rows H1, H3, H5, ..., and the even rows H2, H4, H6, ..., thereby implementing the product-sum operation (in this example, the difference processing) for the same colors without causing the color mixture.

For example, in the pixel arrangement shown in FIG. 1 or 6, if difference processing is performed in units of two rows, difference processing for the odd rows between the pixels in the odd row H1 and the pixels in the odd row H3, such as the pixel G11 in the row H1 and the pixel G31 in the row H3, the pixel R12 in the row H1 and the pixel R32 in the row H3, ..., can be implemented. Similarly, difference processing for the even rows between the pixels in the row H2 and the pixels in the H4, such as the pixel B21 in the row H2 and the pixel B41 in the row H4, the pixel G22 in the row H2 and the pixel G42 in the row H4, ..., can be implemented.

Although, in FIG. 1 or 6, the three R, G, and B color filters are disposed on the lattice-like unit pixels 3 according to the Bayer arrangement, the color types or the order of the arrangement of filters are not restricted to the example shown FIG. 1 or 6. For example, a modified example of the Bayer arrangement filter may be used, or a complementary color filter or another color filter may be used.

For example, instead of the second color pixels for sensing the second color (green; G) disposed at the intersections in the odd rows and the odd columns, the fourth color pixels for sensing the fourth color (emerald; E) may be disposed. Also in this case, the selection of rows in the difference processing can be performed at the timing shown in FIG. 10.

Although a detailed explanation of color signal processing is not given, an image processor for executing matrix computation for generating three RGB colors that can be perceived by the human eye from the four color video signals corresponding to the four color filters is disposed subsequent to the output circuit 28. If an emerald (E) filter is disposed in addition to the three R, G, and B filters, the difference of the color reproduction can be reduced compared to when the three color filters are used, and, for example, the reproduction of the blue green color or the red color can be improved.

In the example shown in FIG. 10, the difference processing for two rows having the same color arrangement is discussed. However, the product-sum operation (subtraction and/or addition) for three or more rows having the same color arrangement may be performed. In this case, by performing the product-sum operation between rows having the same color arrangement, the computation between the pixels having the same color filter components can be executed without causing the color mixture.

Additionally, in the normal data processor 11A, the color video data D1 is generated and output based on one of the plurality of signals used in the product-sum operation in the computed data processor 11B. Accordingly, by the use of the single solid state imaging device 1, the color video data D1 and the computed data D2 are simultaneously generated and output to the outside the solid state imaging device 1. Thus, according to the situation, the image output can be suitably achieved by using one of or both the color image based on the video data D1 and the processed image based on the computed data D2, and as in the monochromatic imaging, in the color imaging, the solid state imaging device 1 can be used for various purposes.

As described above, according to the solid state imaging device 1 of the first and second embodiments, the counting operation is performed m times by switching the processing modes by using the up/down counter. In the configuration in which the unit pixels 3 are disposed in a matrix, the column AD circuits 25 are formed of column-parallel column AD circuits disposed in the individual vertical columns.

In addition to the computed data processor 11B having the column AD circuits 25B for implementing the product-sum operation by performing the counting operation m times, the normal data processor 11A having the column AD circuits 25A for extracting the true signal components Vsig indicating the difference between the reset components ΔV and the signal components by performing the normal counting operation is provided. Accordingly, the output of the normal image can be achieved simultaneously with the output of the processed image.

Thus, the subtraction processing result between the reference components (reset components) and the signal components can be directly obtained for each vertical column as the result of the second counting operation. Accordingly, a memory device for retaining the counting result for each of the reference components and the signal components can be implemented by a latch function provided for the counter, and it is not necessary to provide, separately from the counter, a dedicated memory device for retaining the AD converted data. Additionally, a subtractor for determining the difference between the reference components and the signal components is not necessary.

If the product-sum operation is performed by using a plurality of true signal components obtained by the subtraction processing, memory devices for retaining the counting operation can be implemented by the latch function provided for the counter. Accordingly, it is not necessary to provide, separately from the counter, a dedicated memory device for retaining the AD converted data.

Thus, the provision of peripheral circuits, such as a dedicated memory for retaining the AD conversion result, a dedicated subtractor for determining the difference between the reference components and the signal components, or a dedicated subtractor and a dedicated adder for performing the product-sum operation, become unnecessary. As a result, the circuit scale or the circuit area can be decreased, and the cost of the overall apparatus can be reduced. Additionally, an increase in the noise, the current, or the power consumption can be prevented.

Since the column AD circuit (AD converter) is formed of a comparator and a counter, regardless of the number of bits, the counting operation can be controlled by one count clock for operating the counter and the control line for controlling the count mode. This eliminates the need for providing a signal line for outputting the count value of the counter to the memory device, thereby preventing an increase in the noise or the power consumption.

That is, in the solid state imaging device 1 in which the AD converters are mounted on the same chip, the column AD circuits 25, which serve as the AD converters, are each formed of a pair of the voltage comparator 252 and the counter 254. Also, the counting operation by the counter 254 is performed by a combination of up-counting and down-counting so that the difference or the sum of the signal components can be used as digital data. Thus, the circuit scale or the circuit area can be decreased, and the power consumption can be reduced. Additionally, the number of wirings for interfacing with other functions can be decreased, or an increase in the noise or power consumption caused by the wiring can be prevented.

According to the product-sum operation mode using subtraction processing or addition processing or a combination thereof, the product-sum operation result can be output as multi-level data by using the up/down counting function of the column AD circuits 25B disposed in the column-parallel structure and the latch function of the counters without using a memory outside the chip. Thus, the flexibility to handle data is increased, and the high-precision product-sum operation can be implemented linearly or two-dimensionally. This makes it possible to easily implement the linear or two-dimensional spatial processing, such as edge detection processing, straight-line detection processing, or pattern matching processing.

Simultaneously with the product-sum operation in the computed data processor 11B, the video data D1 is generated by operating the normal data processor 11A, thereby simultaneously generating the video data D1 and the computed data D2 and outputting them to the outside the solid state imaging device 1. Thus, according to the situation, the image output can be suitably performed by using one of or both the monochromatic or color normal image based on the video data D1 and the linear or two-dimensional processed image based on the computed data D2.

Third Embodiment

Configuration of Solid State Imaging Device; Temporal Difference Processing

Figure 11:
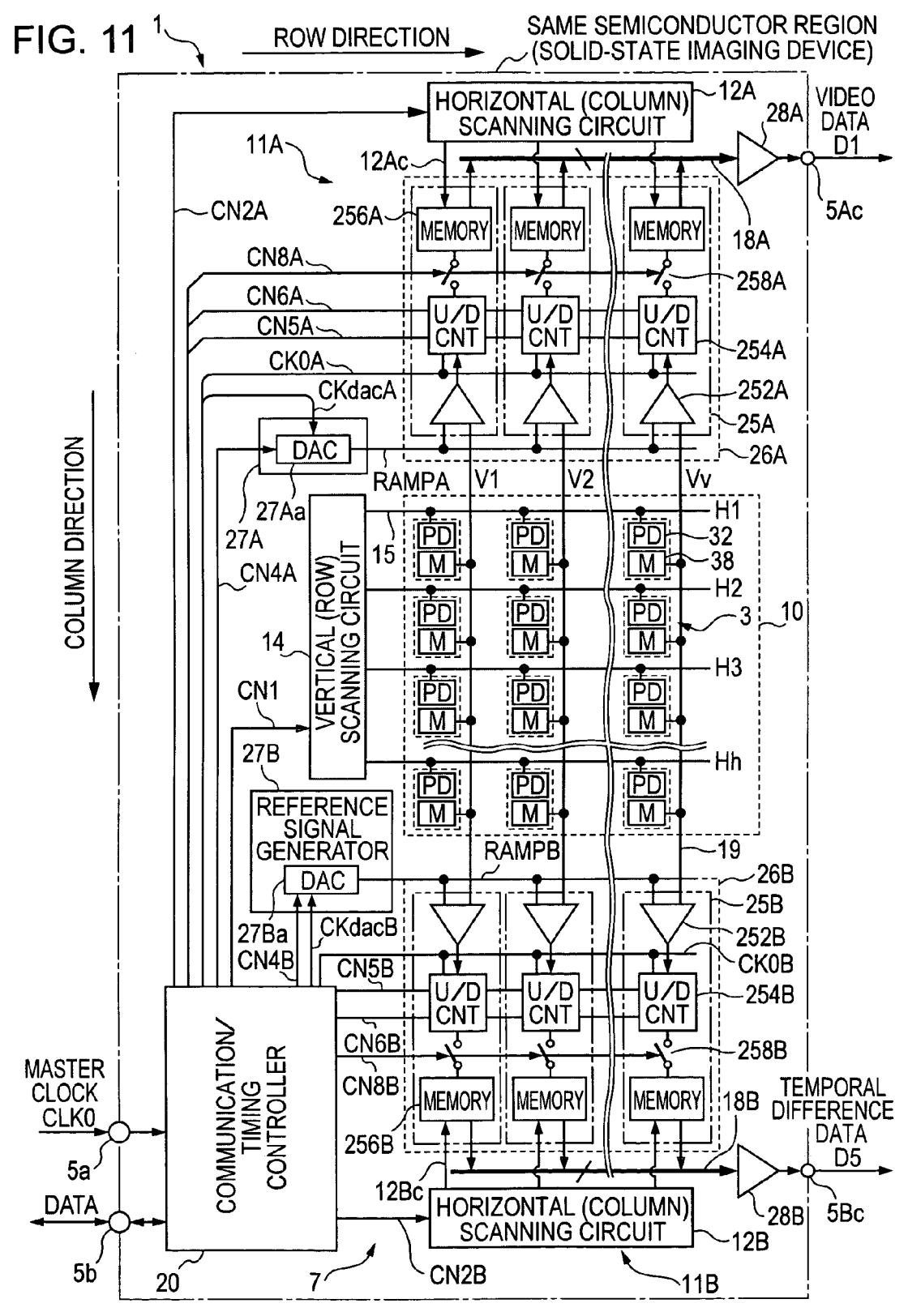
Figure 12A:
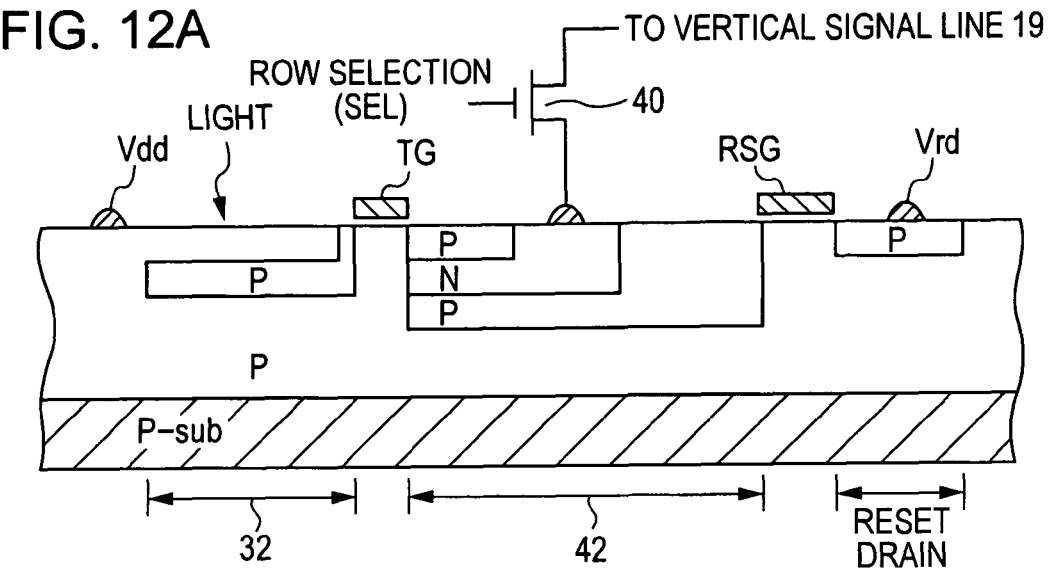
FIGS. 12A, 12B, and 12C schematically illustrate the structures of unit pixels used in the third embodiment shown in FIG. 11.
Figure 12B:
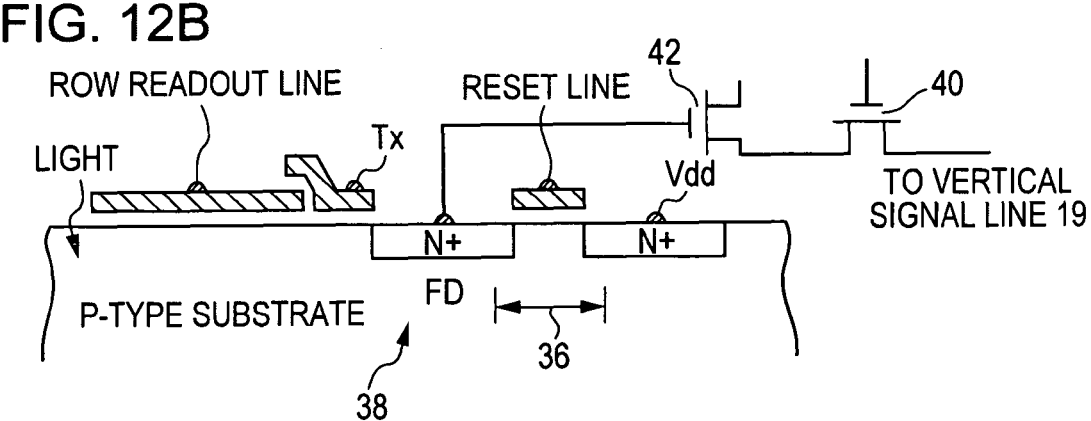
Figure 12C:
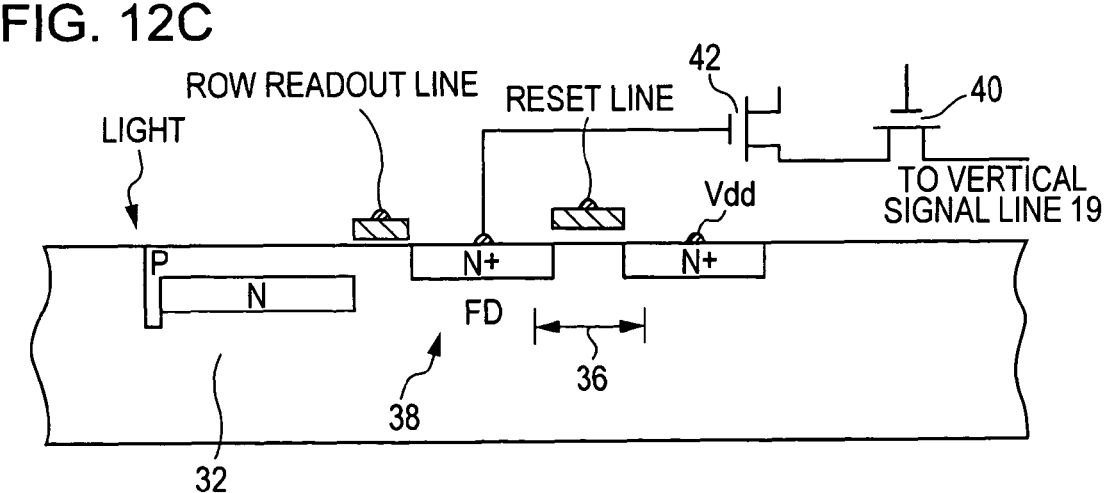

FIG. 11 is a schematic diagram illustrating the CMOS solid state imaging device according to a third embodiment of the present invention. FIGS. 12A through 12C are schematic diagram illustrating the structure of the unit pixels 3 used in the third embodiment. The solid state imaging device 1 of the third embodiment is characterized in that the temporal processing is performed instead of the spatial processing to detect a moving part as the product-sum operation processing function. When the temporal processing is performed, pixels located at the same position are subjected to the processing.

The unit pixel 3 in the pixel portion 10 of the third embodiment includes a charge generator (PD; photo-detector/photo-electric conversion device) 32, such as a photodiode, for generating and accumulating electric charge corresponding to incident light, an amplifying transistor (M) 42 for outputting an analog signal corresponding to the incident light to the node between the source and the drain of the amplifying transistor 42 in accordance with the electric charge supplied to the control region (gate), a p-channel readout selection transistor 34 for directly and selectively transferring the electric charge generated and accumulated in the charge generator 32 to the control region of the amplifying transistor 42, a p-channel reset transistor 36 for resetting the electric charge in the control region of the amplifying transistor 42, and an n-channel vertical selection transistor 40 disposed between the amplifying transistor 42 and the vertical signal line 19 so as to separate/connect the source of the amplifying transistor 42 and the vertical signal line 19.

As shown in FIG. 12A, the mechanism of the unit pixel 3 is as follows. The electric signal (signal charge) corresponding to the incident light detected by the charge generator 32 is supplied to the gate (control region) of the amplifying transistor 42, and is current-amplified by the source-follower operation. Then, the electric signal is read out to the corresponding vertical signal line 19 so that a signal voltage appears in the vertical signal line 19.

As the amplifying transistor 42, n-channel junction field effect transistor (JFET) is used. The P-type region of the JFET also serves as an inter-pixel memory (charge storage portion) for storing holes, which are the signal charge detected in the charge generator 32. Accordingly, by using the signals accumulated in both the charge generator 32 and the amplifying transistor 42, the signal of the previous frame and the signal of the current frame can be sequentially output from the unit pixel 3 at short intervals and can be compared.

The sources of the amplifying transistors 42 are connected in common to the corresponding vertical signal line 19 via the pixel-separating vertical selection transistor 40. A power supply voltage Vdd (positive voltage) is applied to the drain of each amplifying transistor 42 and the cathode of the charge generator 32.

The source-drain of the transfer readout selection transistor 34 is connected to the anode of the charge generator 32 and the gate (control region) of the amplifying transistor 42. Also, the transfer gates (TG) of the transfer readout selection transistors 34 are connected in common to the corresponding row control line 15 (more specifically, the transfer gate wiring) for the unit pixels 3 disposed in a matrix, and when the drive pulse φTG output from the vertical scanning circuit 14 connected to the row control line 15 is applied, the transfer readout selection transistors 34 are sequentially operated in accordance with the level of the drive pulse φTG.

The power supply voltage Vrd is connected to the drains (reset drains) of the reset transistors 36 of the unit pixels 3, and the voltage is applied to the drains of the reset transistors 36. The gates (RSG) of the reset transistors 36 are connected in common to the corresponding row control line 15 (more specifically, the reset wiring) connected to the vertical scanning circuit 14, and the sources of the reset transistors 36 and the sources of the transfer readout selection transistors 34 are used in common with each other.

When the drive pulse φRG is applied to the gates of the reset transistors 36 from the vertical scanning circuit 14, the reset transistors 36 are operated in accordance with the level of the drive pulse φRG. The gates of the pixel-separating vertical selection transistors 40 are connected in common to the corresponding row control line 15 (more specifically, row selection lines/vertical selection lines) for the unit pixels 3 disposed in a matrix, and the pixel-separating vertical selection transistors 40 are sequentially operated in accordance with the level of the drive pulse φSEL from the vertical scanning circuit 14.

Although it is not shown, a load transistor portion including load MOS transistors (not shown) having drain terminals connected to the corresponding vertical signal line 19 is disposed on the signal path of the vertical signal line 19 between the column processor 26 and the horizontal scanning circuit 12, and a load controller (load MOS controller) for controlling the driving of the load MOS transistors is provided.

The amplifying transistors 42 forming the unit pixels 3 are connected to the corresponding vertical signal line 19, and the vertical signal line 19 is connected to the drains of the load MOS transistors. Also, the load control signal CTld from the load controller is input into the gate terminals of the load MOS transistors, and when a signal is read out, a predetermined constant current continues to flow by the load MOS transistors connected to the amplifying transistors 42.

In this embodiment, a JFET, which serves as, not only an amplifier, but also an inter-pixel memory, is used as the unit pixel 3, and by using the memory function of the JFET, pixel signals of a plurality of frames at the same pixel position are obtained. However, the pixel structure for obtaining the pixel signals of a plurality of frames at the same pixel position is not restricted to the use of JFETs.

As the pixel structure using the inter-pixel memory, not only JFET, but also, a MOS diode, which is referred to as a "photo-gate", may be used, as shown in FIG. 12B, as the photodiode of the charge generator 32. In this pixel structure, signal charge photoelectrically converted by the photo-gate is transferred to a floating diffusion (FD) 38, which serves as an inter-pixel memory, formed across a readout gate Tx, and a change in the voltage of the floating diffusion 38 is amplified by the amplifying transistor 42 and is then output. In this case, the floating diffusion 38 has been reset to output a reset signal, and then, the signal charge is read out via the readout gate Tx from the photo-gate in which the signal charge has been accumulated, and the pixel signal is output. The KTc noise of the floating diffusion 38 can be advantageously removed by the CDS operation of the pixel signal and the reset signal.

As another pixel structure using the floating diffusion 38, which serves as an inter-pixel memory, an embedding photodiode may be used, as shown in FIG. 12C. It can be considered that the readout operation in this pixel structure can be operated by substituting the readout gate Tx using the photo-gate by the readout selection transistor 34. In the embedding photodiode, a low dark current can be implemented since the depletion layer generated at the p-n junction does not reach the surface of the pixel, and the absorption of light by an electrode material, such as a photo-gate, can be prevented. As in the structure using the photo-gate, KTc noise occurring during resetting is not generated.

The readout timing when a photo-gate or an embedding photodiode is used instead of a JFET and is combined with the floating diffusion 38, which serves as an inter-pixel memory, is not shown. Generally, however, as in the readout timing for the JFET shown in FIG. 13, after reading out the signal components of the previous frame accumulated in the floating diffusion 38, the floating diffusion 38 is reset, and then, the signal charge generated in the charge generator 32 by the exposure in the current frame is transferred to the floating diffusion 38, thereby reading out the signal components of the current frame.

FIG. 13 is a timing chart illustrating the operation for driving the unit pixels 3 of the third embodiment. FIG. 13 illustrates the readout operation performed by one unit pixel 3 for detecting incident light at regular intervals in two continuous frames, i.e., the n−1 frame (previous frame), and the n frame (current frame).

Among the unit pixels 3 disposed in a matrix, the unit pixels 3 in the same row perform the same readout operation. In FIG. 13, the period t60 to t69 in the n−1 frame or the n frame indicates the readout operation of the unit pixels 3 of the first row, and the period t70 to t79 indicates the readout operation of the unit pixels 3 of the second row. A description is now given of, mainly, the readout operation of the unit pixels 3 of the first row in the n frame (current frame), from the period t60 of the n frame in the timing chart shown in FIG. 13. The readout operation of the n−1 frame is the same as that of the n frame.

Before the period elapses from t60 to t61 in the n frame (equivalent to the period after t75 of the n−1 frame), the drive pulse φTG in each row is maintained at the high level, the drive pulse φSEL in each row is maintained at the high level, and the drive pulse φRG in each row is maintained at the high level.

In this manner, before t61, since the drive pulse φTG in each row is at the high level, the transfer readout selection transistor 34 is OFF, and since the drive pulse φRG in each row is at the high level, the reset transistor 36 is OFF.

Accordingly, the gate (control region) of the amplifying transistor 42 is set in the floating state. However, due to the parasitic capacitance effect, the electric charge (first signal charge) corresponding to the incident light generated in the charge generator 32 and transferred to the gate (control region) of the amplifying transistor 42 via the readout selection transistor 34 when the transfer readout selection transistor 34 is ON in the previous n−1 frame is still retained in the gate (control region) of the amplifying transistor 42 even after the readout selection transistor 34 is OFF. The amplifying transistor 42 continues outputting the electric signal corresponding to the gate voltage by the source-follower operation until the electric charge accumulated in the gate (control region) is reset.

After the transfer readout selection transistor 34 is OFF, the electric charge (second signal charge) corresponding to the incident light is generated and accumulated in the charge generator 32. In this case, the first signal charge is electric charge corresponding to the incident light in the n−1 frame (previous frame) generated and accumulated in the charge generator 32, and the second signal charge is electric charge corresponding to the incident light in the n frame (current frame) generated and accumulated in the charge generator 32.

Before t61, since the drive pulses φSEL are at the high level, the pixel-separating vertical selection transistor 40 is OFF, and each unit pixel 3 is separated from the vertical signal line 19.

When the period reaches t61 after t60, the drive pulse φSEL1 of the first row is inverted to the low level, and the pixel-separating vertical selection transistor 40 of each unit pixel 3 of the first row is turned ON, and the source of the amplifying transistor 42 is connected to the vertical signal line 19 and is turned ON to select the vertical signal line 19. In this case, the first signal charge corresponding to the incident light has already been transferred to the gate (control region) of the amplifying transistor 42 of each unit pixel 3 of the first row in the previous frame (period t63 in the n−1 frame), and the first signal charge is retained even after the readout selection transistor 34 is turned OFF. Accordingly, the electric signal corresponding to the retained first signal charge is output to the vertical signal line 19.

At t61, the reset transistor 36 is OFF. Accordingly, when each amplifying transistor 42 of the first row selected at t61 performs the source-follower operation, the potential of the source of the amplifying transistor 42 is increased until the current (drain current) flowing between the source and the drain reaches the current value IB flowing in a constant current source by the load MOS transistor (not shown).

In this case, the first signal charge has also been transferred to the gate (control region) of each amplifying transistor 42 of the first row in the previous frame (period t63 in the n−1 frame), and the gate voltage is still retained after completing the transfer operation (after the transfer readout selection transistor 34 is OFF). Accordingly, the first output signal Vssn-1 corresponding to the first signal charge is output by the source-follower operation. The first output signal Vssn-1 is expressed by Equation 7.

Equation 7:

$$V\text{ssn-1} = V\!RD + V\!S1 - V\!T = V\text{sig1} \quad (7)$$

In Equation 7, VRD indicates the power supply voltage supplied when the reset transistor 36 is ON in the n−1 frame, VS1 represents an increase in the gate potential of the amplifying transistor 42 in accordance with the first signal charge in the n−1 frame, and VT designates the voltage between the gate and the source of the amplifying transistor 42 when the drain current of the amplifying transistor 42 reaches the load current IB defined by the load MOS transistor (not shown). The value of VS1 is determined by the first signal charge corresponding to the incident light/gate capacitance. The output signal Vssn-1 in the n−1 frame detected as described above is output to the column AD circuit 25 of the corresponding vertical column. In actuality, by the reset operation for resetting the drive pulse φRG to the low level, the pixel signal contains, not only the true signal components, but also reset components and other variation components (hereinafter collectively referred to as ΔV1), as discussed in the first embodiment.

For each amplifying transistor 42 of the second row, since the drive pulse φSEL2 still remains at the low level, each pixel-separating vertical selection transistor 40 of the second row is OFF, and the source of each amplifying transistor 42 of the second row is not connected to the vertical signal line 19 (non-selecting state). Thereafter, when the period reaches t62, the drive pulse φRG1 is inverted to the low level.

By inverting the drive pulse φRG1 to the low level at t62, the reset transistor 36 of the first row is turned ON so that the power supply voltage VRD (readout level) is transferred to the gate (control region) of each amplifying transistor 42 of the first row. By turning ON the reset transistor 36, the first signal charge is discharged from the gate (control region) of the amplifying transistor 42, and at the same time, the gate of the amplifying transistor 42 (control region) is biased to the power supply voltage VRD (readout level).

When the period reaches t63, the drive pulse φRG1 is inverted to the high level. Accordingly, the reset transistor 36 of the first row is again turned OFF, and the gate (control region) of the amplifying transistor 42 of the first row is set in the floating state. However, due to the parasitic capacitance effect, the gate of the amplifying transistor 42 remains biased to the power supply voltage VRD (readout level).

When the period reaches t64, the drive pulse φTG1 is inverted to the low level, and the transfer readout selection transistor 34 of each unit pixel 3 in the first row is turned ON so that the electric charge (second signal charge) corresponding to the incident light generated and accumulated in the photodiode of each unit pixel 3 in the first row is transferred to the gate (control region) of the amplifying transistor 42 of each unit pixel 3 in the first row. The second signal charge serves as electric signal charge according to the incident light in the n frame.

As discussed above, when the electric charge (second signal charge) corresponding to the incident light in the n frame (current frame) is transferred to the gate (control region) of the amplifying transistor 42, the gate potential of the amplifying transistor 42 is increased by the transferred electric charge. Thus, the amplifying transistor 42 of the first row performs the source-follower operation, and the source potential of the amplifying transistor 42 is increased by the gate potential.

In this case, the second output signal (second electric signal) corresponding to the second signal charge is output from each amplifying transistor 42 of the first row performing the source-follower operation to the vertical signal line 19 via the pixel-separating vertical selection transistor 40 which is turned ON.

When the period reaches t65, the drive pulse φTG1 of the first row is inverted to the high level, and each transfer readout selection transistor 34 of the first row is turned OFF. Accordingly, the transfer of the electric charge (second signal charge) corresponding to the incident light generated and accumulated in the charge generator 32 of each unit pixel 3 of the first row to the gate (control region) of the amplifying transistor 42 is finished, and thus, the gate (control region) of the amplifying transistor 42 is set in the floating state. However, due to the parasitic capacitance effect, the gate potential remains at an increased level for the transferred electric charge (second signal charge).

In the n frame, the electric charge transferred to the gate (control region) as the second signal charge for the current frame is retained until the gate is reset in the subsequent n+1 frame (not shown), i.e., until the reset transistor 36 is turned ON. As a result, the electric charge accumulated in the gate is used as the first signal charge (electric charge for the previous frame) in the n+1 frame.

As discussed above, the transfer readout selection transistor 34 is turned ON so that the second signal charge is temporarily transferred to the gate (control region) of the amplifying transistor 42, and then, the second signal charge is retained in the gate (control region) even after the transfer readout selection transistor 34 is turned OFF. Accordingly, by the source-follower operation (after t65) until the gate is reset, the electric signal (second output signal Vssn) corresponding to the electric charge (second signal charge) accumulated in the gate is output from the amplifying transistor 42.

In the period from t64 to t65, when the current flowing between the source and the drain reaches the load current IB defined by the load MOS transistor (not shown) by the source-follower operation, the potential of the source (second output signal Vssn) of the amplifying transistor 42 becomes the value expressed by Equation 8.

Equation 8:

$$Vssn = VRD + VS2 - VT = Vsig2 \tag{8}$$

In Equation 8, VS2 indicates an increase in the gate potential of the amplifying transistor 42 in accordance with the second signal charge. As in VS1, the value of VS2 is indicated by the second signal charge corresponding to the incident light/gate capacitance. In actuality, by the reset operation for resetting the drive pulse φRG to the low level, the pixel signal contains, not only the true signal components, but also reset components and other variation components (hereinafter collectively referred to as "ΔV2"), as in the first embodiment. The n-frame output signal Vssn detected as described above is output to the column AD circuit 25 of the corresponding vertical column.

When the period reaches t69, the drive pulse φSEL1 is inverted to the high level, the pixel-separating vertical selection transistor 40 is turned OFF, and the unit pixels 3 of the first rows and the vertical signal line 19 are separated.

In the subsequent period t70 to t79, the operation similar to the readout operation of the unit pixels 3 of the first row in the period t60 to t69 is repeatedly performed on the unit pixels 3 of the second row, thereby performing the temporal difference operation in the n frame.

As discussed above, the output signals Vssn-1 and Vssn in the n−1 frame and the n frame, respectively, obtained between the two continuous frames (n−1 frame and n-frame) and representing the analog luminance output from the corresponding unit pixels 3 in accordance with the incident light are input into the column AD circuit 25.

By directly supplying the electric charge generated and accumulated in a photoelectric conversion device, such as a photodiode, to the control region of a JFET, the electric signal corresponding to the electric charge supplied to the gate can be output as two signals, such as the electric signal for the previous frame and the electric signal for the current frame. In this case, the pixel signals are read via the vertical signal line 19 in the form of voltage signals converted from the electric charge transferred to the gate. Accordingly, a deterioration in the signals caused by the charge distribution can be suppressed compared to when the pixel signals are output as the electric charge (in the current mode).

In the column AD circuit 25, the difference between the first analog output signal Vssn-1 and the second analog output signal Vssn for a plurality of frames obtained between the two continuous frames (n−1 frame and n frame) is detected, i.e., the temporal difference processing is performed, thereby detecting a moving part. By repeating the above-described operation, a moving part between another two or more continuous frames can be detected.

Third Embodiment

Temporal Difference Processing Operation

Figure 14:
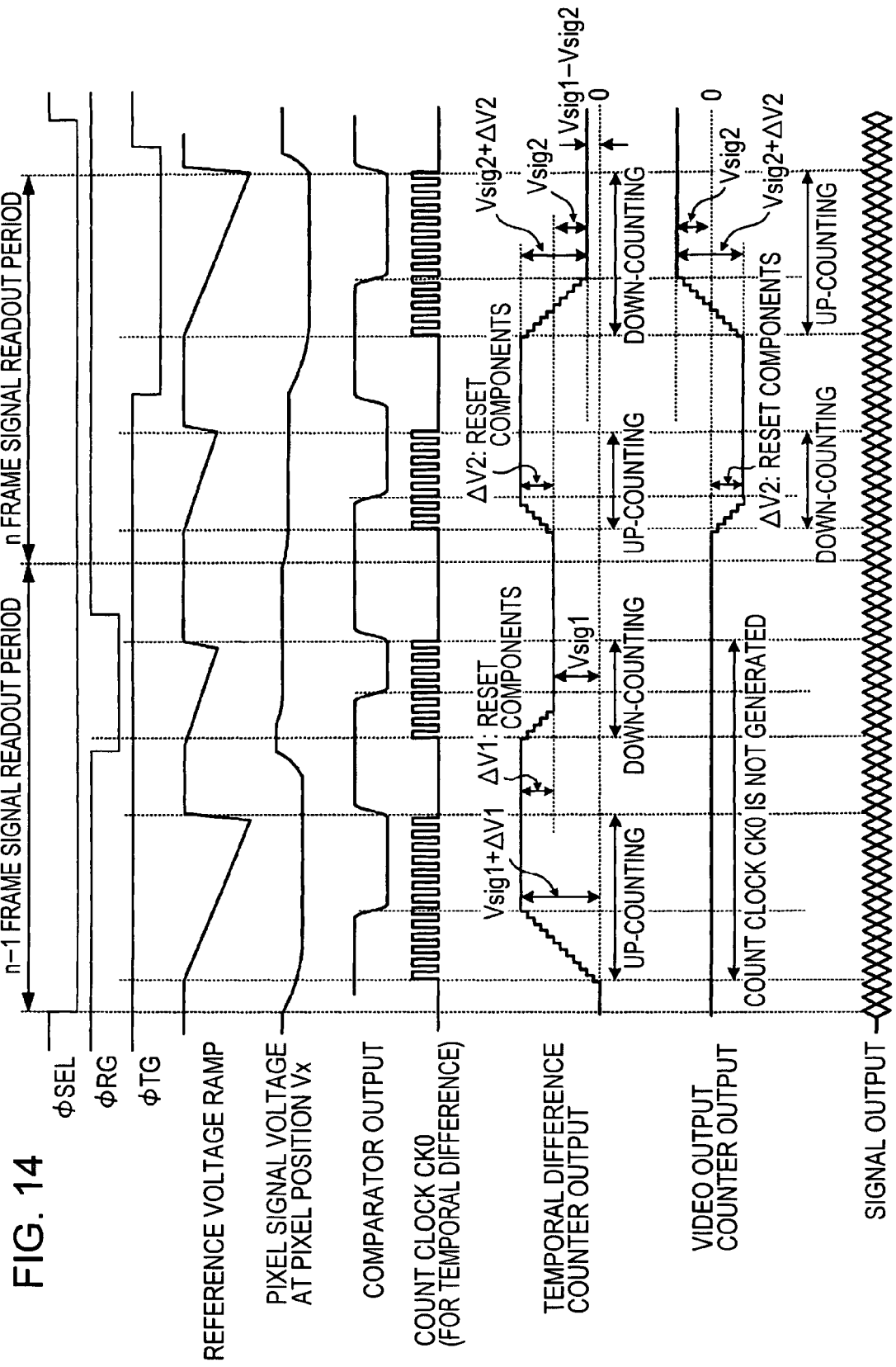
FIG. 14 is a timing chart illustrating a temporal difference processing operation in the column AD circuits of the solid state imaging device of the third embodiment shown in FIG. 11.
Figure 15:
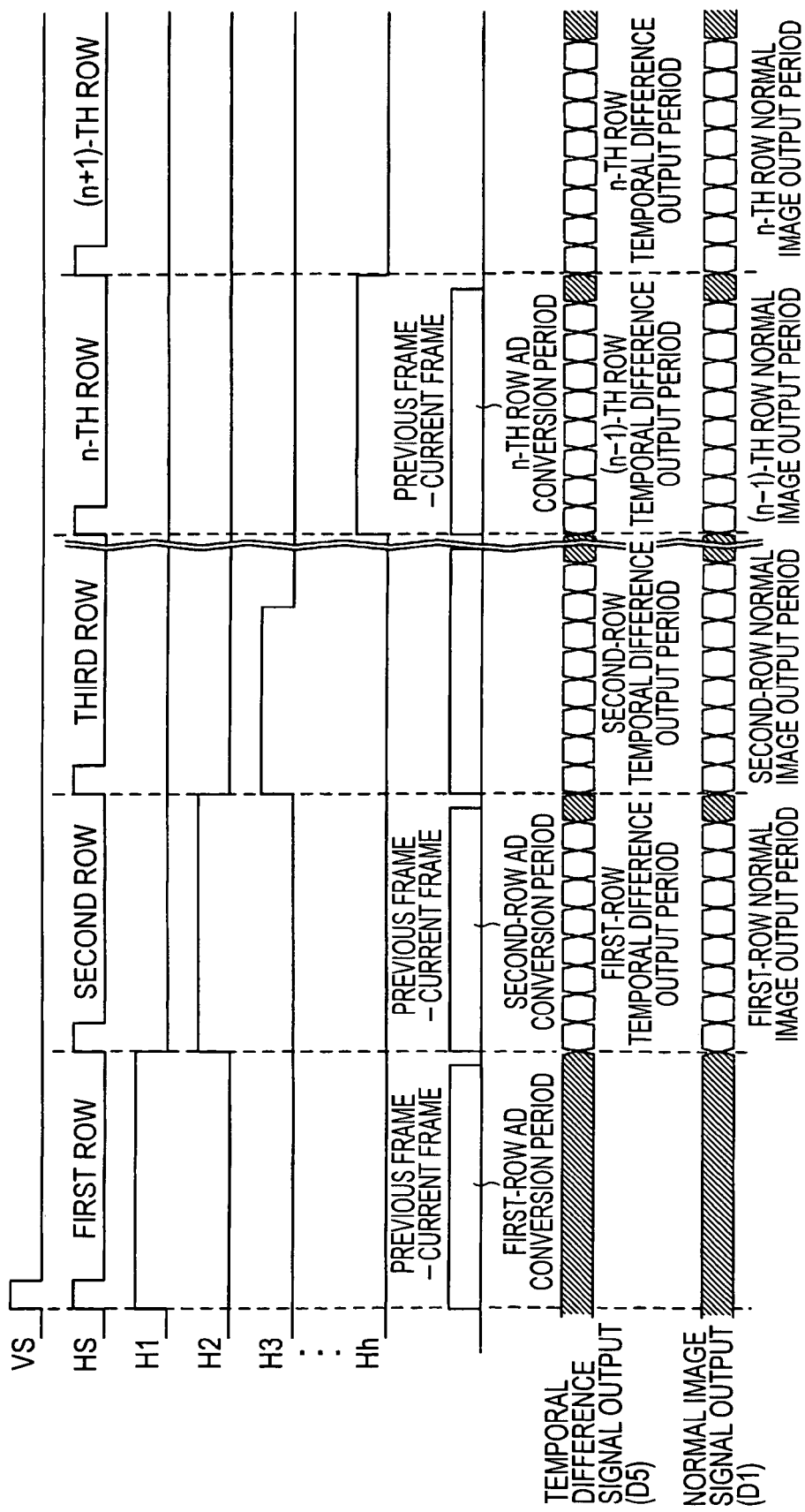
FIG. 15 is a timing chart illustrating the temporal difference processing in relation to the frame rate.

FIG. 14 is a timing chart illustrating the temporal difference processing operation performed by the column AD circuit 25 of the solid state imaging device 1 of the third embodiment shown in FIG. 11. FIG. 15 is a timing chart illustrating the temporal difference processing operation in relation to the frame rate. A description is given below by separating the temporal difference operation into the temporal difference output operation by the computed data processor 11B and the normal video output operation by the normal data processor 11A.

Temporal Difference Output Operation

It can be considered that the operation timing in the temporal difference processing shown in FIG. 14 is performed by substituting the n−1 row (previous row) and the n row (current row) in the spatial difference processing of the second embodiment shown in FIG. 8 by the n−1 frame (previous frame) and the n frame (current frame), respectively.

The column AD circuit 25 sequentially reads at short intervals the pixel signal Vssn-1 of the previous frame n−1 accumulated in the amplifying transistor 42 and the pixel signal Vssn of the same row of the current frame n as that of the previous frame n−1 accumulated in the charge generator 32, and calculates the difference between the pixel signal Vssn-1 and the pixel signal Vssn.

More specifically, after completing the second counting operation for the pixel signal Vssn-1 of the previous frame, when starting the first up-counting operation for the pixel signal Vssn of the current frame, the counting operation is performed without resetting the count value stored in the counter 254. Accordingly, the temporal difference data D5, which is the count value stored in the counter 254 after completing the second counting operation for the pixel signal Vssn of the current frame, becomes the k-bit digital value indicating the temporal computation result (Vssn-1−Vssn) between the two pixel signals Vssn-1 and Vssn of the different frames, as expressed by Equation 9. Since difference computation between the two pixel signals Vssn-1 and Vssn of different frames, i.e., with different imaging times, is performed, the difference processing is not spatial difference processing, but is temporal difference processing.

Equation 9:

$$=Vsig1-Vsig2=(n-1 \text{ frame signal } Vssn\text{-}n)-(n \text{ frame signal } Vssn)=(VRD+VS1-VT)-(VRD+VS2-VT)=VS1-VS2 \tag{9}$$

Unless the temporal difference data D5 found in Equation 9 is 0, a motion has occurred between the frames so that a moving part of the subject can be detected.

As is seen from the drive timing of the unit pixel 3 shown in FIG. 14, for the pixel signal of the n−1 frame (previous frame), the reset components and other variation components (ΔV1) based on the drive pulse φRG appear after the true signal components Vsig1, while, for the pixel signal of the n frame (current frame), the true signal components Vsig2 appear after the reset components and other variation components (ΔV2) based on the drive pulse φRG.

Accordingly, when performing the counting operation for the temporal difference processing, the communication/timing controller 20 controls the count modes in the counter 254 by considering the appearance of the above-described components. For example, as shown in FIG. 14, for the n−1 frame, the counting operation is performed by adding the signal components Vsig1 and ΔV1 in the up-counting mode, and then, the counting operation is performed for ΔV1 in the down-counting mode, thereby determining the count value (pixel data) of the signal components Vsig1 of the n−1 frame. For the subsequent n frame, the counting operation is performed for ΔV2 in the up-counting mode, and then, the counting operation is performed by adding the signal components Vsig2 and ΔV2 in the down-counting mode. As a result, Vsig1−Vsig2, i.e., the difference between the true signal components in the two frames, can be determined as the counting result.

It can be considered that ΔV1 and ΔV2 are substantially the same since they are based on the drive pulse φRG at the same time point. Accordingly, even if the counting operation for ΔV1 and ΔV2 is omitted, Vsig1−Vsig2, i.e., the difference between the true signal components in the two frames, can be determined as the counting result. In this case, the power consumption can be reduced by an amount equal to the counting operation.

When a moving part is detected based on the count value obtained by the above-described temporal difference processing, threshold processing is preferably performed in order to prevent the erroneous determination due to the components, such as random noise. That is, it can be determined that a moving part has been detected when the digital value obtained in Equation 9 is greater than or equal to a predetermined value.

However, if the depth of field is too bright or too dark, a motion signal cannot be generated with high precision. The shot noise caused by charge fluctuations is proportional to the square root of the magnitude of a signal. That is, if the luminance level is higher since the depth of field is bright, the level of the shot noise becomes higher. Accordingly, if the threshold for the determination processing is constant, a still subject having a higher luminance level is erroneously determined to be a moving part, or conversely, the motion of a low-contrast subject cannot be sufficiently detected. If the depth of field is dark, a still subject is erroneously determined to be a moving part since it is vulnerable to random noise.

In order to solve this problem, the threshold for the determination processing is adjusted according to the situation. For example, when the contrast of a subject is high or when the depth of field is dark, the threshold for the determination processing is increased. In contrast, when the contrast of a subject is low or when the depth of field is bright, the threshold for the determination processing is decreased. With this arrangement, the motion of a subject can be detected with high precision.

As described above, in this embodiment, since the temporal difference data D5 indicating a moving part is output as n-bit multi-level digital data, the flexibility to handle data is increased. Thus, even outside the device, a determination as to whether a subject is a moving part can be made with high precision based on the difference between the electric signal of the previous frame and the electric signal of the current frame in accordance with environment conditions, such as the contrast of the subject or illumination.

The temporal difference computation is performed in a manner similar to that in the first or second embodiment. By using the voltage comparator 252 and the counter 254, a voltage signal in accordance with the pixel signal of each frame is compared with the reference signal which changes at a predetermined gradient. Then, the period from when the reference signal is generated to when the voltage signal coincides with the reference signal is counted with the count clock, thereby obtaining the count value corresponding to the difference between the voltage signals in accordance with the pixel signals of the frames. It is thus possible to easily obtain a difference signal representing a moving part while performing AD conversion without the need to provide an additional difference circuit after an AD converter.

Additionally, as in the first and second embodiments, the circuit scale or the circuit area can be decreased, and the power consumption can be reduced. The number of wirings for interfacing with other functions can be reduced, and the noise or the consumed current caused by the wirings is not increased.

Normal Video Output Operation

For the normal image output processing operation, the readout operation of the n frame shown in FIG. 14 is performed. To prevent the readout operation for the n−1 frame (previous frame), the supply of the count clock CK0 to the reference signal generator 27A or the counter 254A is stopped. With this arrangement, only the n-frame (current frame) video signal can be extracted (see FIG. 15).

The sign of the pixel signal during the readout period of the n frame (current frame) in the temporal difference processing shown in FIG. 14 is negative. As for the normal image output processing, the reset level $\Delta V2$ is read in the down-counting mode, and the signal level Vssn (true signal components Vsig2) is read in the up-counting mode, thereby making it possible to obtain a positive-sign pixel signal.

As discussed above, according to the solid state imaging device 1 of the third embodiment, the video data D1 representing a normal image is output together with the temporal difference data D5 for detecting a moving part, thereby simultaneously performing the motion detection and the output of a video signal. Accordingly, the temporal difference data D5 and the video data D1 can be suitably switched according to the situation or both the data can be simultaneously used. As a result, the imaging apparatus 1 can be used for various purposes.

In the above-described embodiment, the plurality of column AD circuits 25B are disposed in the vertical columns, and the pixel signals for one row transmitted from the pixel portion 10 are simultaneously processed in the corresponding column AD circuits 25B. In this configuration, by conducting AD conversion by combining the comparison processing and the counting operation, the temporal difference processing is performed. The basic mechanism for performing the temporal difference processing by conducting AD conversion with a combination of the comparison processing and the counting operation can be applied to a device for extracting and processing the pixel signals one by one.

The application of this mechanism to a device having the unit pixels 3, each provided with an inter-pixel memory, such as a JFET or a floating diffusion, has been discussed. However, the application of the mechanism is not restricted to a device having an inter-pixel memory. For example, if an inter-pixel memory is not provided, a pixel signal in the previous frame is read and is compared with the reference signal, and simultaneously with this comparison processing, the counting operation is performed. The count value when the comparison processing is finished is obtained and is temporarily stored in a frame memory outside the device, thereby completing the AD conversion for the previous frame.

That is, the pixel signal of one frame (previous frame) subjected to the difference processing has been formed into digital data. In this case, it is not essential that the column AD circuit 25B be used for forming the pixel signal of the previous frame into digital data. Another AD converter may be used for obtaining the pixel data of the previous frame and storing it in a frame memory.

Thereafter, during the AD conversion for the current frame, by using the count value (pixel data) of the previous frame at the same position as that of the current frame as the initial value of the counting operation, the pixel signal is compared with the reference signal, and at the same time, the counting operation is performed, and then, count value when the comparison processing is finished is obtained, thereby performing the temporal difference processing. If the count value (pixel data) of the previous frame stored in the frame is positive-sign data, the counting operation for the current frame is performed in the down-counting mode.

Fourth Embodiment

Temporal Addition Processing

Figure 16:
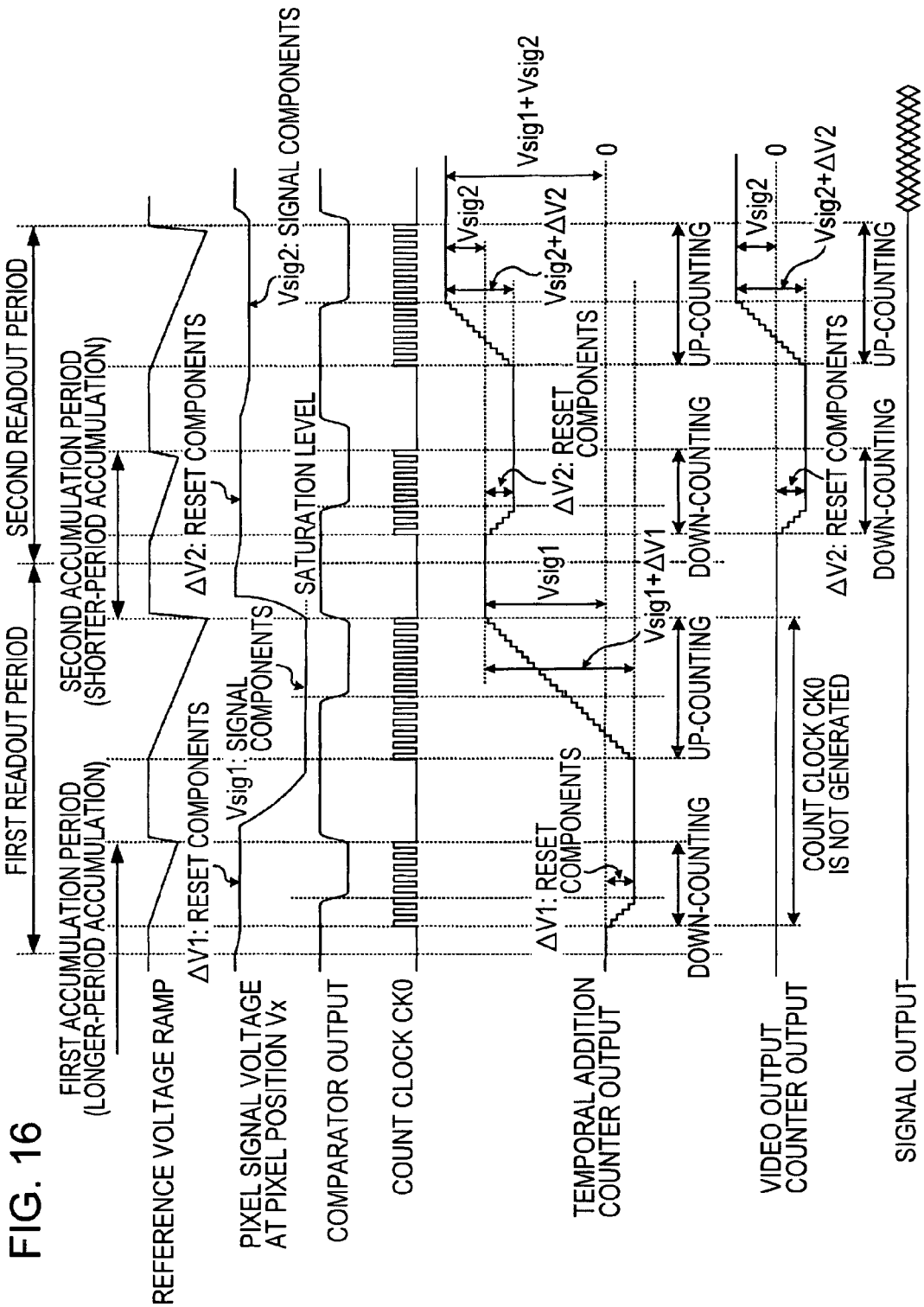
FIG. 16 is a timing chart illustrating a temporal addition processing operation in the column AD circuits of the computed data processor of the solid state imaging device of the first embodiment shown in FIG. 1.
Figure 17:
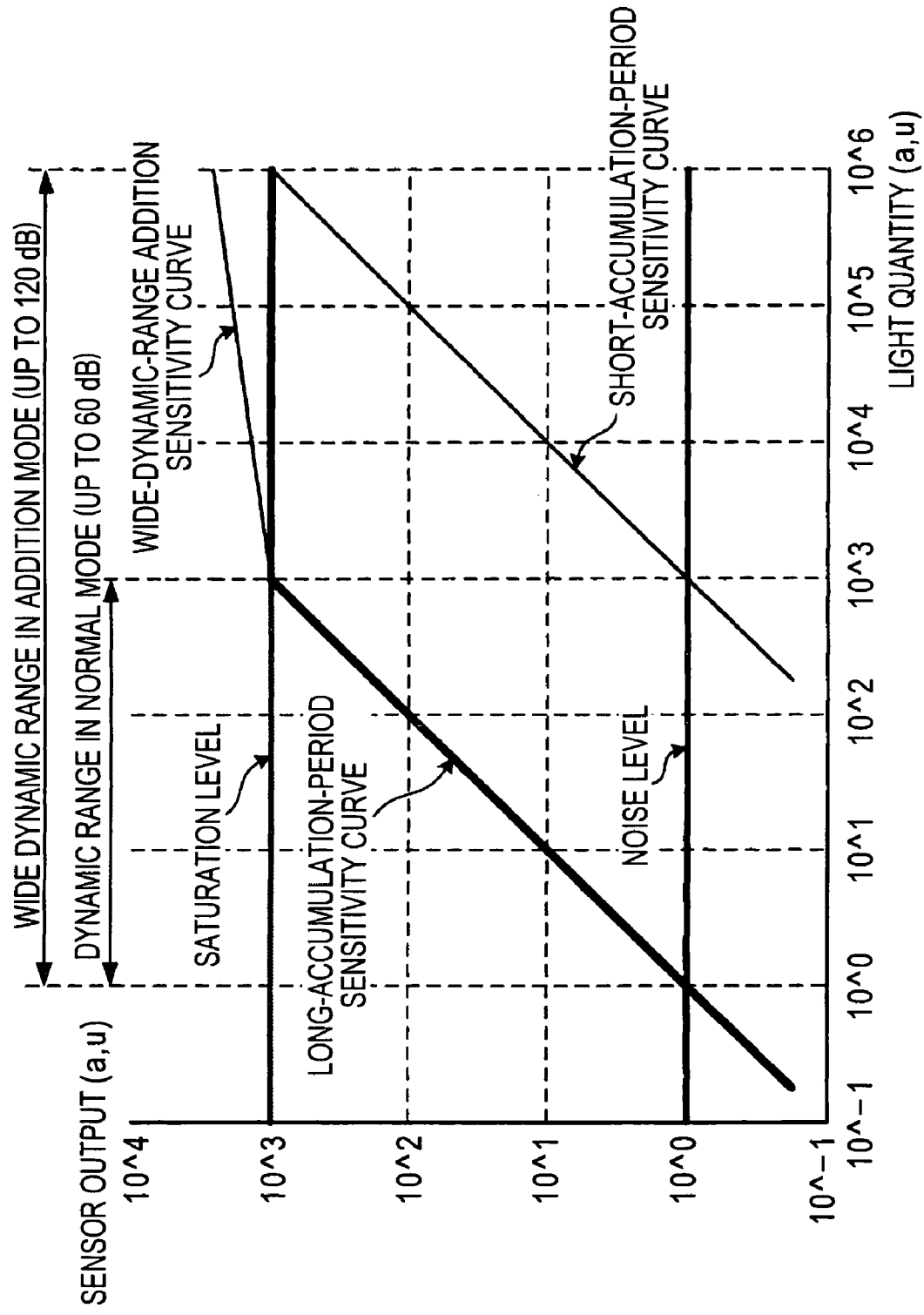
FIG. 17 illustrates temporal addition processing mode.
Figure 18A:
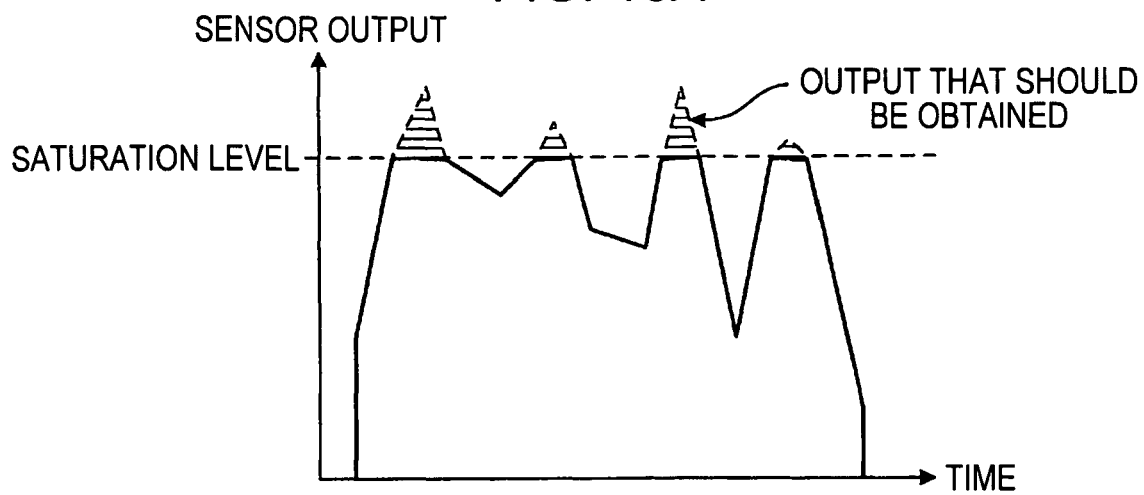
FIGS. 18A, 18B, and 18C illustrate temporal addition processing mode.
Figure 18B:
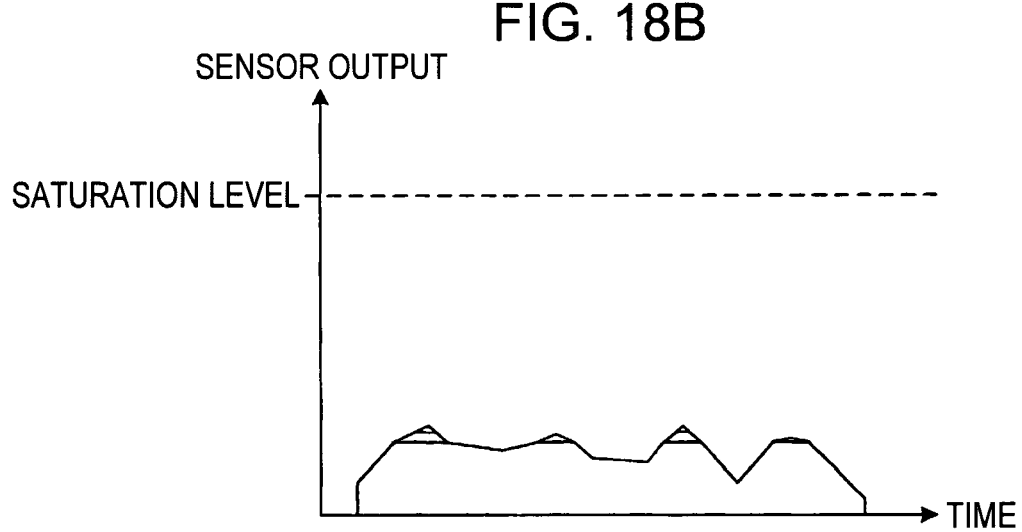
Figure 18C:
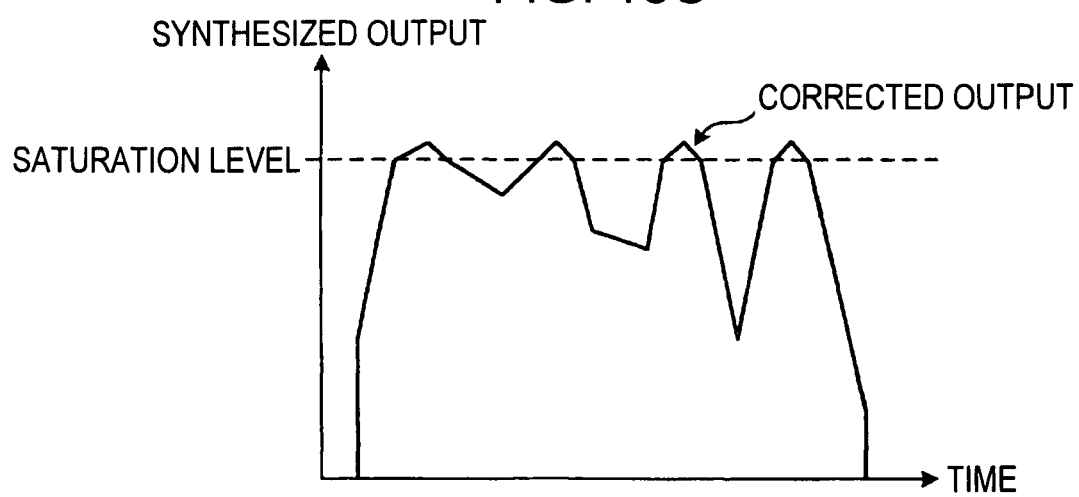

FIG. 16 is a timing chart illustrating the temporal addition processing operation of a fourth embodiment by the column AD circuit 25B in the computed data processor 11B of the solid state imaging device 1 of the first embodiment shown in FIG. 1. FIGS. 17 through 18C illustrate processing modes of the temporal addition processing in the fourth embodiment.

The temporal addition processing described below is characterized in that the dynamic range is increased by performing, as the product-sum operation function, the temporal addition processing instead of the spatial addition processing. In this case, the temporal addition processing is performed for a plurality of pixel signals captured by different charge accumulation periods. Accordingly, a synthetic image obtained by combining images having different charge accumulation periods can be obtained as a processed image. This processed image (synthetic image) has a wide dynamic range.

For the temporal addition processing, when images having different charge accumulation periods are handled, pixels subjected to addition processing are those disposed at the same position. For a charge-accumulation period range, a long charge accumulation period is set to be generally one frame period. If an electronic shutter function is used, the charge accumulation period can be decreased. In contrast, a short charge accumulation period is set to be one horizontal period (for example, 64 microseconds) or shorter. The reason for this is as follows. Due to the property unique to the CMOS sensors in which the charge accumulation period is different depending on the horizontal line due to the scanning, when reading out the pixel signals by scanning each horizontal line (scanning line), after reading the pixel signal accumulated for the long accumulation period in the same horizontal period, charge is accumulated for the short charge accumulation period, and then, the pixel signal accumulated for the short accumulation period is immediately read.

As is seen from a comparison between FIGS. 3 and 16, during the temporal addition processing, as in the spatial addition processing shown in FIG. 5, the combination of the count modes for the reset components $\Delta V$ and the signal components Vsig in the AD conversion for the pixel signals is set to be the same for a plurality of readout operations. That is, after completing the AD conversion for the first pixels accumulated for the comparatively long accumulation period, without resetting the counter 254B, the AD conversion for the second pixel signals is performed for the reset components ΔV and the signal components Vsig by the same combination of the count modes as that for the AD conversion for the first pixels accumulated for the comparatively long accumulation period.

With this operation, in the example shown in FIG. 16, the count value stored in the counter 254B after completing the second counting operation for the pixel signal accumulated for the short accumulation period is the n-bit digital value representing the addition computation result (Vsig1+Vsig2) between the two pixel signals V1 and V2 having different charge accumulation periods.

It is now assumed that the dynamic range of the image sensor is 60 dB and that the long charge accumulation period is set to be about one frame period, for example, about $\frac{1}{15}$ milliseconds, and the short charge accumulation period is set to be one horizontal period or shorter, about $\frac{1}{15}$ microseconds. In this case, as shown in FIG. 17, the sensor output with respect to the light quantity for the long accumulation period changes up to three orders of magnitudes in accordance with a change in the light quantity. The sensor output with respect to the light quantity for the short accumulation period also changes up to three orders of magnitudes. However, the light quantity detected by the pixels accumulated for the short accumulation period differs from that by the pixels accumulated for the long accumulation period by three orders of magnitudes.

According to the addition processing result (Vsig1+Vsig2) obtained by adding the outputs obtained by the first and second different accumulation periods, the dynamic range of six orders of magnitudes, i.e., 120 dB, can be implemented. For example, as shown in FIGS. 18A through 18C, an image having saturated portions detected by the long accumulation period shown in FIG. 18A can be compensated for by an image detected by the short accumulation period shown in FIG. 18B. Thus, the image portions at the saturation level or higher that cannot be output only by one accumulation period can be reproduced, as shown in FIG. 18C.

In actuality, if addition processing is simply performed, the ideal knee characteristic in which the sensor output with respect to the light quantity matches the luminosity cannot be achieved. That is, the sensor output does not match the human visual characteristic in which the brightness is identified in proportion to the logarithm of the light quantity.

To solve this problem, the reference signal RAMP generated in the reference signal generator 27B is changed in several different levels of the gradient instead of being linearly changed, though it is not shown. In this case, it is preferable that the gradient of the reference potential RAMP is set to be smaller at the initial stage of the AD conversion so that the coefficient can be large (higher gain), and as the AD conversion proceeds, the gradient of the reference potential RAMP is increased. With this arrangement, in accordance with the logarithmic characteristic of the human eye, the grayscale precision in a dark place is maintained so that the human eye is sensitive to a change in the brightness in a dark place, and the grayscale precision in a bright place is decreased so that the human eye is dull to a change in the brightness in a bright place.

With this arrangement, not only combining of different accumulation periods, but also gamma correction can be conducted on the sensitivity characteristic so that a natural sensor characteristic can be implemented. As a result, the difference in the sensitivity caused by the different accumulation periods can be naturally compensated for, and a more natural image can be synthesized.

As described above, as the application of the temporal addition processing, the following operation is performed. When conducting AD conversion by performing the counting operation for a plurality of pixel signals having different charge accumulation periods at the same position, digital data obtained for one of the pixel signals is used as the initial value for the counting operation for the other pixel signal (pixel signal to be subjected to the second counting operation). Accordingly, after conducting AD conversion by performing the counting operation for the other pixel signal, n-bit digital data indicating the addition computation result for all the pixel signals can be automatically obtained and output as the computed data D2. In this embodiment, data that allows an increased dynamic range can be obtained as the computed data D2. The bit width of the digital image data can be maintained to n bits while implementing a wide dynamic range, in other words, the bit width can be compressed. Accordingly, an image having a wide dynamic range in accordance with the light quantity while suppressing the overexposed highlight or the underexposed shadow can be obtained.

Without additional circuits, such as an adder and a line memory device, digital-value addition processing for a plurality of pixel signals having different charge accumulation periods at the same position can be performed. Since images having different accumulation periods can be combined as a digital value, the wide dynamic range can be implemented without the need to add external circuits, such as a frame memory, or internal circuits. By conducting gamma correction to the sensitivity characteristic, the sensor characteristic adjusted to the luminosity characteristic can be implemented.

In the above-described embodiment, in the same horizontal period, after reading pixel signals accumulated for a long charge accumulation period, pixel signals are accumulated for a short accumulation period, and then, the pixel signals accumulated for the short accumulation period are immediately read. Accordingly, since the short accumulation period is equal to one horizontal period (for example, 64 microseconds) or shorter, there is no flexibility in the charge accumulation period. To solve this problem, by using two pixels in the same vertical column (i.e., two rows), the long accumulation period is assigned to the pixel of one row, and the short accumulation period is assigned to the pixel of the other row. With this arrangement, the accumulation period can be flexibly set for each row, and thus, the short accumulation period becomes more flexible. Although the accumulation period may be set for each row by the vertical scanning circuit 14, to facilitate the control operation, a dedicated accumulation-period control circuit may be provided for each row.

Normal Video Output Operation

The normal image output operation in the normal data processor 11A is implemented by performing only the readout operation for the pixels accumulated for the long accumulation period or only the readout operation for the pixels accumulated for the short accumulation period in the timing chart shown in FIG. 16. To prevent one readout operation, the supply of the count clock CK0 to the reference signal generator 27A or the counter 254A is stopped. With this arrangement, the video signal only based on the pixels for one of the long accumulation period and the short accumulation period can be extracted (in FIG. 16, the example in which the pixels for the short accumulation period are extracted is shown).

Accordingly, the video data D1 representing a normal image is output simultaneously with the output of the computed data D2 from the computed data processor 11B by performing addition computation for a plurality of pixel signals having different accumulation periods at the same position as the application of the temporal addition processing.

Thus, the dynamic range can be enhanced simultaneously with the output of a normal video signal. As a result, an image with an increased dynamic range indicated by the temporal addition data and a normal image can be suitably switched according to the situation, or both the data are used. In this manner, the imaging apparatus 1 can be used for various purposes.

While the present invention has been described with reference to the disclosed embodiments, it is to be understood that the technical scope of the invention is not limited to the disclosed embodiments. On the contrary, the invention is intended to cover various modifications and equivalent arrangements without departing from the spirit of the invention, and the various modifications and arrangements are encompassed within the technical scope of the invention.

The above-described embodiments do not restrict the claimed invention, and all the combinations of the features disclosed in the embodiments are not necessarily essential as the solving means for the invention. The above-described embodiments include various modes of the invention, and by suitably combining a plurality of features disclosed in the embodiments, various inventions can be extracted. Even if some of the features disclosed in the embodiments are deleted, the resulting features can be extracted as the invention as long as they offer advantages.

For example, in the foregoing embodiments, although AD conversion functions are disposed in the column regions located at positions to read out signals from the pixel portion 10, they may be provided at another portion. For example, analog pixel signals may be output to the horizontal signal line 18, and then, they are converted into digital signals and are delivered to the output circuit 28.

Also in this case, a plurality of pixel signals subjected to the product-sum operation are compared with the AD conversion reference signal, and while the comparison processing is being performed, the counting operation is performed in one of the down-counting mode and the up-counting mode. Then, the count value when the comparison processing is finished is stored. In this case, the digital data obtained for one of the plurality of pixel signals subjected to the product-sum operation is used as the initial value for the counting operation, and thus, when AD conversion is conducted for the other pixel signal, the digital data representing the product-sum operation result can be obtained as the counting result.

As a result, a memory device for storing the counting result of each of the plurality of pixel signals subjected to the product-sum operation can be implemented by a latch function of the counter, and it is not necessary to provide, separately from the counter, a dedicated memory device for retaining the AD converted data. Only one AD conversion function is required for all the vertical columns, and the circuit scale can be reduced compared to that in the foregoing embodiments although fast conversion processing is required.

In the aforementioned embodiments, the counting operation after switching the count modes is started from the final count value before switching the count modes. In this case, a special arrangement is not required for switching the modes if an up/down counter for outputting the count value in synchronization with the count clock CK0 is used.

However, if an asynchronous up/down counter suitable for a fast operation since the operation limit frequency is determined by only the limit frequency of the first flip-flop (counter basic element) is used, the count value is lost when switching the count modes, and thus, the correct counting operation cannot be performed while maintaining the same value before and after switching the count modes. Accordingly, an adjustment processor for allowing the counting operation after switching the count modes to start from the count value before switching the count modes is preferably disposed. Details of the adjustment processor are not given here. If addition processing between a plurality of signals is performed, the count modes are the same for the first and second counting operations, and thus, the above-described arrangement is not necessary.

In the above-described embodiments, it is now assumed that, concerning a pixel in which the signal components Vsig appear after the reset components ΔV (reference components) in the time sequential order, and the second-stage processor processes a signal having a positive sign (a signal having a higher level has a greater positive value), true components of the pixel are determined. In this case, as the first processing operation, the comparison processing and the down-counting operation are performed for the reset components ΔV (reference components), and as the second processing operation, the comparison processing and the up-counting operation are performed for the signal components Vsig. However, regardless of the time-sequential order in which the reference components and the signal components appear, the combination of the signal components and the count mode and the processing order are arbitrary. Depending on the processing order, the digital data obtained as a result of the second operation may be a negative value. In this case, sign inversion or correction computation can be performed.

According to the device architecture of the pixel portion 10, the reset components ΔV (reference components) must be read after the signal components Vsig. If the second-stage processor processes signals having positive sings, it is more efficient to perform the comparison processing and the down-counting operation for the signal components Vsig as the first operation and to perform the comparison processing and the up-counting operation for the reset components ΔV (reference components) as the second operation.

In the foregoing embodiments, assuming that signal components Vsig appear after reset components ΔV (reference components) for the same pixel, difference processing for finding true signal components is performed when performing the product-sum operation between a plurality of pixel signals. If only signal components Vsig can be subjected to the processing without considering the reset components ΔV (reference components), the difference processing for finding the true signal components can be omitted.

In the aforementioned embodiments, the up/down counter is used in common to perform the counting operation by switching the operation modes regardless of the operation mode. The counter is not restricted to an up/down counter that can switch the modes as long as it performs the counting operation by a combination of the down-counting mode and the up-counting mode.

Figure 19A:
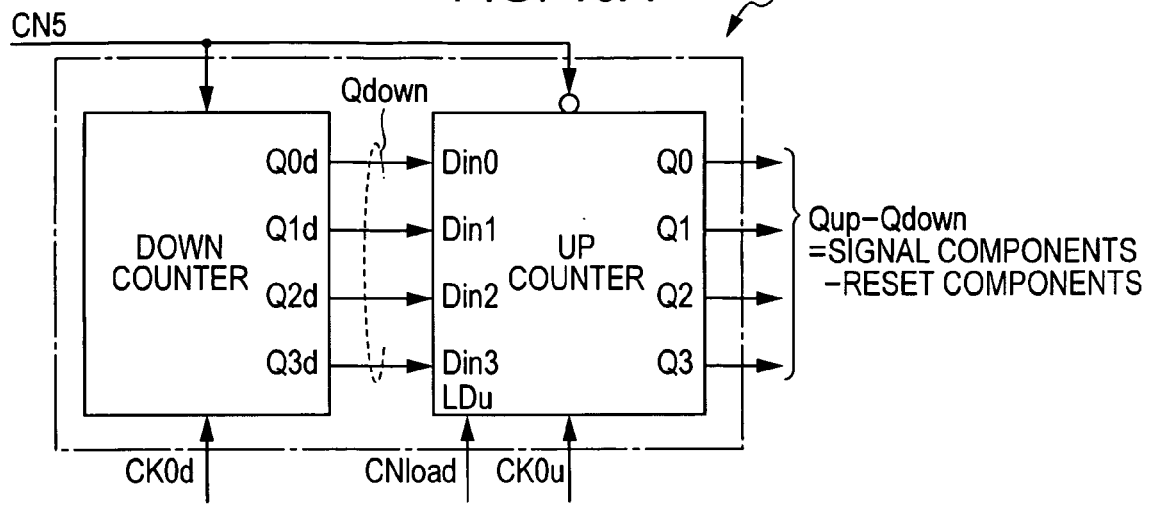
FIGS. 19A, 19B, and 19C are circuit block diagrams illustrating modified examples of the counter used in connection with the present invention.

For example, the counter may be formed by a combination of a down counter circuit for performing down-counting and an up counter circuit for performing up-counting. In this case, counter circuits that can receive a desired initial value by using known art are preferably used. For example, if up-counting is performed after down-counting, as shown in FIG. 19A, the down counter circuit is operated for the first counting operation, and then, the up counter circuit is operated for the second counting operation. In this case, before starting the up-counting operation after switching the count modes by the count-mode-switching control signal CN5, the load control signal CNld for setting the initial value is supplied to the load terminal LDu of the up counter circuit, thereby setting the down count value obtained in the down counting operation as the initial value in the up counter circuit.

Figure 19B:
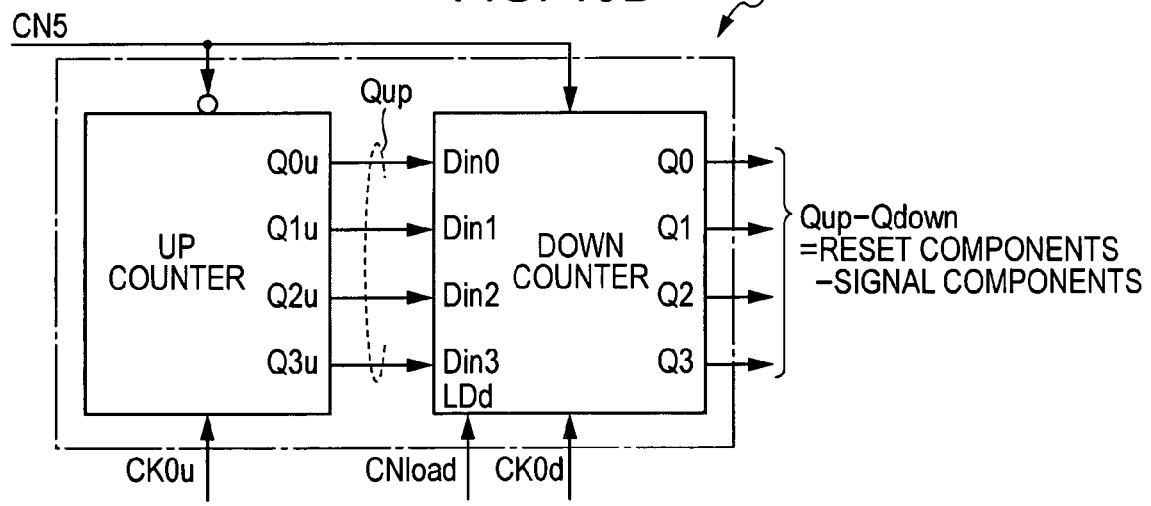

If, for example, down-counting is performed after up-counting, as shown in FIG. 19B, an up counter circuit is operated for the first counting operation, and then, a down counter circuit is operated for the second counting operation. In this case, before starting the down-counting operation after switching the count modes by the count-mode-switching control signal CN5, the load control signal CNld for setting the initial value is supplied to the load terminal LDd of the down counter circuit, thereby setting the up count value obtained in the up-counting operation in the down counter circuit.

In performing addition processing between a plurality of signals, before starting the counting operation in the second-stage count circuit, the initial value is set in a manner similar to the subtraction processing between a plurality of signals while maintaining the same count modes for the first and second counting operations.

With the above-described arrangements, in either of the configuration shown in FIG. 19A or 19B, to obtain the output of the second-stage counter circuit, the subtraction processing between a plurality of signals (including the reference components and the signal components) can be directly performed. This eliminates the need to provide a special addition circuit for calculating the difference between a plurality of signals. Additionally, the transferring of data to a subtractor, which is required in Reference 1 identified above, is not necessary, and thus, an increase in noise, the current, or the power consumption can be suppressed.

If a counter configured by a combination of a down counter circuit and an up counter circuit is used, instead of setting the count value obtained in the first counting operation as the initial value for the second counting operation, the second counting operation may be started from zero.

Figure 19C:
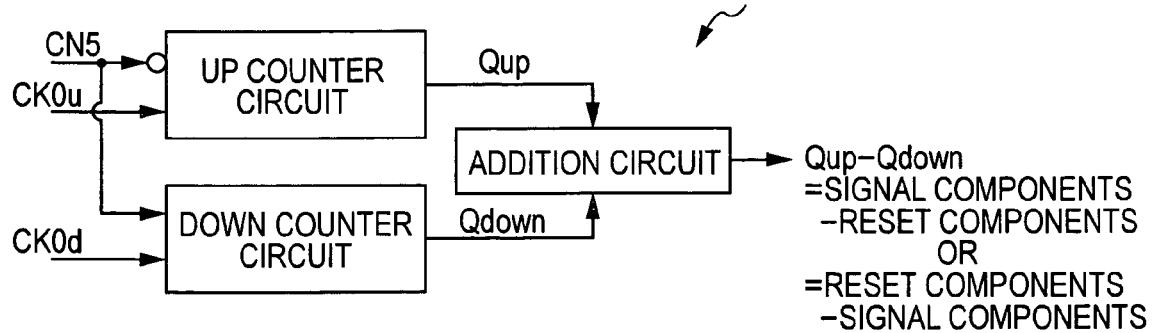

In this case, if, for example, the difference processing is performed, as shown in FIG. 19C, an addition circuit for adding the output Qup (positive value) of the up counter circuit and the output Qdown (negative value) of the down counter circuit is required. In this case, an addition circuit is provided for each AD converter formed of a comparator and a counter. Thus, the wiring length can be small, and an increase in noise, the current, or the power consumption caused by data transfer can be prevented.

In any of the configurations shown in FIGS. 19A, 19B, and 19C, an instruction to operate the down counter circuit and the up counter circuit can be given by the communication/timing controller 20, as in the above-described embodiments. The down counter circuit and the up counter circuit can be both operated by the count clock CK0.

In the foregoing embodiments, NMOS or PMOS unit pixels disposed in a matrix are used in a sensor. However, the sensor is not restricted to this type, and a line sensor may be used, in which case, operations and advantages similar to those of the above-described embodiments can be achieved.

In the above-described embodiments, as a solid state imaging device that can selectively read signals from desired unit pixels by address control, a CMOS sensor provided with a pixel portion that generates signal charge by receiving light is used. The generation of signal charge is not restricted to light, but may be to electromagnetic waves in general, such as infrared, ultraviolet, or X rays. The above-described features disclosed in the foregoing embodiments can be applied to a semiconductor device having unit elements in which many devices for outputting an analog signal in accordance with the quantity of electromagnetic waves are disposed.

Although in the above-described embodiments the square unit pixels 3 are disposed, the arrangement of the unit pixels 3 are not restricted to a square lattice, and may be an oblique lattice in which the pixel portion 10 shown in FIG. 1 is obliquely tilted at 45 degrees.

Although in the foregoing embodiments the shape of the unit pixels 3 when viewed from the top is a square, it is not restricted to a square, and may be a hexagon (honeycomb). In this case, the arrangement of the unit pixels 3 is as follows such that one unit pixel column and one unit pixel row each includes a plurality of unit pixels.

A plurality of unit pixels forming an even-numbered column are displaced in the column direction from a plurality of unit pixels forming an odd-numbered column by about ½ of the pitch between unit pixels in each unit pixel column. Similarly, a plurality of unit pixels forming an even-numbered row are displaced in the row direction from a plurality of unit pixels forming an odd-numbered row by about ½ of the pitch between unit pixels in each unit pixel row. Each unit pixel column includes unit pixels only in the odd-numbered rows or in the even-numbered rows.

Row control lines 15 are provided for reading the pixel signals based on the signal charge accumulated in the charge generators of the unit pixels 3 to the column processor 26. The row control lines 15 are arranged around the honeycomb unit pixels 3 in a meandering manner. In other words, when viewed from the top, in hexagon spaces formed by disposing the row control lines 15 in a honeycomb shape, the unit pixels 3 are disposed. With this arrangement, on the whole, pixel signals can be read vertically while the unit pixels are displaced by about ½ pitches therebetween.

By arranging the unit pixels 3 and the row control lines 15 in a honeycomb shape, the surface element density can be improved while preventing a decrease in the area of the light-receiving surface of the charge generator of each unit pixel 3.

If the pixel portion 10 is compatible with color imaging, regardless of the shape or arrangement of the unit pixels 3, the pixels 3 should be selected so that the same color components are subjected to the product-sum operation. That is, based on the arrangement of color filters of a color separation filter, the positions of a plurality of unit elements are specified so that a plurality of unit signals subjected to the product-sum operation have the same color filter.

In the foregoing embodiments, the following type of AD conversion circuit (AD conversion device; column AD circuit in the foregoing embodiments), which serves as a data processing unit, is applied to the solid state imaging device 1. The AD conversion circuit includes a comparator for comparing an electric signal corresponding to a signal to be processed with an AD conversion reference signal and a counter for performing a counting operation in one of the down-counting mode and the up-counting mode while the comparison processing is being performed by the comparator and for retaining the count value when the comparison processing is finished. However, the mechanisms of the AD conversion circuit or the data processor may be applied, not only to a solid state imaging device, but also to any electronic apparatus using an AD conversion mechanism for converting a difference signal component or an addition signal component between two signal components or a product-sum operation signal obtained by a combination of a difference signal component and an addition signal component into digital data.

For example, the following type of electronic apparatus may be formed. While conducting AD conversion outside the solid state imaging device 1 by using comparators and counters described in the above-described embodiments based on analog pixel signals read from the solid state imaging device 1, the product-sum operation is performed based on a plurality of signals to be processed so as to output a processed image. At the same time, normal data is generated and output based on any one of the signals to be processed. Also in this case, since the processed image and the normal video signal can be simultaneously output, they can be switched according to the situation, or both the data can be used. As a result, as in the above-described embodiments, the imaging apparatus 1 can be used for various purposes.

It is not essential that the AD conversion circuits discussed as an example of data processors in the above-described embodiments be provided by being integrated in a solid state imaging device. The AD conversion circuits may be provided as or another electronic apparatus (or device) including camera, ICs (Integrated Circuits), AD conversion modules, or data processing modules, having a product-sum operation function (data processing function) of performing an operation between a plurality of pixels.

In this case, the AD conversion circuits (or data processors) including comparators and counters may be provided. Alternatively, they may be integrated into an IC or a module formed of a combination of individual chips in which a reference signal generator for generating an AD conversion reference signal and supplying it to the comparators and a controller for controlling the counting operation modes in the counters are mounted on the same semiconductor substrate.

By providing the AD conversion circuits into an IC or a module, the functions required for controlling the operations of the comparators and the counters can be collectively handled, thereby facilitating the handling or management of the components. Additionally, since the elements required for AD conversion are integrated as an IC or a module, the manufacturing of solid state imaging devices or other electronic apparatuses as finished products can be facilitated.

As described above, according to the data processing method, the semiconductor device, and the electronic apparatus of the present invention, a signal to be processed is compared with a reference signal for AD conversion, and simultaneously with this comparison processing, the counting operation is performed in one of the down-counting mode and the up-counting mode, and the count value when the comparison processing is finished is stored.

In this case, the digital data for one of the plurality of signals is set as the initial value for the counting operation for the other signal. Accordingly, multi-level digital data representing the product-sum operation result based on a plurality of signals can be obtained as the counting result.

Since AD conversion is conducted by the comparison processing and the counting operation, a mechanism for simultaneously executing the AD conversion and the product-sum operation can be constructed. That is, AD conversion is conducted on a signal by operating the AD conversion reference signal, and at the same time, the product-sum operation by using a plurality of signals is performed. As a result, the multi-level count value, which is the AD conversion result, can be obtained as the product-sum operation result.

Accordingly, the AD conversion and computation processing can be efficiently performed. The provision of additional circuits, such as a dedicated memory device for storing AD converted data or a function for performing the product-sum operation, other than the AD converters formed of comparators and counters, is not necessary, thereby reducing the circuit scale or the circuit area.

Additionally, normal data is generated based on one of a plurality of signals subjected to the product-sum operation and is output as video data. Accordingly, variations in image displays by using the information (images) concerning the AD converted computation results and video data are increased, thereby significantly increasing the range of the use of the apparatus.

What is claimed is:

1. A data processing method for obtaining digital data for a plurality of signals to be processed, comprising:
    comparing, by using digital data for a first signal of the plurality of signals, an electric signal corresponding to a second signal of the plurality of signals with a reference signal, said reference signal being a ramp reference voltage produced, independently of said second signal, by a reference signal generator;
    obtaining digital data for the second signal based on the comparing step;
    performing a counting operation in one of a down-counting mode and an up-counting mode while the comparing step is being performed;
    storing a first count value;
    outputting the first count value as computed data at a predetermined time;
    generating video data based on one of the plurality of signals to be processed; and
    outputting the video data simultaneously with outputting of the computed data.

2. The data processing method according to claim 1, further comprising the step of comparing an electric signal corresponding to the first signal with the reference signal for obtaining the digital data for the first signal;
    storing a second count value; and setting the digital data for the first signal as an initial value for the counting operation.

3. The data processing method according to claim 2, further comprising the step of setting a first count mode for the first signal and a second count mode for the second signal to be opposite.

4. The data processing method according to claim 3, wherein the plurality of signals to be processed have been obtained substantially at the same time point.

5. The data processing method according to claim 3, wherein the plurality of signals to be processed have been obtained substantially at different time points.

6. The data processing method according to claim 2, further comprising the step of setting a first count mode for the first signal the same as a second count mode for the second signal.

7. The data processing method according to claim 6, wherein the plurality of signals to be processed have been obtained substantially at the same time point.

8. The data processing method according to claim 6, wherein the plurality of signals to be processed have been obtained by different accumulation periods.

9. The data processing method according to claim 1, further comprising the step of switching between the down-counting mode and the up-counting mode of the counting operation by switching a processing mode of an up/down counter.

10. The data processing method according to claim 1, further comprising the step of adjusting the number of bits for the counting operation based on the number of signals to be processed.

11. The data processing method according to claim 10, wherein, when the number of signals to be processed is $2^m$ where m is the number of bits by which the counting operation is reduced for a video data counting operation performed on one signal to be processed.

12. The data processing method according to claim 2, further comprising the step of setting a coefficient for the plurality of signals to be processed based on an amount by which the reference signal is changed over time.

13. The data processing method according to claim 1, further comprising the steps of storing a resulting count value based on a previous counting operation in a predetermined data storage unit, and, reading the resulting count value from the data storage unit.

14. The data processing method according to claim 1, wherein the step of obtaining video data based on one of the plurality of signals to be processed further comprises comparing an electric signal corresponding to the first signal with a reference signal to obtain the digital data for the first signal; performing the counting operation in one of the down-counting mode and the up-counting mode while the comparing step is being performed; storing a count value when the comparing step is finished; and extracting the stored count value at a predetermined timing.

15. A semiconductor device comprising:
a plurality of unit elements disposed in a predetermined order, wherein each of the unit elements includes a charge generator for generating charge corresponding to applied electromagnetic waves and a unit signal generator for generating a corresponding analog unit signal for each such unit element;
a computed data processor including a comparator for comparing a plurality of analog signals to be processed with a reference signal for converting the analog signals into digital data, said reference signal being a ramp reference voltage produced, independently of said plurality of analog signals, by a reference signal generator, a counter for performing a counting operation in one of a down-counting mode and an up-counting mode by using digital data for a first signal of the plurality of analog signals, and for storing a count value when the comparison processing performed by the comparator is finished, and a readout controller for reading out the count value stored in the counter at a predetermined timing; and
a video data processor for generating and outputting video data based on one of the plurality of analog signals to be processed simultaneously with outputting of the computed data.

16. The semiconductor device according to claim 15, further comprising a mode controller for controlling the mode of the counting operation performed by the counter.

17. The semiconductor device according to claim 15, wherein the unit elements are disposed in a matrix, and a plurality of sets of the comparator and the counter are arranged in a row direction.

18. The semiconductor device according to claim 15, further comprising a unit signal selection controller for inputting each of the analog unit signals into the comparator by specifying the position of each of the plurality of unit elements to be processed by the comparator and the counter.

19. The semiconductor device according to claim 18, wherein the unit elements are disposed in a matrix, and the unit signal selection controller comprises a column selection processor for inputting the analog unit signals corresponding to the unit elements in a column of the matrix into the comparator by switching the analog unit signals column by column.

20. The semiconductor device according to claim 18, wherein the unit elements are disposed in a matrix, and the plurality of analog unit signals comprises the analog unit signals corresponding to the unit elements in a column and the unit elements in a plurality of rows generated by the unit signal generators and output in the column direction.

21. The semiconductor device according to claim 18, wherein the unit elements are disposed in a matrix, and the plurality of analog unit signals comprises the analog unit signals corresponding to the unit elements in a row and the unit elements in a plurality of columns generated by the unit signal generators and output in the column direction.

22. The semiconductor device according to claim 18, wherein the unit elements are disposed in a matrix, and the plurality of unit signals comprises the analog unit signals corresponding to the unit elements in a column and the unit elements in a plurality of rows generated by the unit signal generators and output in the column direction, and the analog unit signals corresponding to the unit elements in a row and the unit elements in a plurality of columns generated by the unit signal generators and output in the column direction.

23. The semiconductor device according to claim 18, wherein:
the unit elements are disposed in a matrix wherein a plurality of sets of the comparator and the counter are arranged in a row direction; and
the unit signal selection controller controls digital data based on a count value stored in a first counter corresponding to a first column of the matrix being used as an initial value for the counting operation performed by a second comparator and counter corresponding to a second column of the matrix.

24. The semiconductor device according to claim 18, wherein the unit elements are disposed in a matrix, and a first set of the comparator and the counter perform, under the control of the unit signal selection controller, corresponding operations assigned to the comparator and the counter by using, as the plurality of unit signals, the unit signals of the same column and of a plurality of rows generated by the unit signal generators and output in the column direction.

25. The semiconductor device according to claim 18, further comprising a color separation filter having a plurality of color filters wherein one of the color filters is disposed on a surface of each charge generator on which the electromagnetic waves are incident, and wherein the unit signal selection controller specifies a position of each unit element based on the position of the corresponding color filter.

26. The semiconductor device according to claim 18, wherein a mode controller sets a first count mode for a first signal of the plurality of analog signals and a second count mode for a second signal of the plurality of analog signals to be opposite.

27. The semiconductor device according to claim 18, wherein the plurality of analog signals comprises the analog signals corresponding to the unit elements located at different positions and obtained at substantially the same time point.

28. The semiconductor device according to claim 18, wherein the plurality of analog signals comprises the analog signals corresponding to the unit elements located at the same position and obtained at different time points.

29. The semiconductor device according to claim 28, wherein:
the unit element has a memory function element for storing charge generated by the charge generator at a relatively prior time; and
at least one of the plurality of analog signals generated by the charge signal generator is based on the charge stored in the memory function element.

30. The semiconductor device according to claim 18, wherein a mode controller sets a first count mode for a first signal of the plurality of analog signals and a second count mode for a second signal of the plurality of analog signals to be the same.

31. The semiconductor device according to claim 30, wherein the plurality of analog signals comprises analog signals corresponding to the unit elements located at different positions and obtained at substantially the same time point.

32. The semiconductor device according to claim 30, wherein the plurality of analog signals comprises analog signals corresponding to the unit elements obtained based on different irradiation periods of electromagnetic waves.

33. The semiconductor device according to claim 15, wherein each of the counters comprise a counter circuit that is capable of switching between the up-counting mode and the down-counting mode.

34. The semiconductor device according to claim 18, wherein a mode controller adjusts the number of bits for the counting operation in the counter based on the number of analog signals to be processed.

35. The semiconductor device according to claim 34, wherein, when the number of analog signals to be processed is $2^m$ where m is the number of bits by which the mode controller reduces the counting operation for a single analog signal.

36. The semiconductor device according to claim 15, wherein:
the comparator compares an electric signal corresponding to the first signal of the plurality of analog signals with a reference signal for obtaining digital data for the first signal; and
the counter performs the counting operation in one of the down-counting mode and the up-counting mode while the comparator is performing the comparison processing, and stores the count value when the comparison processing is finished, thereby obtaining digital data for the first signal and setting the obtained digital data as the initial value.

37. The semiconductor device according to claim 15, wherein the video data processor includes a comparator for comparing an electric signal corresponding to one of the plurality of analog signals which serves as a base for the video data with the reference signal for obtaining digital data for the electric signal, and a counter for performing the counting operation in one of the down-counting mode and the up-counting mode and storing a count value when the comparison processing performed by the comparator is finished, thereby outputting the count value stored in the counter at a predetermined timing as the video data.

38. The semiconductor device according to claim 15, further comprising:
a data storage unit for storing a count value based on a previous counting operation; and
a readout scanner for reading out the count value from the data storage unit simultaneously with operations performed by the comparator and the counter.

39. The semiconductor device according to claim 15, wherein the unit signal generator includes a semiconductor device for generating an analog voltage signal as the unit signal and for supplying the analog voltage signal to the comparator, wherein the analog voltage signal corresponds to the charge generated by the charge generator.

40. An electronic apparatus comprising:
a reference signal generator for generating a reference signal used to convert each of a plurality of analog signals into digital data, said reference signal being a ramp reference voltage generated independently of said plurality of analog signals;
a comparator for comparing the analog signals with the reference signal;
a counter for performing a counting operation in one of a down-counting mode and an up-counting mode by using the digital data corresponding to one of the plurality of analog signals as an initial value for the counting operation while the comparator compares the analog signals with the reference signal, and for storing a count value;
a mode controller for controlling the mode for the counting operation;
a readout controller for reading out the count value stored in the counter at a predetermined timing; and
a video data processor for generating and outputting video data based on one of the plurality of analog signals to be processed simultaneously with outputting of the computed data.

* * * * *